United States Patent
Hirabayashi et al.

(10) Patent No.: US 6,766,082 B2
(45) Date of Patent: Jul. 20, 2004

(54) WAVEGUIDE-TYPE OPTICAL DEVICE AND MANUFACTURING METHOD THEREFOR

(75) Inventors: Katsuhiko Hirabayashi, Atsugi (JP); Chikara Amano, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 81 days.

(21) Appl. No.: 10/072,031

(22) Filed: Feb. 8, 2002

(65) Prior Publication Data

US 2002/0076161 A1 Jun. 20, 2002

(30) Foreign Application Priority Data

Feb. 15, 2001 (JP) ..................................... P2001-038802
Aug. 24, 2001 (JP) ..................................... P2001-254381

(51) Int. Cl.[7] ........................... G02B 06/30; G02B 06/42
(52) U.S. Cl. ............................ 385/40; 385/50; 385/49; 385/9; 385/122; 438/30; 438/31; 438/65
(58) Field of Search ........................... 385/49, 40, 1–9, 385/11, 50, 122, 14; 257/432, E31.11; 438/27, 29–31, 65

(56) References Cited

U.S. PATENT DOCUMENTS

| | | | | |
|---|---|---|---|---|
| 4,117,329 A | * | 9/1978 | Kruer et al. | 250/338.1 |
| 4,732,446 A | * | 3/1988 | Gipson et al. | 385/24 |
| 5,119,448 A | * | 6/1992 | Schaefer et al. | 385/4 |
| 5,550,941 A | * | 8/1996 | Lebby et al. | 385/49 |
| 5,562,838 A | * | 10/1996 | Wojnarowski et al. | 216/24 |
| 5,757,993 A | * | 5/1998 | Abe | 385/34 |
| 6,008,927 A | * | 12/1999 | Minemoto et al. | 359/245 |
| 6,027,254 A | * | 2/2000 | Yamada et al. | 385/88 |
| 6,064,780 A | * | 5/2000 | Blair et al. | 385/14 |
| 6,115,514 A | * | 9/2000 | Ando et al. | 385/11 |
| 6,215,917 B1 | * | 4/2001 | Takahashi et al. | 385/14 |
| 2002/0067906 A1 | * | 6/2002 | Katayama et al. | 385/140 |
| 2002/0172463 A1 | * | 11/2002 | Romanovsky | 385/37 |

FOREIGN PATENT DOCUMENTS

JP 9-297229 11/1997 ............ G02B/6/12

OTHER PUBLICATIONS

S. Kawakami et al., "Vertical Photonics: A New Approach to Integrate Photonic Devices into Optical Fibers", the Proceeding of IEICE, C–I, vol. J77–C–I, No. 5, pp. 334–339, 1994.

Y. Ohtera, T. Chiba and S. Kawakami, "Polarization Control using Liquid Crystal", Technical Report of IEICE, OME95–49, OPE95–90, pp. 19–24, 1995, (translation of Abstract only).

K. Hirabayashi et al., "Compact Optical–Fiber Variable Attenuator Arrays with Polymer–Network Liquid Crystals", Applied Optics, vol. 40, No. 21, pp. 3509–3517, Jul. 2001.

(List continued on next page.)

Primary Examiner—Edward J. Glick
Assistant Examiner—Krystyna Suchecki
(74) Attorney, Agent, or Firm—Darby & Darby

(57) ABSTRACT

A technique for electrically mounting a surface-normal optical device or material on a waveguide-type optical device while the characteristics of the mounted device are effectively used is disclosed. The waveguide-type optical device comprises a substrate on which optical waveguides or fibers are provided and a trench is formed; a pair of electrodes which is assigned to each optical waveguide or fiber and is formed from the surface of the substrate to wall surfaces of the trench; and a material or device which is filled or inserted into the trench, and which has an electro-optic effect, thermo-optic effect, light emitting function, light receiving function, or light modulating function. Another type of device comprises a thin and surface-normal active optical device driven by an applied voltage, which is substantially vertically inserted into the trench and is fixed in the trench; and a support member attached to the inserted device.

33 Claims, 34 Drawing Sheets

OTHER PUBLICATIONS

K. Hirabayashi et al., "Liquid Crystal Variable Optical Attenuators Integrated on Planar Lightwave Circuits", IEEE Photonics Technology Letters, vol. 13, No. 6, pp. 609–611, Jun. 2001.

Y. Inoue et al., "Elimination of Polarization Sensitivity in Silica–Based Wavelength Division Multiplexer Using a Polymide Half Waveplate", Journal of Lightwave Technology, vol. 15, No. 10, pp. 1947–1957, Jun. 2001.

M. Kurono, "High Speed Polarization Control Using a Four–Electrode LN Crystal", the Transaction of IEE, vol. 118–C, No. 5, pp. 649–655, 1998, (translation of Abstract only).

K. Takizawa et al., "Polarization–Independent Optical Fiber Modulator by Use of Polymer–Dispersed Liquid Crystal", Applied Optics, vol. 37, No. 15, pp. 3181–3189, 1998.

H. Shimizu et al., "Endless Polarization Controller Using Electro–Optic Waveplates", Electronics Letters, vol. 24, No. 7, pp. 412–413, 1988.

* cited by examiner

Fig. 2A
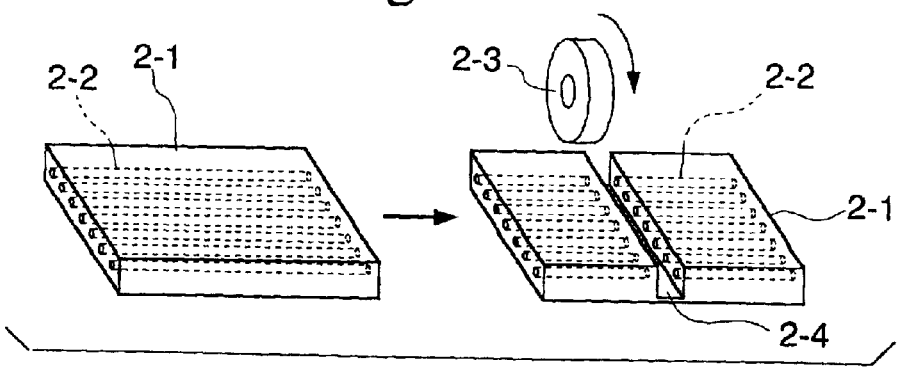
Fig. 2B
Fig. 2C
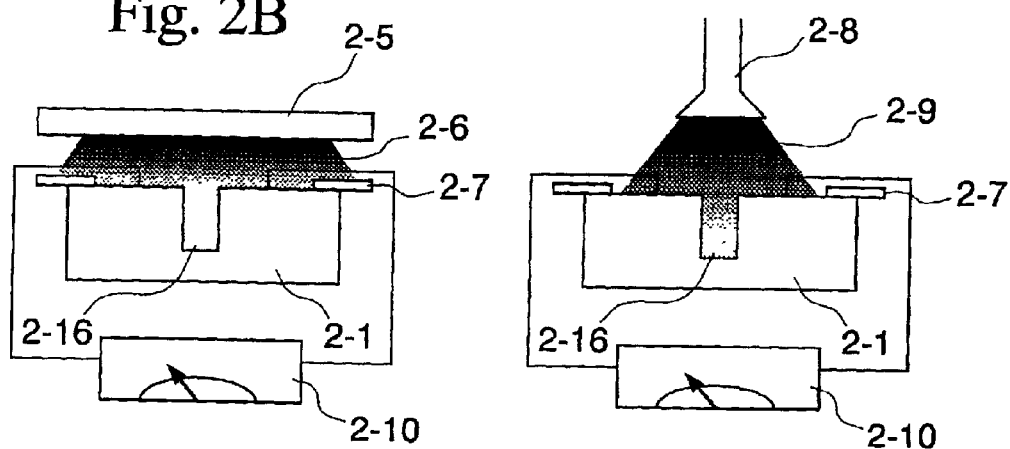
Fig. 2D
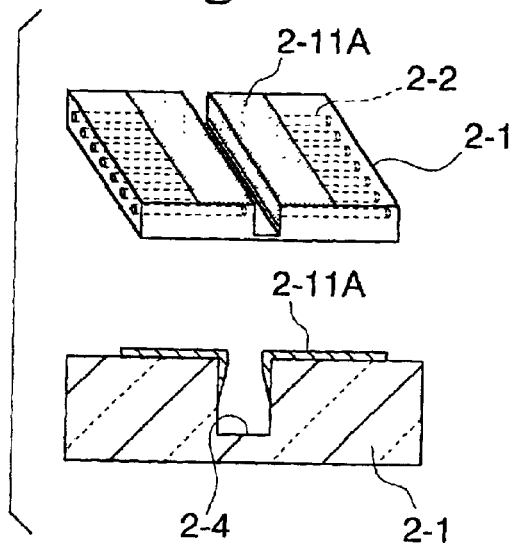

Fig. 13B    DIRECTION IN WHICH
VOLTAGE IS APPLIED

DIRECTION OF
OPTICAL PATH

PORTIONS THROUGH
WHICH LIGHT PASSES

PROTRUDING PORTION
CORRESPONDING TO
DEPTH OF GROOVE

Fig. 22A
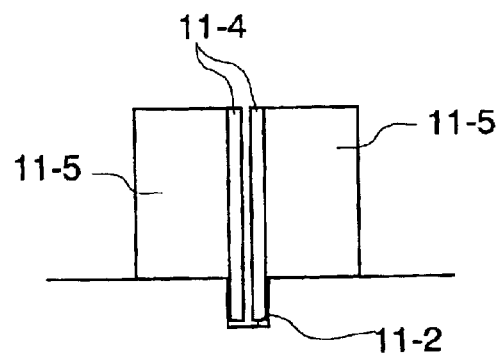
Fig. 22B      Fig. 22C      Fig. 22D
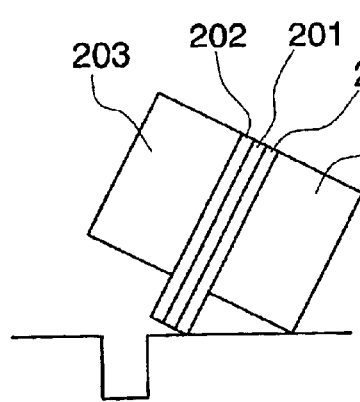 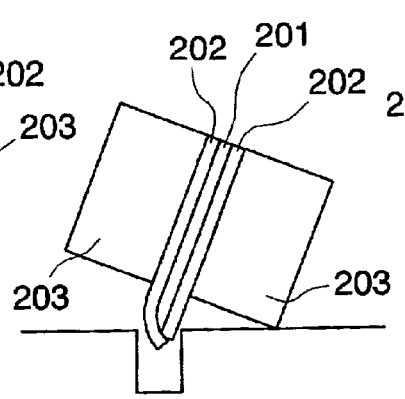 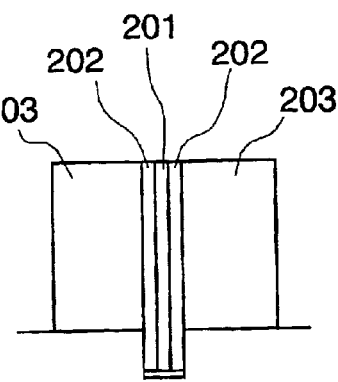

Fig. 23A
Fig. 23B
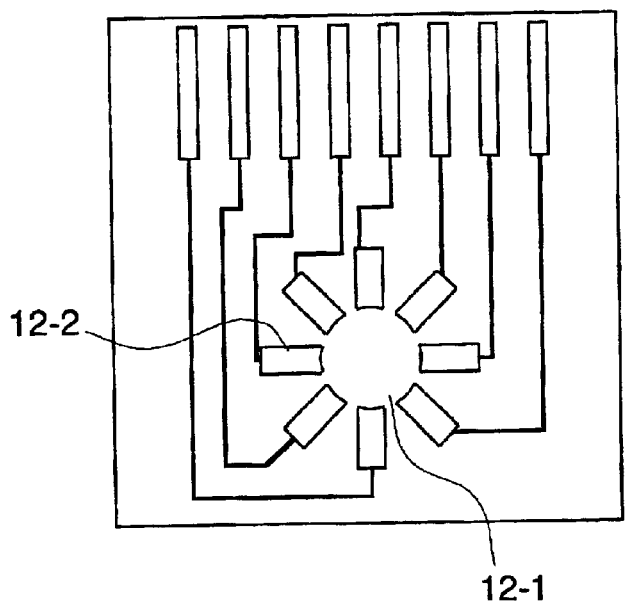
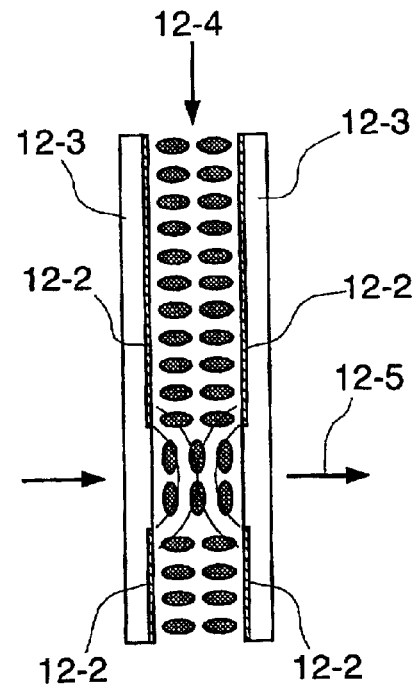
Fig. 23C
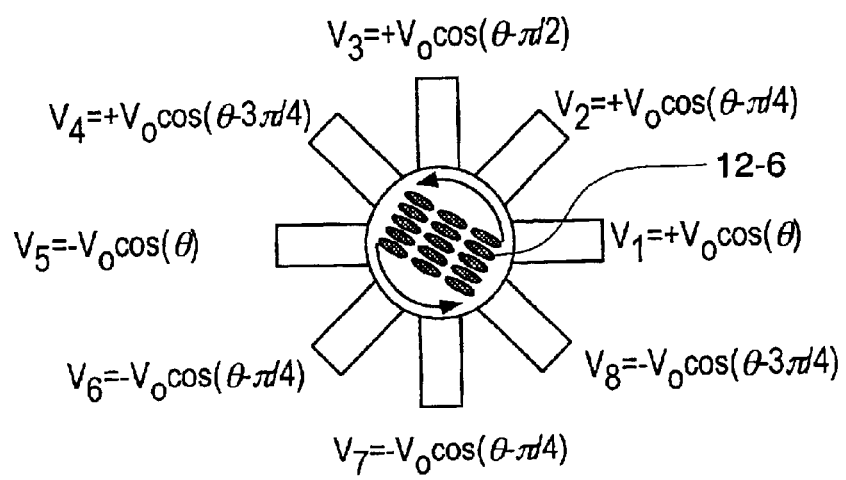

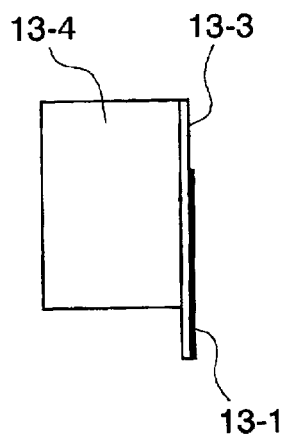 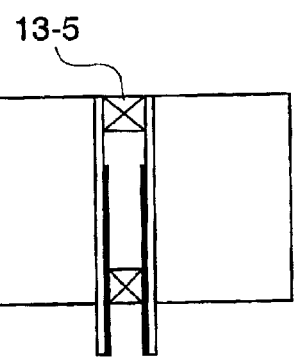 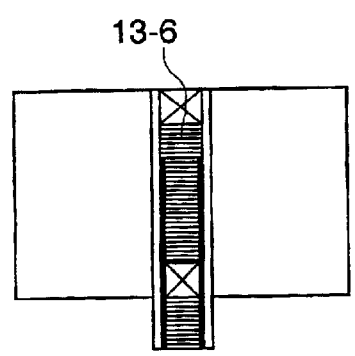
Fig. 25A  Fig. 25B  Fig. 25C
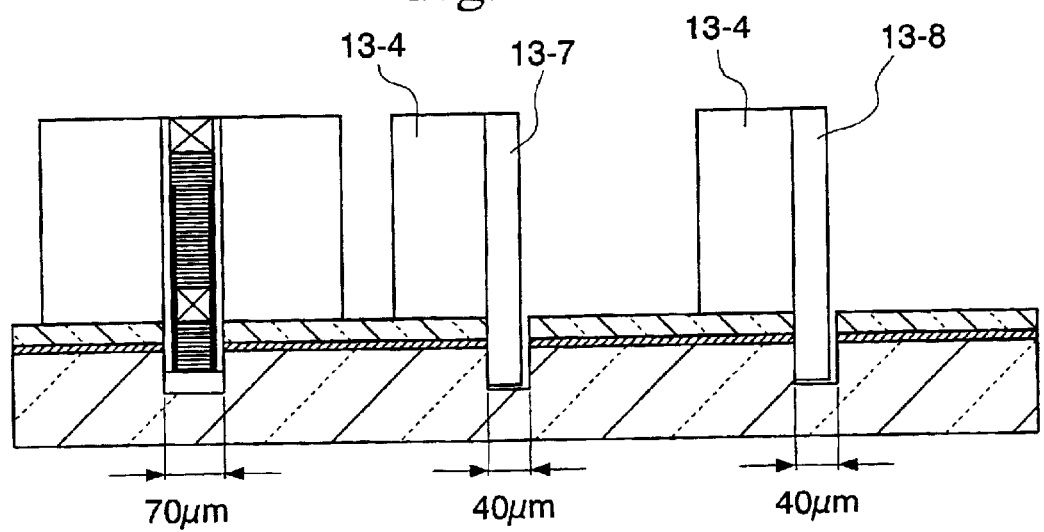
Fig. 26

WAVEGUIDE-TYPE OPTICAL DEVICE AND MANUFACTURING METHOD THEREFOR

BACKGROUND OF THE INVENTION

1. Field of the Invention

The present invention relates to a structure in which a surface-normal optical (or photonic) device or material is mounted on an optical fiber or waveguide, in which the surface-normal optical device or material has a function of controlling the intensity, phase, polarization of light, or a function of receiving, emitting, or modulating light. In particular, the present invention relates to a technique for inserting a thin and surface-normal active optical device into a trench which is formed perpendicularly to a substrate on which an optical fiber or waveguide is mounted.

2. Description of the Related Art

Optical communication using optical fibers has been rapidly spreading because it can transmit large amounts of data at high speed.

Optical waveguides are used in order to perform separating, coupling, switching, wavelength-division multiplexing, or wavelength-division demultiplexing of light. Optical waveguides are made of glass or polymeric material and are thus basically passive devices. However, the refractive index of an optical waveguide can be partially changed by providing a local heater or the like so as to obtain a thermo-optical effect. Accordingly, the phase and polarization of light can be controlled, thereby realizing an optical switch, variable optical attenuator, variable optical filter, or the like.

However, when a heater is provided on a substrate for waveguides, the distance between the heater and the core of the waveguide is large. Therefore, if a plurality of heaters having required high power are provided on a substrate, the temperature of the entire substrate is increased.

In addition, when a device or material having a function of emitting or processing light is provided at an optical waveguide, conventionally, the device or material is mounted on the optical waveguide. More specifically, when a semiconductor chip or the like having such a function is mounted on an optical waveguide, a relevant portion of the waveguide is removed, and the semiconductor device (i.e., chip) is mounted on that portion in parallel to the surface of the waveguide. Therefore, the distance between the divided waveguides is large, and thus transmission loss is large. In addition, it is very difficult to adjust a core (through which light passes) of the semiconductor chip to the core of the waveguide.

When a surface-normal optical device such as a semiconductor laser or an optical detector is mounted on an optical waveguide, the device is put on the same surface of the optical waveguide and the direction of light is changed by 45° by using a mirror. This structure is suitable for forming electrodes and being integrated. However, the distance between the device and the waveguide is large and the light is diffused; thus, a condenser such as a micro lens is necessary.

In addition, a technique for inserting a passive optical device such as a filter or a wavelength plate (typically, a half- or quarter-wave plate) into a trench formed in the waveguide is known. However, when an active surface-normal optical device is inserted into such a trench, necessary electrodes cannot be formed and obtained.

In most conventional optical devices used for optical communication, light output from an optical fiber is collimated so as to make the light pass through a surface-normal optical device, which can be selected from various kinds of surface-normal optical devices (i.e., optically-functional devices). This light is collimated again using a collimating lens so as to allow input into an optical fiber for outputting the light. However, many problems occur in this case, for example, the surface-normal optical device is relatively large and is expensive.

FIGS. 38A to 38D show typical optical devices using collimating fibers, where each collimating fiber has a collimator.

In the figures, reference numeral 19-1 indicates an optical fiber having an input collimator, reference numeral 19-2 indicates an optical fiber having an output collimator, reference numeral 19-3 indicates a rotatable half-wave plate, reference numeral 19-4 indicates a rotatable quarter-wave plate, and reference numeral 19-5 indicates a rotatable or movable ND filter. Reference numeral 19-6 indicates a homogeneous liquid crystal device, a TN liquid crystal device, a liquid crystal variable-wavelength filter in which a liquid crystal is inserted in a Fabry-Perot interferometer, or a piezo-controlled Fabry-Perot interferometer-type variable-wavelength filter. Reference numeral 19-7 indicates a first polarizer, reference numeral 19-8 indicates a second polarizer, and reference numeral 19-9 indicates a Faraday rotator.

In typical polarization control devices, a quarter-wave plate and a half-wave plate are inserted between the collimating fibers, and the polarization state of incident light can be changed by rotating such wavelength plates without any limitation (refer to FIG. 38A). The wavelength plates are manually rotated in most laboratories. However, in practical systems, motor-controlled rotation is employed.

In variable optical attenuators, mechanical attenuators are known, in which a planar ND filter is rotated or moved with respect to collimated incident light (refer to FIG. 38B). The planar ND filter can be manually adjusted or can be controlled using a motor.

The following devices are also known: (i) phase modulators in which a liquid crystal having a homogeneous alignment is inserted between collimating lenses, (ii) polarization switching devices for switching the polarization direction between 0° and 90°, in which a TN liquid crystal is inserted between collimating lenses, (iii) liquid crystal variable-wavelength filters in which a liquid crystal is inserted in a Fabry-Perot interferometer-type filter, and (iv) Fabry-Perot interferometer-type variable-wavelength filters in which a filter gap is adjusted using a piezo element (refer to FIG. 38C).

Additionally, known optical isolators have a structure in which a Faraday rotator is inserted between polarizers whose polarization directions differ by 45° from each other, where collimated light is transmitted between the polarizers (refer to FIG. 38D). In order to provide polarization-insensitive characteristics in this structure, a polarization separating element must further be employed.

In addition, optical fiber amplifiers are known, in which an excited optical beam is input into an optical fiber via a free-space optical beam system.

In the above-explained conventional devices, it is generally difficult to perform coupling and adjustment of the optical beam. In addition, such devices generally provide a single channel system, and the device is large. Therefore, it is difficult to reduce the costs of relevant optical elements.

When a trench having a width of 10 to 100 $\mu$m is formed in a substrate on which an optical waveguide or an optical fiber is provided and a functional device as explained above is vertically inserted into the trench, the optical device (including the functional device) which can be realized in a free-space optical beam system can also be realized as a waveguide-type device. In such a small width of 10 to 100 μm, radiation loss of light due to the presence of the trench is smaller than the power loss in the free-space optical beam system. In particular, if the width of the trench is equal to or less than 40 μm, the radiation loss is very small, approximately 0.2 dB.

The inventors have realized a variable optical attenuator by filling a trench, which is formed in a substrate on which an optical waveguide or fiber is fixed, with a liquid crystal material. In optical waveguides, a wavelength plate made of polyimide may be inserted so as to cancel the polarization dependence, or a dielectric mirror formed on a polyimide material may be inserted so as to perform wavelength-division multiplexing of light. That is, a liquid or an elastic material can be relatively easily inserted into a trench as explained above.

However, when a solid surface-normal optical device which is made of glass, semiconductor, electro-optic crystal, ceramics, or the like and has a thickness of 10 to 50 μm is inserted into a corresponding narrow trench, the device tends to be damaged, and thus it is very difficult to handle the device. If a micro-positioning stage is used for insertion of the device, the adjustment is very difficult. Even when the micro-positioning stage is erroneously moved by 1 μm, the surface-normal optical device may be damaged.

In addition, if the trench is formed using an etching method such as RIE (reactive ion etching), the depth of the trench is shallow, typically, 50 to 100 μm. In this case, even if a thin device can be inserted, the position of the inserted device is not stable and tends to fall.

Furthermore, even if a thin optical device having a thickness of 10 to 50 μm can be inserted into a trench, it is difficult to form electrodes on the inserted device.

SUMMARY OF THE INVENTION

In consideration of the above circumstances, an object of the present invention is to provide a technique for electrically mounting a surface-normal optical device or material on a waveguide-type optical device while the characteristics of the mounted optical device are effectively used.

Another object of the present invention is to provide a technique for easily mounting a thin surface-normal optical device having a thickness of 10 to 100 μm on an optical device in which an optical fiber or waveguide is provided on a substrate.

The above and other objects, and distinctive features of the present invention will be shown below with reference to the drawings.

Therefore, the present invention provides a waveguide-type optical device comprising:
  a substrate on which optical waveguides or optical fibers are provided and a trench for dividing optical paths of the optical waveguides or the optical fibers is formed;
  a pair of electrodes which is assigned to each optical waveguide or optical fiber and is formed from the surface of the substrate at both sides of the trench to wall surfaces of the trench; and
  a material or device which is filled or inserted into the trench, and which has one of an electro-optic effect, a thermo-optic effect, a light emitting function, a light receiving function, and a light modulating function.

The electrodes may be extended by attaching a flexible substrate or by wire bonding, and a voltage may be applied to the material or device via the extended electrodes.

The followings are typical examples of the material or device which is filled or inserted into the trench:
(i) one of a nematic liquid crystal having an electro-optic effect, a cholesteric-nematic phase transition type liquid crystal, a polymer network liquid crystal a polymer-dispersed liquid crystal, a polymer-stabilized liquid crystal, a dynamic scattering liquid crystal, and a ferro-electric liquid crystal,
(ii) a polymeric material having a thermo-optic effect, and
(iii) one of a surface-normal optical modulator, a surface light emitting device, and a planar (i.e., surface-normal) detector which has one of a light emitting function, a light receiving function, and a light modulating function.

If the material or device which is filled or inserted into the trench is the polymer-dispersed liquid crystal, preferably, the polymer-dispersed liquid crystal is one of a normal polymer-dispersed liquid crystal in which each particle has a diameter of 0.5 μm or more, and a nanosize droplet liquid crystal in which each particle has a diameter of 150 nm or less.

The present invention also provides a manufacturing method of a waveguide-type optical device, comprising the steps of:
  forming a trench on a substrate on which optical waveguides or optical fibers are provided, in a manner such that the trench divides optical paths of the optical waveguides or the optical fibers;
  forming a pair of electrodes, which is assigned to each optical waveguide or optical fiber, from the surface of the substrate at both sides of the trench to wall surfaces of the trench; and
  filling or inserting a material or device into the trench, which has one of an electro-optic effect, a thermo-optic effect, a light emitting function, a light receiving function, and a light modulating function.

Typically, the electrodes are formed by sputtering or vapor deposition.

The step of forming a pair of electrodes may include:
(i) the steps of inserting a polymer material into the trench and selectively removing a portion of the polymer material; and performing patterning of said pair of electrodes, which is separately assigned to each optical waveguide or optical fiber, on the wall surfaces of the trench by etching, or
(ii) the step of patterning the electrodes On the wall surfaces of the trench by directly using a laser beam.

When a liquid crystal is filled into the trench, the filling step may include:
  coating each wall surface of the trench with an alignment layer for the liquid crystal;
  performing rubbing of the alignment layer by inserting a tape and pulling the tape in a single direction;
  filling a polymer-stabilized liquid crystal into the trench;
  performing alignment of the liquid crystal by irradiation of ultraviolet light while a magnetic field is applied to the liquid crystal.

Also when a liquid crystal is filled into the trench, the filling step may include the steps of coating each wall surface of the trench with a photo-alignment layer for the liquid crystal; and performing alignment of the liquid crystal by irradiating the photo-alignment layer with first and second polarized ultraviolet light beams.

Also when a liquid crystal is filled into the trench, the filling step may include the steps of coating each wall surface of the trench with an alignment layer for the liquid crystal; and performing alignment of the liquid crystal by irradiating the alignment layer with an ion beam.

According to the present invention, a surface-normal optical device or material can be inserted into a trench of a waveguide-type device, and the electrodes of the surface-normal optical device or material can be extended to the surface of the waveguides via the pairs of electrodes formed from the surface of the substrate to the wall surfaces of the trench. Therefore, the surface-normal optical device or material and the waveguide-type device can be electrically mounted while the characteristics of each device are effectively used.

In addition, each pair of the electrodes (transparent electrodes or metal electrodes) can be formed on the wall surfaces of the trench by sputtering or vapor deposition. Therefore, the electrodes can be formed while no short circuiting is caused on the bottom face of the trench.

The material or device inserted into the trench can be flexibly selected so as to realize a specific device for controlling the intensity, phase, and polarization of light or a device for controlling emitting or receiving light.

When a liquid crystal is filled into the trench, the alignment of the liquid crystal can be controlled.

The present invention also provides a waveguide-type optical device comprising:

a substrate on which optical waveguides or optical fibers are provided and a trench for dividing optical paths of the optical waveguides or the optical fibers is formed;

a thin and surface-normal active optical device driven by an applied voltage, which is substantially vertically inserted into the trench and is fixed in the trench; and a support member attached to the thin and surface-normal active optical device.

The following explanations relate to this type of waveguide-type optical device.

Preferably, for a given thickness w of the thin and surface-normal active optical device, width W of the trench satisfies the condition "w<W<300 $\mu$m".

Electrodes may be formed on the support member, which function as electrodes of the thin and surface-normal active optical device.

Preferably, the support member is one of a rectangular block, an L-shaped block, and a cylindrical block, and the block is made of one of glass, ceramics, and plastics; and height h and width I of the block, and length s of a protruding portion of the thin and surface-normal active optical device, which protrudes from the block, have a relationship of "I/h>s/I" by which the thin and surface-normal active optical device does not fall when the device supported by the support member is put on the surface of the substrate in an inclined position.

As a typical example, the thin and surface-normal active optical device has electrodes;

the support member is a rectangular block, and L-shaped electrodes are formed on the block in a manner such that the L-shaped electrodes lie on two adjacent faces of the block, where the faces include the top face of the block; and the electrodes of the thin and surface-normal active optical device are respectively connected to the electrodes of the block attached to the device, thereby extending the electrodes of the device to the top face of the block.

Typically, the thin and surface-normal active optical device is one of:

a PbS optical detector formed on a glass plate or an a-Si optical detector;

an optical detector obtained by thinning a semiconductor device;

a semiconductor optical modulator;

a polarizer obtained by dispersing metal particles in glass, where the particles are aligned in the long particle axis;

a wavelength plate made of an optical crystal;

a dielectric multi-layered filter deposited on a glass plate;

an ND filter;

a variable-wavelength filter made by placing an electro-optic crystal or electro-optic ceramics between dielectric multi-layered mirrors; and a polarization modulator having an electro-optic crystal or electro-optic ceramics.

If the thin and surface-normal active optical device is a liquid crystal device, the support member may be a pair of blocks between which the liquid crystal device is placed, wherein the liquid crystal device may comprise:

thin glass plates which are respectively attached to faces of the blocks, where said faces of the blocks face each other via the liquid crystal device and a patterned electrode is formed on each glass plate;

an alignment layer formed on each thin glass plate, where the alignment layer is subjected to an alignment process such as rubbing; and a liquid crystal filled into a space between the alignment layers of the thin glass plates.

It is possible that:

the patterned electrode includes 8 electrodes having a radial and symmetric form with respect to a center portion surrounded by the 8 electrodes;

said center portion has a window having a diameter of 20 to 50 $\mu$m;

voltage applied to each of the 8 electrodes is controlled so as to apply an electric field, which has any desired power and is in any desired direction, to the center portion surrounded by the 8 electrodes; and incident light having any polarization direction is converted into light having any desired polarization direction.

It is also possible that:

the thin and surface-normal active optical device is a thin optical modulator which comprises:

a thin PLZT plate having four trenches dug from upper, lower, right, and left sides of the plate;

four electrodes formed from the above four sides of the PLZT plate to the inside of each trench;

a conductive adhesive with which each trench is filled; and a thin glass plate attached to the PLZT plate, which has four electrodes to which the four electrodes of the PLZT plate are respectively connected, and wherein the thin glass plate is attached and fixed to the support member in a manner such that light passes through a center portion between the four electrodes of the PLZT plate, and the electrodes of the thin glass plate function as external electrodes of the optical modulator; and voltage applied to each of the four electrodes is controlled so as to apply an electric field having any desired power and in any desired direction, thereby continuously and completely controlling the polarization direction of incident light into light having a linear polarization.

In this case, preferably, the optical waveguides or optical fibers which are provided on the substrate are expanded core fibers, so as to reduce the radiation loss of light.

Regarding this type of waveguide-type optical devices, the present invention provides a manufacturing method of a waveguide-type optical device, comprising the steps of:

forming a trench on a substrate on which optical waveguides or optical fibers are provided, in a manner such that the trench divides optical paths of the optical waveguides or the optical fibers;

attaching a support member to a thin and surface-normal active optical device which is driven by an applied voltage, in a manner such that a portion of the active optical device protrudes from the support member; and substantially vertically inserting the protruding portion of the thin and surface-normal active optical device which is supported by the supported member into the trench and fixing the device in the trench.

In a preferable example, a positioning mark is provided on the thin and surface-normal active optical device before the device is inserted into the trench to make a portion of the thin and surface-normal active optical device, through which light passes coincide with a corresponding core of each optical waveguide or optical fiber, where the position of the positioning mark is away from the position of the portion through which light passes, by the distance from the surface of the substrate to the position of the core; and the support member is attached to the thin and surface-normal active optical device in a manner such that the positioning mark coincides with the bottom face of the support member.

In another preferable example, the support member is one of a rectangular block, an L-shaped block, and a cylindrical block, and the block is made of one of glass, ceramics, and plastics;

height h and width I of the block, and length s of a protruding portion of the thin and surface-normal active optical device, which protrudes from the block, have a relationship of "I/h>s/I"; and the step of inserting the protruding portion of the thin and surface-normal active optical device includes the steps of:

putting the device supported by the support member on the surface of the substrate in an inclined position, so as to prevent the device from falling onto the substrate;

sliding the device on the surface of the substrate towards the trench; and making the device fall into the trench and fixing the inserted device, In the step of sliding the device on the surface of the substrate, both the support member and an end of the thin and surface-normal active optical device may contact the surface of the substrate.

Typically, in the step of making the device fall into the trench, when the thin and surface-normal active optical device reaches the position of the trench, an end of the device contacts a wall surface of the trench and the thin and surface-normal optical device bends and falls into the trench.

In a preferable example, the thin and surface-normal active optical device has electrodes; and the support member is a rectangular block, and the method further comprising the steps of:

forming L-shaped electrodes on the block in a manner such that the L-shaped electrodes lie on two adjacent faces of the block, where the faces include the top face of the block; and respectively connecting the electrodes of the thin and surface-normal active optical device to the electrodes of the block attached to the device, thereby extending the electrodes of the device to the top face of the block.

According to the latter type of the waveguide-type optical device and the manufacturing method therefor according to the present invention, the following effects can be obtained:

(1) A polarization control device for converting light having any polarization into light having a linear polarization can be formed on a substrate on which optical waveguides or optical fibers are provided.

(2) High-speed phase modulation can be performed, thereby realizing a high-speed optical waveguide switch.

(3) A variable-wavelength filter for selecting a specific wavelength can be formed on a substrate on which optical waveguides or optical fibers are provided.

(4) An optical attenuator can be formed on optical fibers or optical waveguides.

(5) It is possible to monitor the intensity of passing light.

(6) Various kinds of optical devices, which are conventionally realized in a free-space optical beam system, can be realized on a substrate on which optical waveguides or optical fibers are provided, so that the size of the waveguide-type optical devices can be reduced.

As explained above, the inventors of the present invention invented that in the step of making a thin surface-normal optical device fall into the trench, when the surface-normal optical device is slid on the substrate by using tweezers or the like and the device reaches the trench, an end of the device contacts a wall surface of the trench and the thin and surface-normal optical device bends and falls into the trench, thereby easily inserting the surface-normal optical device into the trench. In this method, unnecessary force is not imposed on the device, thereby preventing the device from being damaged.

Also as explained above, preferably, a positioning mark is provided on the thin and surface-normal active optical device before the device is inserted into the trench, where the position of the positioning mark is away from the position of the portion through which light passes, by the distance from the surface of the substrate to the position of the core. Accordingly, when the device is inserted into the trench, it is possible to make a portion of the device, through which light passes, coincide with a corresponding core of each optical waveguide or optical fiber.

If a micro-positioning stage or the like is used for insertion of a surface-normal optical device into a narrow trench, unnecessary force tends to be imposed on the device, thereby damaging the device.

In addition, the thin and surface-normal active optical device is attached to the support member such as a block; therefore, in addition to reinforcement effect, the entire surface-normal optical device can be subjected to photo processing or the like. Furthermore, if the surface-normal optical device is a liquid crystal device, the device can be coated with an alignment layer or be subjected to rubbing or the like. If a thin and planar chip is attached to a thin glass plate having electrodes and the glass plate is further adhered to a glass block, complicated electric wiring of the planar chip can be connected and extended to the electrodes of the block.

Japanese Unexamined Patent Application, First Publication No. Hei 9-297229 "Production of Filter Type Waveguide" discloses a structure in which a filter to which a block is attached is inserted into a trench which passes across a waveguide device. However, this filter is a passive device such as a wavelength plate and thus is not a surface-normal active optical device having electrodes. In addition, the block attached to the filter is provided for correcting a camber of the filter or making the position of the filter coincide with the position of the trench, rather than for functioning as a support member. In the present invention, owing to the support member, when the surface-normal optical device supported by the supported member reaches the trench and contacts a wall surface of the trench, the device can bend and be easily inserted into a trench without using a positioning marker (which is used in Hei 9-297229 for making the position of the filter coincide with the position of the trench).

S. Kawakami et al., "Vertical Photonics: A New Approach to Integrate Photonic Devices into Optical Fibers", the Proceeding of IEICE, C-I, Vol. J77-C-I, No. 5. pp. 334–339, 1994, discloses a structure in which a liquid crystal device is inserted so as to pass through an optical fiber array provided on a substrate. However, in this structure, the thickness of the device is 600 μm or more; thus, no concept of using a block is disclosed and the object, structure, and function of the above structure differ from those of the present invention.

BRIEF DESCRIPTION OF THE DRAWINGS

FIGS. 2A to 2D are diagrams for explaining a method of forming the electrodes from the substrate surface to the wall surfaces of the trench and the relevant photo processing method, as Example 2 of the first embodiment.

FIGS. 22A to 22D are diagrams showing the state in which two surface-normal optical devices or a liquid crystal device is inserted into a trench in the second embodiment.

FIGS. 23A to 23C are diagrams for explaining the principle related to a liquid crystal rotatable wavelength plate as Example 1 of the second embodiment.

FIGS. 25A to 25C are diagrams for explaining the following processes for manufacturing the liquid crystal rotatable wavelength plate of Example 1.

FIG. 26 is a diagram for explaining a method of making a continuous and complete polarization control device using a liquid crystal rotatable wavelength plate in Example 1.

DESCRIPTION OF THE PREFERRED EMBODIMENTS

Hereinafter, embodiments according to the present invention will be explained in detail with reference to the drawings. In the following explanations, the present invention is classified into two representative embodiments, and specific examples will be included in each embodiment.
First embodiment

EXAMPLE 1

Figure 1A:
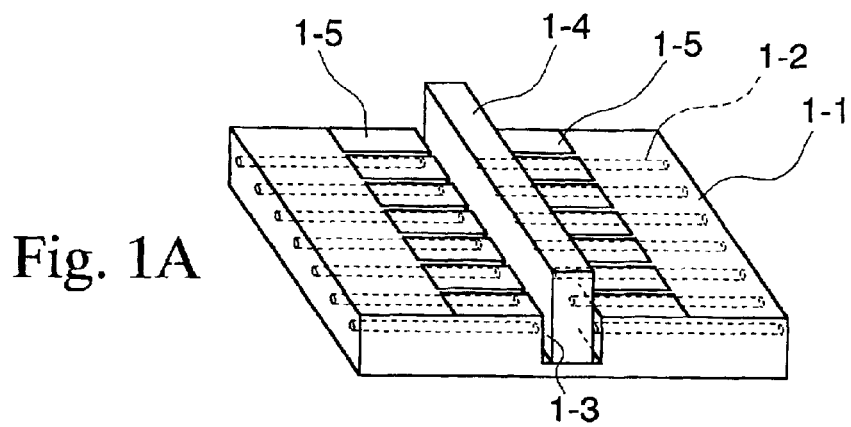
FIGS. 1A to 1D are diagrams showing the general structure of a waveguide-type optical device as Example 1 of the first embodiment according to the present invention.
Figure 1B:
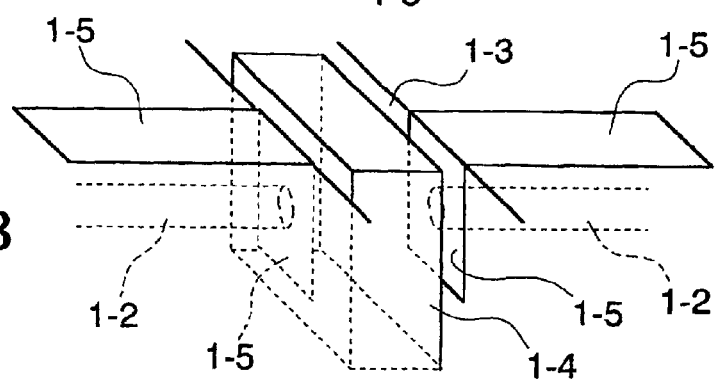
Figure 1C:
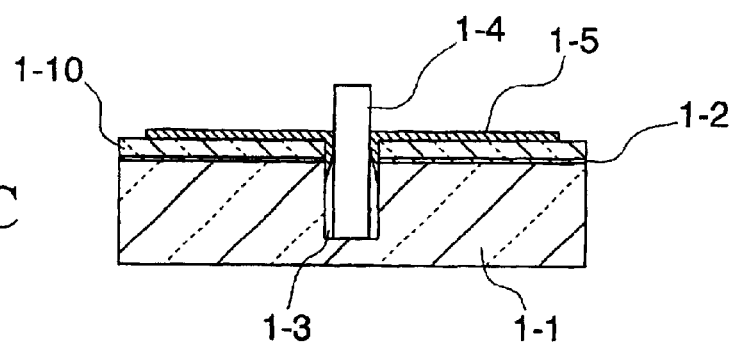

FIGS. 1A to 1C are diagrams showing the general structure of a waveguide-type optical device as Example 1 of the first embodiment. FIG. 1A is a perspective view, FIG. 1B is an enlarged view of a distinctive portion in FIG. 1A, and FIG. 1C is an enlarged cross-sectional view of a distinctive portion in FIG. 1A.

In FIGS. 1A to 1C, reference numeral 1-1 indicates a substrate for optical waveguides (called a "waveguide substrate" hereinbelow; for example, a quartz or Si substrate on which optical waveguides made of glass or polymeric material are formed, or a substrate on which optical fibers are fixed), reference numeral 1-2 indicates a core of each optical waveguide or fiber (called an "optical-waveguide core" hereinbelow), reference numeral 1-3 indicates a trench formed perpendicularly to the direction of the optical-waveguide cores, and reference numeral 1-4 indicates a surface-normal optical device or material inserted into the trench 1-3, such as a surface emission laser, a surface-normal detector, a surface-normal optical modulator, or the like. Reference numeral 1-5 indicates a pair of electrodes, each formed from the surface of the waveguide substrate to one of the side walls of the trench 1-3.

As shown in FIGS. 1A to 1C, in the waveguide-type optical device in Example 1, the optical-waveguide cores 1-2 (abbreviated to "waveguide cores" hereinbelow) are arranged and fixed in parallel on the waveguide substrate 1-1, and the trench 1-3 is formed perpendicularly to the waveguide substrate 1-1. Each pair of electrodes 1-5 is formed from the surface of the waveguide substrate 1-1 to both wall surfaces of the trench 1-3. Here, as shown in FIG. 1C, the "surface of the substrate" generally indicates or includes the surface of an upper portion 1-10 of the waveguide core 1-2.

The electrodes 1-5 are suitably patterned for each waveguide core 1-2. When the area of the electrodes 1-5 overlaps the area of the waveguide core, the electrodes ire made of transparent material. Conversely, when the area of the electrodes 1-5 does not overlap the area of the waveguide core, the electrodes are made of metal. Generally, when a surface-normal optical device is mounted on the waveguide, the device is arranged in parallel to the waveguide, and incident light is output by using a mirror for changing the direction of light by 45°. In this case, the electrodes are formed on the surface of the waveguide.

In this Example 1, the electrodes of the surface-normal optical device 1-4 are obtained via the electrodes 1-5 which are formed on the waveguide surface and the wall surfaces of the trench 1-3. Therefore, the vertical electrodes can be converted and obtained as horizontal electrodes for the surface-normal optical device 1-4.

The trench 1-3 may be filled with (i) a material having an electro-optic effect, for example, a liquid crystal, or (ii) a material having a thermo-optical effect. In addition, a surface-normal semiconductor device having a light-emitting, receiving, or modulating function may be inserted in the trench 1-3.

The voltage and current are applied to the surface-normal optical device (or material) 1-4 via the waveguide surface portions and trench wall portions of the electrodes 1-5.

Figure 1D:
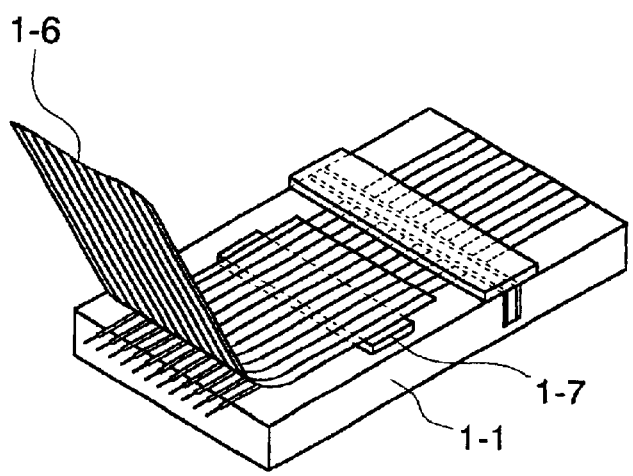

As shown in FIG. 1D, highly-precise electrodes can be connected to the waveguide substrate 1-1 via a flexible substrate (or cable) 1-6 and an anisotropic conductive rubber 1-7. Instead of connection of the flexible substrate, wire bonding may be performed. Accordingly, precise electrodes formed on the wall surface of the trench can be extended onto the substrate surface in a convenient form.

The width of the narrow trench 1-3 is 300 $\mu$m or less. Therefore, a very thin vertical cavity surface emitting laser, surface-normal optical modulator, surface-normal detector, or the like are suitable as the surface-normal optical device 1-4.

EXAMPLE 2

Example 2 of the present embodiment relates to a method of forming each pair of electrodes from the substrate surface to the wall surfaces of the trench (as shown in FIGS. 1A to 1C), and the photo processing method of the electrodes. These methods will be explained with reference to FIGS. 2A to 4C.

FIGS. 2A to 2D are diagrams for explaining a method of forming the electrodes and the relevant photo processing method. FIG. 2A shows a method of forming a trench in the waveguides by using a dicing saw machine. FIGS. 2B and 2C show a method of forming the electrodes on the wall surfaces of the trench by a sputtering or CVD (chemical vapor deposition) method, where the resistance between the side faces of the trench is simultaneously measured. FIG. 2D shows a method of forming and patterning the electrodes on the waveguides.

Figure 3A:
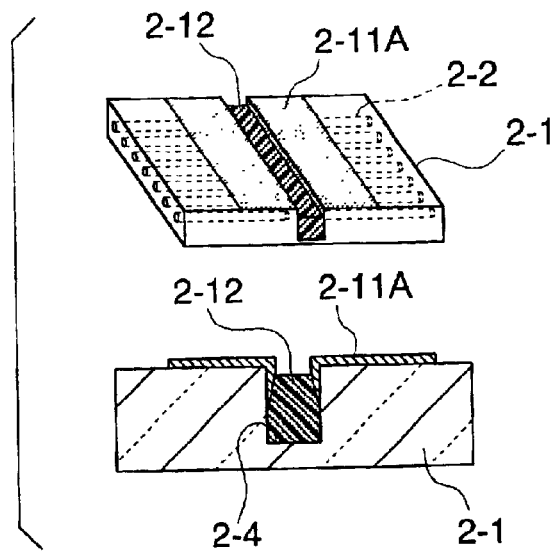
FIGS. 3A to 3D are diagrams, which show the processes which follow the process shown by FIG. 2D, for explaining the method of forming the electrodes from the substrate surface to the wall surfaces of the trench and the relevant photo processing method, as Example 2 of the first embodiment.
Figure 3B:
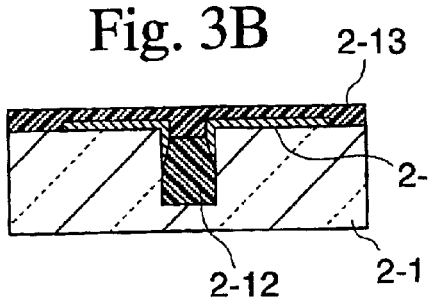
Figure 3C:
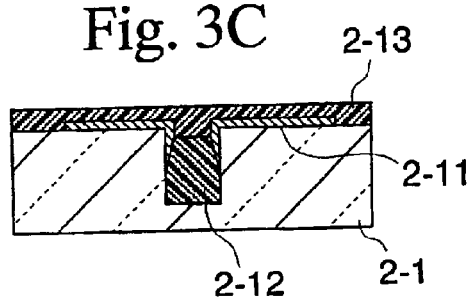
Figure 3D:
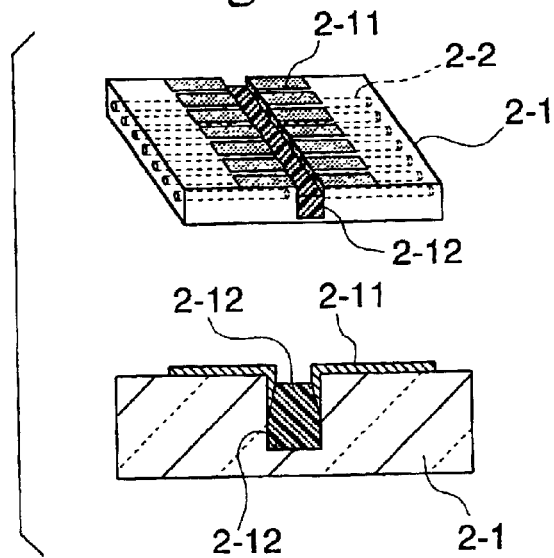

FIG. 3A is a diagram showing a process of filling the trench with a polymeric material, this process following the process shown in FIG. 2D. FIG. 3B is a diagram showing a coating process using a resist. FIG. 3C is a diagram showing a process of performing photo processing of the resist according to the waveguide pattern. FIG. 3D is a diagram showing a process of etching the electrodes on the waveguide surfaces.

Figure 4A:
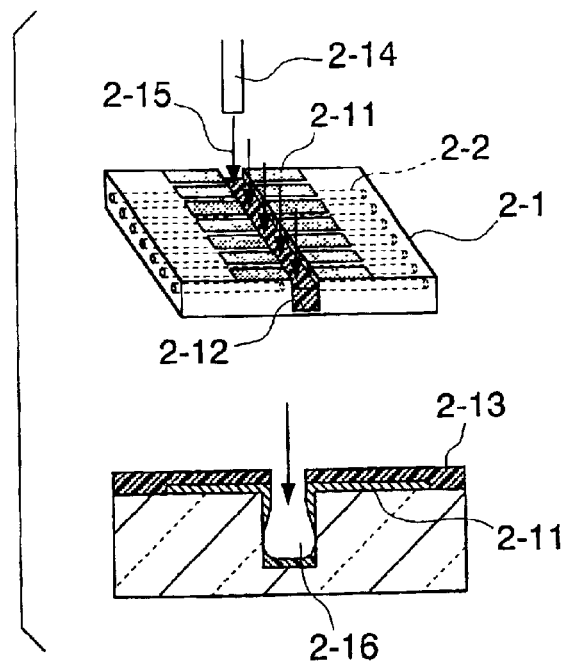
FIGS. 4A to 4C are diagrams, which show the processes which follow the process shown by FIG. 3D, for explaining the method of forming the electrodes from the substrate surface to the wall surfaces of the trench and the relevant photo processing method, as Example 2 of the first embodiment.
Figure 4B:
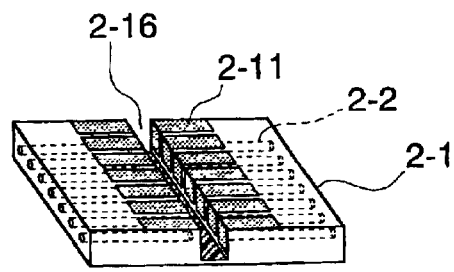
Figure 4C:
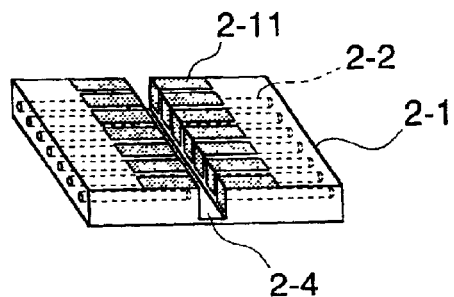

FIG. 4A is a diagram showing a process of removing polymeric material so as to make a space by using a YAG laser, this process following the process shown in FIG. 31). FIG. 4B is a diagram showing a process of etching a transparent conductive film (here, ITO (Indium Tin Oxide) film) formed on the wall surfaces of the trench. FIG. 4C is a diagram showing a process of removing polymeric material in the vicinity of the bottom of the trench.

In FIGS. 2A to 4C, reference numeral 2-1 indicates a substrate for optical waveguides (called a "waveguide substrate" hereinbelow, for example, a quartz or Si substrate on which optical waveguides made of glass or polymeric material are formed, or a substrate on which optical fibers are fixed), reference numeral 2-2 indicates a core of each waveguide or fiber (called a "waveguide core" hereinbelow), reference numeral 2-3 indicates a blade of the dicing saw machine, and reference numeral 2-4 indicates a trench formed using the dicing saw machine. The trench may be formed by etching.

Reference numeral 2-5 indicates a sputtering target, reference numeral 2-6 indicates plasma, reference numeral 2-7 indicates an insulating mask, reference numeral 2-8 indicates a nozzle for CVD, reference numeral 2-9 indicates a stream of gas, reference numeral 2-10 indicates a multimeter for measuring the resistance, reference numeral 2-11 indicates a pair of electrodes formed from the substrate surface to both wall surfaces of the trench, reference numeral 2-12 indicates polymeric material for filling the trench, reference numeral 2-13 indicates a resist, reference numeral 2-14 indicates a laser emitting device, reference numeral 2-15 indicates a laser beam, and reference numeral 2-16 indicates a hole formed by removing the polymeric material using the laser beam.

Various methods can be used for forming an electrode film 2-11A in Example 2, for example, vacuum evaporation, sputtering, or CVD may be used. In the vacuum evaporation, molecules, output from a target, travel linearly and reach the waveguide substrate 2-1. Therefore, it is difficult to perform evaporation inside the trench 2-4. In the sputtering or CVD, some molecules do not travel linearly and they enter the trench 2-4, so that a film is formed on the wall surfaces of the trench 2-4.

Although such a film should be formed on each wall surface of the trench 2-4, the bottom of the trench 2-4 should be insulated. Therefore, an electrode film 2-11A is formed on a dummy substrate having a similar trench while an insulating mask 2-7 is placed on the substrate and the resistance is measured (refer to FIGS. 2B to 2D). The process of forming the film is stopped when the resistance reaches a specific low level.

Below, the method of dividing the electrode film, formed as explained above, into a plurality of electrodes respectively corresponding to the waveguides, will be explained.

In this Example 2, both the laser processing and etching are used. First, the trench 2-4 is formed on a waveguide substrate (made of quartz or Si) by using a dicing saw machine or by etching. The trench 2-4 is then filled with the polymeric material (here, coal tar) 2-12 (see FIG. 3A). The polymeric material may be resist.

A resist 2-13 (normal type) is further coated by spin coating (see FIG. 3B), and the resist is subjected to photo processing (see FIG. 3C). Then, the ITO (Indium Ti Oxide) film, which is present on the substrate, is etched (see FIG. 3D). This etching process may be simultaneously performed when the ITO film of the wall surfaces of the trench 2-4 is later processed. However, generally, the ratio of the thickness of the ITO film formed on the substrate to the thickness of the ITO film formed on the wall surfaces of the trench 2-4 is approximately 10:1; that is, both thicknesses are considerably different. Therefore, preferably, the ITO film on the substrate surface is etched first.

Next, the polymeric material (i.e., coal tar) corresponding to the target portion for etching the ITO film is removed by using the YAG laser emitting device 2-14 (see FIG. 4A). The substrate is then dipped into an etchant for ITO (e.g., ferric chloride or hydrochloric acid) (see FIG. 4B). FIG. 4C shows the state immediately after the polymeric material 2-12 (i.e., coal tar), present on the bottom of the trench 2-4, is removed.

In this Example 2, a YAG laser is used. In the patterning using the YAG laser, the polymeric material is heated and melted. In the case of employing a $CO_2$ laser, heat is also used. Preferably, an excimer laser is used, and in this case, the polymeric material can be sublimated and precise processing on the order of 10 μm can be performed.

In addition, the ITO film on the wall surface of the trench 2-4 can be cut and patterned by directly emitting a YAG laser beam onto the film. That is, the use of the YAG laser is not limited to sublimating the resist inside the trench 2-4, and the following) method is also possible: patterning of the ITO film on the substrate surface is first performed, the polymeric material (i.e., coal tar) or the resist in the trench 2-4 is removed, and the area from the surface of the substrate to the wall surface of the trench 2-4 is irradiated by a YAG laser beam so as to cut and pattern the ITO. In this case, etching is unnecessary, and precise patterning can be performed.

Therefore, according to the combination of laser processing and etching as explained above, patterning of the electrodes on the wall surfaces of the trench 2-4 can be performed.

In the present embodiment, the patterning of the electrodes, which respectively correspond to the waveguides, is performed at both sides of the trench; however, the patterning may be performed at only one side, and the non-patterned electrode film may be used as an earth electrode or the like.

EXAMPLE 3

Example 3 of the first embodiment relates to a method of aligning an alignment layer which is used for realizing parallel alignment of liquid crystal in a trench as shown in FIGS. 1A to 1C. The method will be explained with reference to FIGS. 5A to 7B.

Figure 5A:
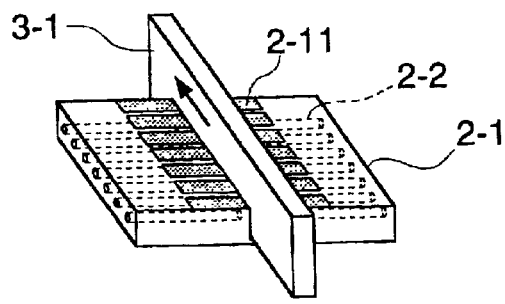
FIGS. 5A to 5B are diagrams for explaining a method of aligning an alignment layer, as Example 3 of the first embodiment.
Figure 5B:
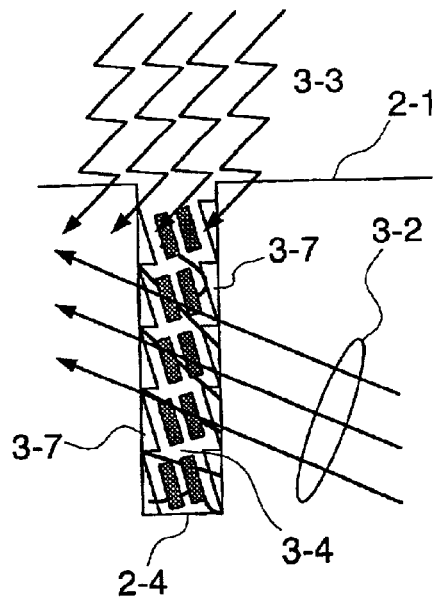

FIGS. 5A to 5B are diagrams for explaining a method of aligning an alignment layer, more specifically, an alignment layer formed on the wall surface of the trench. In the method, after a rubbing process, the trench is filled with a polymer-stabilized liquid crystal while a magnetic field is applied, and the liquid crystal is then irradiated by ultraviolet light.

Figure 6A:
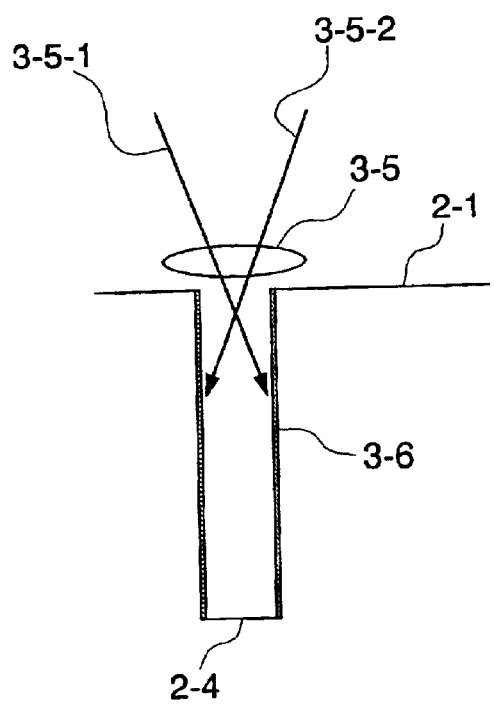
FIGS. 6A to 6B are diagrams for explaining a method of aligning an alignment layer formed on the wall surface of the trench in Example 3.
Figure 6B:
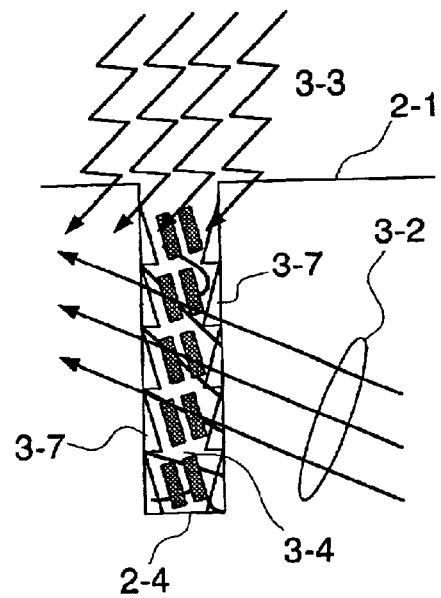

FIGS. 6A to 6B are diagrams for explaining another method of aligning an alignment layer which is formed on the wall surface of the trench. In this method, after the alignment by ion radiation, the trench is filled with a polymer-stabilized liquid crystal while a magnetic field is applied, and the liquid crystal is then irradiated by ultraviolet light.

Figure 7A:
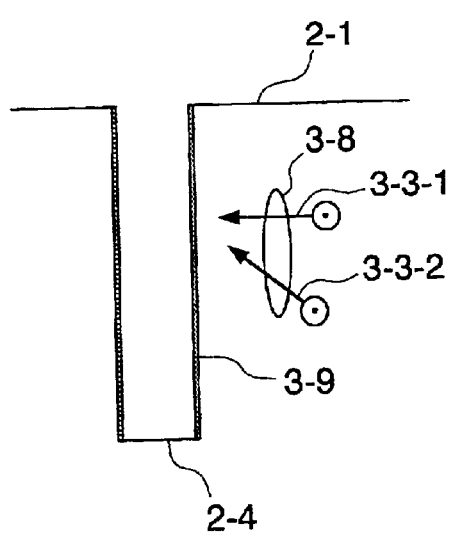
FIGS. 7A to 7B are diagrams for explaining another method of aligning an alignment layer formed on the wall surface of the trench in Example 3.
Figure 7B:
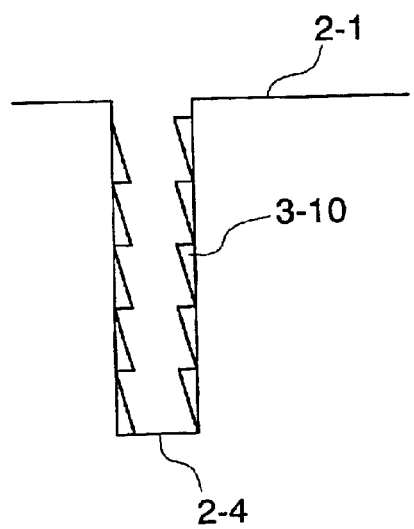

FIGS. 7A to 7B are diagrams for explaining another method of aligning an alignment layer formed on the wall surface of the trench. This method employs photo-alignment.

In FIGS. 5A to 7B, reference numeral 3-1 indicates a rubbing tape (i.e., polymer film) inserted into the trench 2-4, reference numeral 3-2 indicates a magnetic field, reference numeral 3-3 indicates ultraviolet light, reference numeral 3-4 indicates a polymer-stabilized liquid crystal in which a target liquid-crystal portion is irradiated by the ultraviolet light, reference numeral 3-5 (i.e., 3-5-1 and 3-5-2) indicates emitted ion beams, reference numeral 3-6 indicates an alignment layer formed on the wall surface of the trench 2-4, reference numeral 3-7 indicates an alignment layer which is aligned by irradiation with an ion beam, reference numeral 3-8 indicates first and second polarized ultraviolet light, reference numeral 3-9 indicates a photo-alignment layer, and reference numeral 3-10 indicates an alignment layer aligned by irradiation with ultraviolet light.

The method of aligning an alignment layer in Example 3 will be explained below.

(1) An alignment layer made of polyimide or polyvinyl alcohol is formed on the substrate and in the trench, where transparent electrodes (i.e., ITO electrodes) are formed on the wall surfaces of the trench 2-4.

The rubbing tape 3-1 (i.e., polymer film) is inserted into the trench 2-4 (see FIG. 5A). This rubbing tape 3-1, having a width thinner than the width of the trench 2-4 by a few μm, may be a polyester or polyimide film. This rubbing tape 3-1 is pulled in a single direction so as to rub the alignment layer in a direction in parallel to the trench.

Generally, the width of the trench is approximately 30 to 100 μm. The films on the market, which have such a width, may by made of polyester or polyimide. The rubbing direction is parallel to the surface of the substrate, and the wall surfaces of the trench, between which the liquid crystal is inserted,. are subjected to the rubbing in the same direction.

Regarding normal liquid crystal displays, if two rubbed glass substrates are made to face each other in the same rubbing direction, the pre-tilt angles of the substrates agree with each other. Accordingly, domains are produced and uniform alignment cannot be obtained. In order to prevent such a state in the display, the substrates are made to face each other in a manner such that the rubbing directions of the substrates are in the anti-parallel state. However, regarding the films formed in the trench 2-4, such an arrangement of the rubbing direction is impossible.

Therefore, as shown in FIG. 5B, a few percent of (low molecular) UV cured resin is added to a nematic liquid crystal to be inserted into the trench 2-4, so as to obtain uniform alignment. The magnetic field 3-2 is then applied so as to produce a pre-tilt angle. Under this state, the ultraviolet light 3-3 is emitted on the polymer so as to stabilize the polymer (i.e., this liquid crystal corresponds to the polymer-stabilized liquid crystal 3-4).

Accordingly, when no voltage is applied, the molecules of the liquid crystal slightly incline with respect to the trench, and the same state as that in which two alignment layers are arranged in the anti-parallel state can be obtained, thereby realizing uniform alignment. Conversely, when voltage is applied, the molecules of the liquid crystal are aligned perpendicularly to the trench 2-4. Accordingly, a variable phase shifter can be realized, thereby controlling the polarization state.

Preferably, an alignment layer is also formed on a glass substrate which functions as a cover plate, and this film is also subjected to the rubbing in the direction of the trench. In this case, much more uniform alignment can be obtained.

(2) The substrate and the trench 2-4 which has transparent electrodes on its wall surfaces are coated with an alignment layer made of polyimide or polyvinyl alcohol, and then heat curing is performed. This substrate is put into an ion irradiation apparatus. The substrate is first inclined leftward, and an ion beam 3-5-1 is emitted (see FIG. 6A). The emitted ions are of Ar, Kr, N$_2$, or the like.

The substrate is then inclined rightward, and an ion beam 3-5-2 is emitted (see FIG. 6A). The incident angle of the ion radiation with respect to the trench 2-4 is small so as to input the ion beam into the trench, and the pre-tilt angle depends on the incident angle. Accordingly, the polymer-stabilized liquid crystal (i.e., liquid crystal alignment layer) is in an aligned state.

However, the pre-tilt angle is uniform in the trench 2-4; thus, the alignment is ill parallel in the trench. Accordingly, a problem similar to that explained above (see (1)) occurs. Therefore, as explained above, the magnetic field 3-2 is applied to the polymer-stabilized liquid crystal, and the ultraviolet light 3-3 is then emitted, so that the liquid crystal is in a preferable parallel-aligned state (see FIG. 6B).

(3) The substrate and the inside of the trench 2-4 (in which transparent electrodes are formed on its wall surfaces) are coated with the photo-alignment layer 3-9 (FIG. 7A). Here, the film. 3-9 is a commercially available photo-alignment layer.

The photo-alignment layer 3-9 is an alignment layer obtained by adding a material which is activated by ultraviolet light to a normal polyimide alignment layer. Recently, photo-alignment layers are used for manufacturing liquid crystal panels without performing rubbing.

Various kinds of photo-aligning techniques and materials have been developed. Generally, irradiation by ultraviolet light is performed two times: in the first irradiation the alignment layer is aligned in the polarization direction of the emitted ultraviolet light, and in the second irradiation, inclined ultraviolet light is emitted so as to obtain a pre-tilt angle.

In order to photo-align the wall surfaces of the trench 2-4, as shown in FIG. 7A, ultraviolet light 3-3-1 (whose polarization direction is perpendicular to the plane of the figure) is emitted from the side of the substrate, so as to determine the direction of the alignment. In this case, the direction of the aligned liquid crystal agrees with the direction of the polarization of the emitted ultraviolet light 3-3-1. Therefore, the direction of a polarizer for determining the polarization direction of the ultraviolet light is suitably adjusted so as to obtain the required alignment.

Next, the second ultraviolet light 3-3-2 (the polarization direction is also perpendicular to the plane of the figure (i.e., FIG. 7A)) is emitted, where the direction of the ultraviolet light 3-3-2 is slightly inclined with respect to the trench 2-4. This ultraviolet light 3-3-2 is emitted so as to provide a pre-tilt angle to the alignment layer. The pre-tilt angle can be varied by controlling the incident angle.

As explained above, when a photo-alignment layer is formed on each of two glass substrates which are used for a normal display, the substrates, each having a pre-tilt angle, are made to face each other in a manner such that the directions of the pre-tilt angles of both substrates are in the anti-parallel state, thereby producing the anti-parallel alignment directions.

Here, both the front, and back faces of the alignment layer on each wall surface of the trench 2-4 are exposed to the ultraviolet light. That is, when the inclined ultraviolet light beams are simultaneously emitted towards the right and left wall surfaces of the trench, the pre-tilt angles of both sides are opposed to each other, thereby producing a state similar to that obtained by performing anti-parallel rubbing. Therefore, no multi-domain state is produced, thereby obtaining an alignment layer 3-10 which is obtained by utltraviolet-light irradiation and which has uniform parallel alignment (refer to FIG. 7B).

When the trench 2-4 having the above-explained alignment layer is filled with a nematic or ferroelectric liquid crystal, the alignment in this case is similar to that of the sandwich cell in which the liquid crystal is put between two glass substrates which have been subjected to the rubbing. Therefore, the phase and polarization state can be controlled also in this case.

EXAMPLE 4

FIGS. 8A to 8E are diagrams for showing the processes for manufacturing a variable attenuator and a phase and polarization controller in Example 4 for the waveguide-type optical device.

In the figures, reference numeral 4-1 indicates a waveguide substrate similar to that in Example 2, which has electrodes formed on the surface of the substrate and in the trench, reference numeral 4-2 indicates a polymer network liquid crystal with which the trench is filled, reference numeral 4-3 indicates a glass substrate (i.e., cover glass), reference numeral 4-4 indicates an alignment layer as formed and aligned in the above-explained Example 3, reference numeral 4-5 indicates a UV-cured polymer network liquid crystal, reference numeral 4-6 indicates ultraviolet light used for UV curing, reference numeral 4-7 indicates a nematic liquid crystal, and reference numeral 4-8 indicates a glass substrate.

Figure 8A:
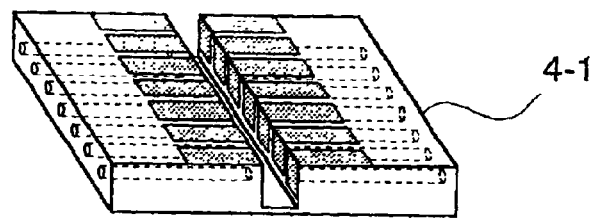
FIGS. 8A to 8E are diagrams for showing the processes for manufacturing a variable attenuator and a phase and polarization controller as Example 3 of the first embodiment.
Figure 8B:
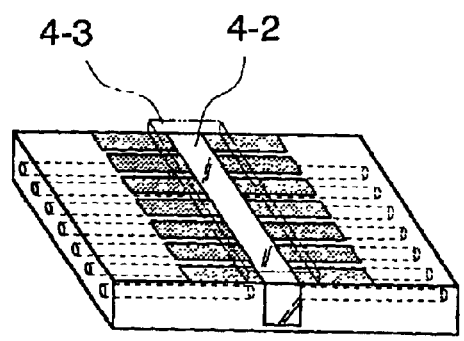
Figure 8D:
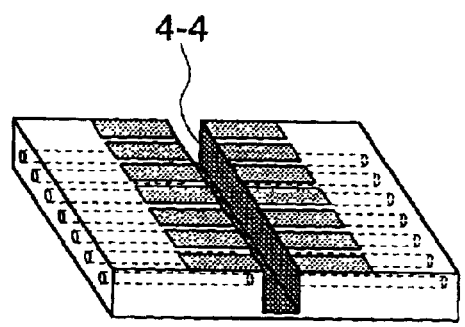
Figure 8C:
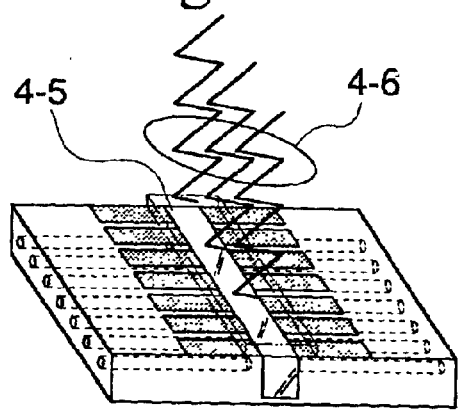

The variable attenuator in this Example 4 is obtained by the processes shown by FIG. 8A→FIG. 8B→FIG. 8C. That is, the trench 2-4, in which ITO electrodes are formed on the wall surfaces, is filled with the polymer network liquid crystal 4-2 (or a polymer-dispersed liquid crystal), and the glass substrate (or cover glass) 4-3 is put on the trench. Then, UV curing using the ultraviolet light 4-6 is performed, thereby obtaining the polymer network liquid crystal 4-5.

In this variable optical attenuator, the radiation loss can be adjusted from 1 dB to approximately 20 dB by applying a voltage of a few V between the electrodes. Accordingly, a polarization-insensitive variable optical attenuator can be very easily realized.

Instead of the polymer network liquid crystal, a polymer-dispersed liquid crystal may be used for realizing a similar variable attenuator. In this case, generally, the diameter of the particles of the liquid crystal is 0.5 $\mu$m or more.

In the case of using the polymer-dispersed liquid crystal, if the intensity of the ultraviolet light is increased, particles having a small diameter of 150 nm or less are obtained. This liquid crystal is called a "nanosize droplet liquid crystal", which is transparent regardless of whether the voltage is applied. When voltage is applied to this liquid crystal under the polarization-insensitive condition, the refractive index changes. If the trench having transparent electrodes is filled with this kind of liquid crystal, a variable phase shifter is realized instead of the variable attenuator.

The variable optical attenuator may be realized by filling the trench with a dynamic scattering liquid crystal, a cholesteric-nematic phase transition type liquid crystal, or a photochromic material.

Figure 8E:
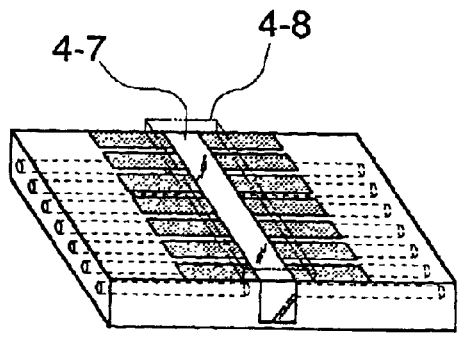

The phase and polarization controller as Example 4 of the waveguide-type optical device is obtained by the processes shown FIG. 8A→FIG. 8D→FIG. 8E. As shown in the figures, an alignment layer is formed on each wall surface of the trench 2-4 of the waveguide substrate 4-1, where ITO electrodes are formed on the wall surface. The space between the alignment layers on both wall surfaces is filled with the nematic liquid crystal 4-7. The glass substrate which functions as a cover is then put on the trench.

According to the above process, the liquid crystal is aligned in the alignment direction of the alignment layer. When voltage is applied to this liquid crystal, the alignment of the molecules of the liquid crystal is changed from a parallel alignment with respect to the trench to a perpendicular alignment, so that the refractive index is changed. Accordingly, a variable wavelength plate is obtained, and thus a device for controlling the polarization and phase can be realized.

EXAMPLE 5

Example 5 relates to the method for inserting a surface-normal optical device into a trench which is formed in the waveguides and which has electrodes, and electrically mounting the surface-normal optical device by extending the electrodes of the device towards the surface of the substrate. The surface-normal optical device may be a vertical cavity surface emitting laser, a surface-normal optical modulator, or a surface-normal detector.

Figure 9A:
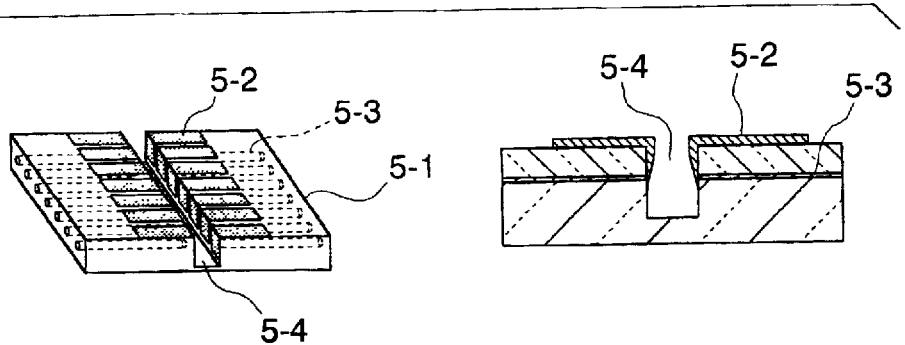
FIGS. 9A to 9E are diagrams for showing the processes for mounting a surface-normal optical device as Example 5 of the first embodiment.
Figure 9B:
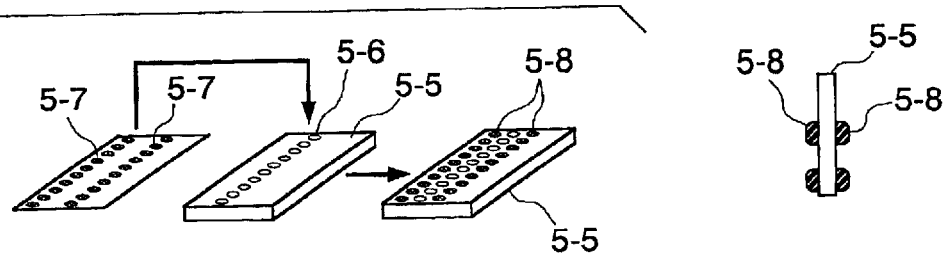
Figure 9C:
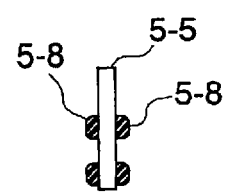
Figure 9D:
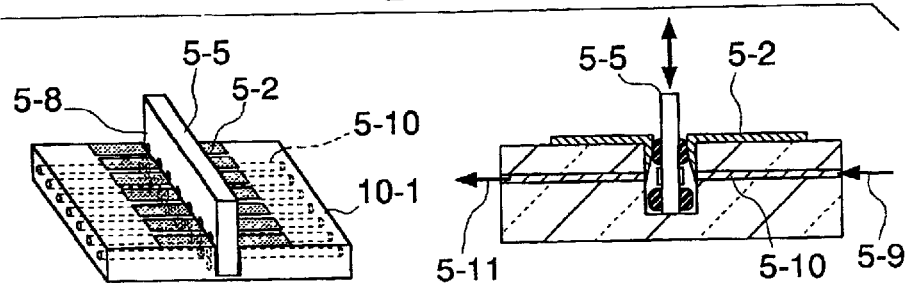
Figure 9E:
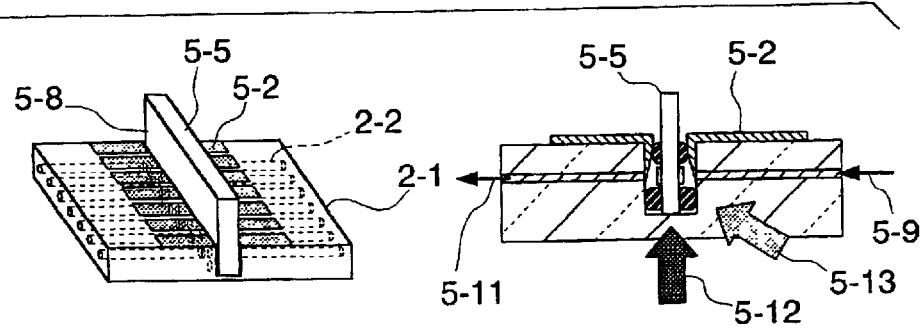

This method will be explained with reference to FIGS. 9A to 9E, which show the processes of mounting such a surface-normal optical device in Example 5. FIG. 9A shows a waveguide substrate having a trench whose wall surfaces have electrodes. FIG. 9B is a diagram for explaining the process of patterning solder on the surface-normal optical device by bump transfer or photolithography. FIG. 9C is a diagram showing the state in which transferred bumps are present on the front and back faces of the surface-normal optical device. FIG. 9D is a diagram for explaining the adjustment of the device by making light pass through the device. FIG. 9E is a diagram for explaining the process of heating and fixing the device while ultrasonic waves are applied.

In FIGS. 9A to 9E, reference numeral 5-1 indicates a waveguide substrate having a trench in which electrodes are formed, as explained in Example 2. Reference numeral 5-2 indicates electrodes formed from the substrate surface to the wall surfaces of the trench, reference numeral 5-3 indicates a waveguide, and reference numeral 5-4 indicates the trench formed in the waveguide substrate. Reference numeral 5-5 indicates a surface-normal optical device such as a vertical cavity surface emitting laser, a surface-normal optical modulator, or a surface-normal detector, reference numeral 5-6 indicates a light-emitting, receiving, or modulating portion or the like of the surface-normal optical device, reference numeral 5-7 indicates bumps to be transferred, and reference numeral 5-8 indicates solder portions mounted on the surface-normal optical device. Reference numeral 5-9 indicates incident light, reference numeral 5-10 indicates a waveguide core, reference numeral 5-11 indicates output (or transmitted) light, reference numeral 5-12 indicates applied heat, and reference numeral 5-13 indicates applied ultrasonic waves.

As shown in FIGS. 9A to 9E, the surface-normal optical device in Example 5 is mounted as follows:

(1) The waveguide substrate 5-1 having the vertical trench 5-4 (in which the electrodes 5-2 are formed) is prepared as explained in Example 2. The electrodes 5-2 may be made of ITO (which is transparent), or the portion (of the electrodes) which faces the optical path may be made of ITO and the other portion may be made of metal.

(2) Thick solder 5-8 is deposited on the surface-normal optical device. The deposition of the solder 5-8 may be performed by mask deposition or bump transfer (see reference numeral 5-7). On the other hand, the deposited solder may be patterned by photolithography or may be subjected to lift-off processing. In consideration of adhesiveness with glass, solder obtained by adding Zn, Sb, AlTi, Si, Cu, or the like to normal lead-tin solder is preferable used. Such solder is commercially available and is preferably used in an ultrasonic environment.

(3) Solder 5-8 is also deposited on the back face of the surface-normal optical device.

(4) The surface-normal optical device is inserted into the trench, and the adjustment of the device is performed by using light which passes through the device, and then heat is applied to the device so as to connect the solder 5-8 to the electrodes formed on the wall surfaces. In this process, in order to improve the adhesiveness with glass, ultrasonic waves 5-13 are preferably applied, thereby obtaining a preferable contact state between the surface-normal optical device 5-5 and the glass trench. Instead of using the ultrasonic waves 5-13, the connection with solder may be performed in the atmosphere of an inert gas.

In order to improve the adhesiveness, metal electrodes are preferably formed oil the wall surfaces of the trench 5-4 instead of transparent electrodes. Preferably, the metal electrodes have the same components as those of the solder.

(5) According to the above processes, the electrodes for the surface-normal optical device 5-5 can be extended to the substrate surface via the electrodes formed from the wall surfaces of the trench to the substrate surface. In addition, the surface-normal optical device 5-5 is connected to the electrodes on both sides of the trench, so that the surface-normal optical device is very stably fixed.

In the above example, the surface-normal optical device is connected to the electrodes on both sides of the trench. However, the electrodes may be formed on only one of the wall surfaces and one of the faces (front or back) of the surface-normal optical device 5-5 may be adhesively connected to the electrodes.

EXAMPLE 6

In the above-explained Example 3 or the like, the trench is filled with a liquid crystal. In this Example 6, a device in which the trench is filled with a material having the electro-optic or thermo-optical effect will be explained with reference to FIGS. 10A to 10C.

Figure 10A:
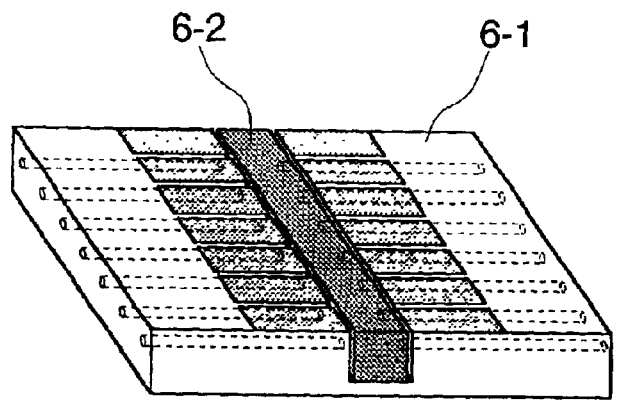
FIGS. 10A to 10C are diagrams showing Example 6 of the first embodiment, in which the trench is filled with a polymeric material providing a large thermo-optical effect.
Figure 10B:
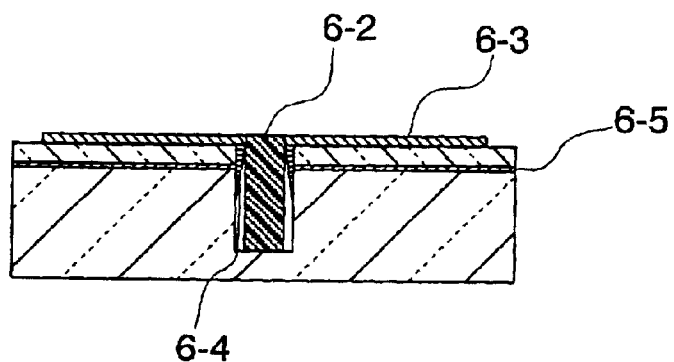
Figure 10C:
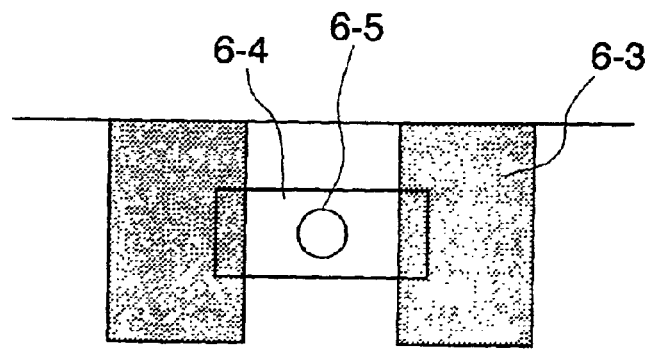

FIGS. 10A to 10C are diagrams showing an example in which the trench is filled with a polymeric material providing a large thermo-optical effect. FIG. 10A shows the waveguide substrate, which has electrodes as formed in the above Example 2 and in which the trench is filled with the polymeric material providing the thermo-optical effect. FIG. 10B shows a cross-sectional view of the device of Example 6. FIG. 10C shows an electrode pattern formed on the surfaces of the trench.

In these figures, reference numeral 6-1 indicates a waveguide substrate as formed in the above-explained Example 2, reference numeral 6-2 indicates a polymeric material with which the trench is filled, reference numeral 6-3 indicates metal electrodes formed from the substrate surface to the wall surfaces of the trench, reference numeral 6-4 indicates a transparent heater electrode, formed on the wall surfaces of the trench, for surrounding a waveguide core and connecting the metal electrodes at either side of the waveguide core, and reference numeral 6-5 indicates the waveguide core.

The polymeric material with which the trench is filled is, for example, polyimide or acrylic, which is transparent within a 1.55 $\mu$m wavelength band.

Generally, the changes in the refractive index of polymeric materials according to temperature changes is on the order of ten times that of glass. As shown in FIG. 10C, the metal electrodes 6-3 are formed on the substrate surface and the wall surfaces of the trench in a manner such that each waveguide is not covered with the electrodes and the core 6-5 of the waveguide is positioned between the electrodes. The transparent heater electrode 6-4 surrounds the waveguide core 6-5 in a manner such that the transparent heater electrode 6-4 connects the metal electrodes 6-3 at either side of the core.

The transparent heater electrode 6-4, which has a resistance higher than that of the metal electrodes 6-3, functions as a heater. When current is supplied to the metal electrodes 6-3 between which the waveguide is placed, the transparent heater electrode 6-4 is heated, thereby changing the refractive index of the polymeric material.

In conventional switching devices, optical attenuators, and variable phase shifters which use the thermo-optical effect of the glass or polymeric material, a heater is formed on the waveguide surface and thus the distance between the heater and the waveguide is relatively long, so that large amounts of electric power are necessary. However, in the structure of this Example 6, a heater is directly attached to the waveguide core; thus, the temperature of the polymeric material can be increased by very small amounts of electric power, thereby obtaining a large thermo-optical effect.

EXAMPLE 7

Generally, quartz waveguides are formed on an Si substrate. However, Si substrates are conductive; therefore, when a deep trench is formed and electrodes are formed on the wall surfaces of the trench (as in the present invention), the trench may reach the Si portion and electricity may be conducted between the Si portion and the electrodes. In order to prevent such a situation, an insulating layer may be formed after the trench is formed in the waveguides on the Si substrate. This method will be explained with reference to FIGS. 11A and 11B.

Figure 11A:
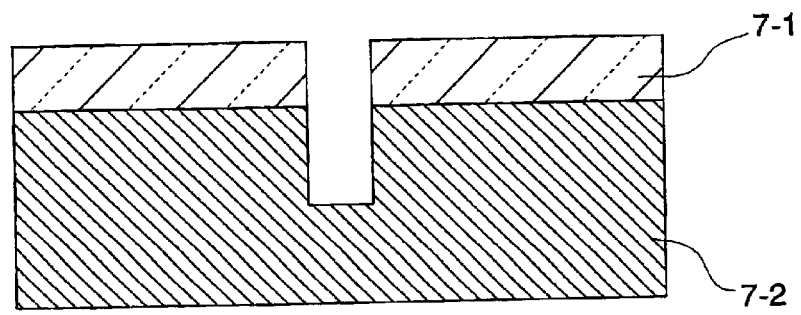
FIGS. 11A and 11B are diagrams for explaining the method of forming an insulating layer at the trench in the waveguides on the Si substrate, as Example 7 of the first embodiment.
Figure 11B:
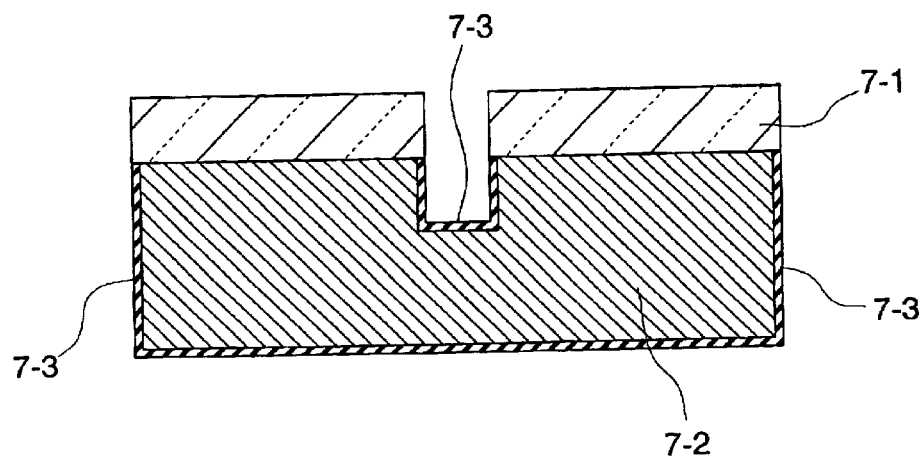

FIGS. 11A and 11B are diagrams for explaining the method of forming an insulating layer at the trench in the waveguides on the Si substrate in Example 7. FIG. 11A is a cross-sectional view showing the trench formed on an Si substrate. FIG. 11B is a cross-sectional view showing a state in which an SiO$_2$ layer is formed on the relevant Si surface by using the thermal oxidation method.

In these figures, reference numeral 7-1 indicates a glass waveguide formed on an Si substrate, reference numeral 7-2 indicates the Si substrate, and reference numeral 7-3 indicates an SiO$_2$ layer formed by thermal oxidation.

After a trench is formed through the glass waveguide 7-1 on the Si substrate, the substrate is put into an electric furnace in a water vapor atmosphere and thermal oxidation at 1100° C. is performed. Accordingly, the SiO$_2$ layer 7-3 as an insulating layer is formed on the surface of the Si trench, so that the above-explained problem in which electricity is conducted between the electrodes and the Si substrate is solved.

According to the waveguides formed on the Si substrate in this Example 7, the electrodes patterned on the wall surfaces of the trench can be obtained by the processes similar to those of Example 2.

EXAMPLE 8

In the above example 6, the method of inserting a polymeric material, having a thermo-optical effect, into the trench so as to obtain a phase shifter was explained. In this Example 8, transparent ceramics having an electro-optic effect are inserted into the trench so as to obtain an optical attenuator.

Here, PLZT is used as the transparent ceramic having an electro-optic effect. Depending on its composition, PLZT has various effects such as an electro-optic effect, electro-optic scattering effect, electrostriction effect, or the like. In the present example, a PLZT plate having an electro-optic scattering effect is used. This PLZT plate, having a thickness of approximately 100 $\mu$m, is inserted into a trench (formed as in the above-explained Example 2) in which transparent electrodes are patterned and formed.

In this structure, a gap of a few $\mu$m is present between the transparent electrodes and the PLZT plate. This gap is filled with matching oil. When a voltage of 200 V is applied to the transparent electrodes, the PLZT plate becomes cloudy due to an increase of the difference of the refractive index between the area between the PLZT particles and the boundary face of the PLZT particles, thereby attenuating light.

That is, when no voltage is applied to a variable optical attenuator which includes a polymer network liquid crystal or polymer-dispersed liquid crystal, the liquid crystal becomes cloudy and scatters light, while when voltage is applied to this type of optical attenuator, the liquid crystal becomes transparent. Conversely, when no voltage is applied to a variable optical attenuator which includes a PLZT plate, the PLZT becomes transparent, while when voltage is applied to this type of optical attenuator, the PLZT becomes cloudy.

Generally, the speed of response in the electro-optic effect of PLZT is 1 ns or less. However, the PLZT used in the present example is capacitive, and the speed of response depends on the CR time constant in this case, which is approximately 100 ns. In addition, the optical attenuating characteristics are polarization-insensitive. As explained above, when a PLZT plate is inserted into the trench of the present embodiment (in which transparent electrodes are formed), the feature of PLZT of becoming cloudy is effectively used for realizing a high-speed attenuator.

EXAMPLE 9

In the above Example 3, rubbing or optical alignment is performed for realizing an anti-parallel aligned state in the trench.

However, in general liquid crystals, another kind of alignment such as twisted alignment or super twisted alignment may be employed. It is difficult to realize these types of alignment by using the method explained in Example 3.

The distance from the waveguide surface to the waveguide core is short, approximately 10 $\mu$m. Therefore, when alignment is performed on the waveguides, the aligned portion in the vicinity of the waveguide core receives aligning power from the surface of the top of the waveguides, and the alignment of said aligned portion may be disordered.

More specifically, the glass substrate as a top cover of the waveguides may provide an undesirable effect on the alignment of the liquid crystal in the vicinity of each waveguide core. Additionally, in the method in Example 3, the thickness of the liquid crystal depends on the width of the trench. However, the width of the trench which is formed using a dicing saw machine has an error of approximately ±5 $\mu$m; therefore, the method explained in Example 3 is not suitable for providing nematic or super nematic alignment which requires precise control of the film thickness.

In the present example, a thin glass plate on which aligned transparent electrodes are formed is adhered to one side of the trench, so as to obtain parallel, anti-parallel, 90°-twisted, or super twisted alignments. In addition, the glass plate protrudes from the waveguide surface; thus, the distance between the waveguide core and a waveguide cover which may disorder the alignment is greater, so that the alignment of the liquid crystal in the vicinity of the waveguide core can be uniform. Furthermore, in this Example 9, a spacer is provided so as to precisely adjust the gap in which the liquid crystal layer is provided.

FIGS. 12A to 12E are diagrams for explaining Example 9. In these figures, reference numeral 8-1 indicates a cloth used for rubbing (i.e., a rubbing cloth), and reference numeral 8-2 indicates thin strands on the cloth. Reference numeral 8-3 indicates a substrate (as formed in Example 3) having a trench in which transparent electrodes are formed and on which optical waveguides or optical fibers are provided. Reference numeral 8-4 indicates a state in which the wall surfaces of the trench is rubbed by the strands of the cloth for rubbing.

Reference numeral 8-5 indicates a pre-tilt angle of the alignment layer, viewed from the upper side of the trench. Reference numeral 8-6 indicates a thin glass plate on which an alignment layer and transparent electrodes are formed. The thin glass plate 8-6 is subjected, in advance, to rubbing in the direction indicated by the arrow which is appended to the thin glass plate in each figure.

Reference numeral 8-7 indicates a spacer, placed between one side of the trench and the thin glass plate 8-6, for adjusting the thickness of the liquid crystal layer. Reference numeral 8-8 indicates an adhesive.

Reference numeral 8-9 indicates an aligned thin glass plate, and reference numeral 8-10 indicates a nematic liquid crystal by which the trench is filled. For example, a commercially available thin glass plate having a thickness of 30 to 100 $\mu$m can be vised for the thin glass plate 8-9. A thin glass plate having a thickness of 50 $\mu$m is most preferable and can be easily handled.

Figure 12A:
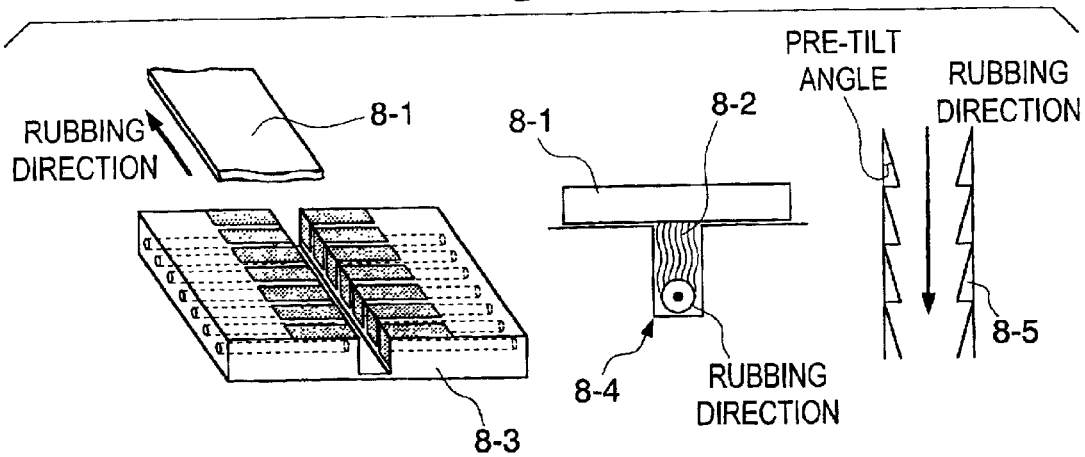
FIGS. 12A and 12E are diagrams for explaining Example 9 of the first embodiment.

Preferably, the strands 8-2 of the rubbing cloth 8-1 are relatively long. As shown in FIG. 12A, the inside of the trench in the waveguides is rubbed by the rubbing cloth 8-1, so as to subject the wall surfaces of the trench to the rubbing. Accordingly, the same pre-tilt angles, viewed from the upper side of the trench, are produced, and thus parallel alignment is produced in the trench.

Figure 12B:
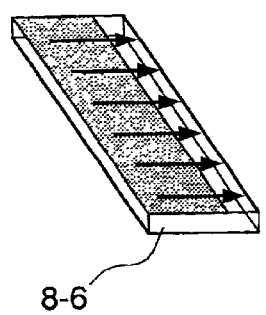

As shown in FIG. 12B, transparent electrodes are formed on the thin glass plate 8-6 which has a thickness of approximately 50 $\mu$m, and an alignment layer is further formed on the thin glass plate. This thin glass plate 8-6 is then subjected to rubbing in the direction indicated by the arrow (appended to the thin glass plate in each figure). Here, the rubbing direction can be freely adjusted.

Figure 12C:
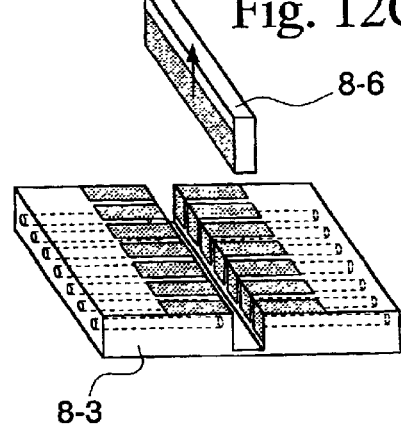
Figure 12D:
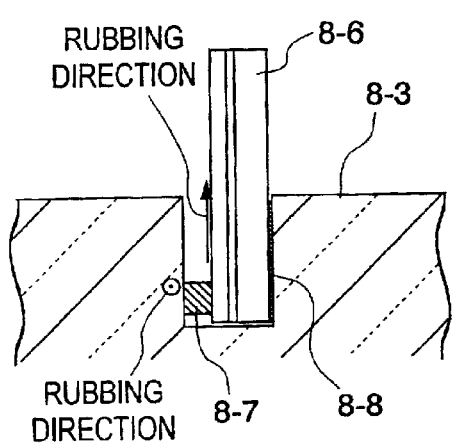

As shown in FIG. 12C, the thin glass plate 8-6 is inserted into the trench, and as shown in FIG. 12D, the thickness of a liquid crystal layer to be inserted is adjusted by using the spacer 8-7. The thin glass plate 8-6 is then adhered to one side of the trench by using a transparent adhesive 8-8.

Figure 12E:
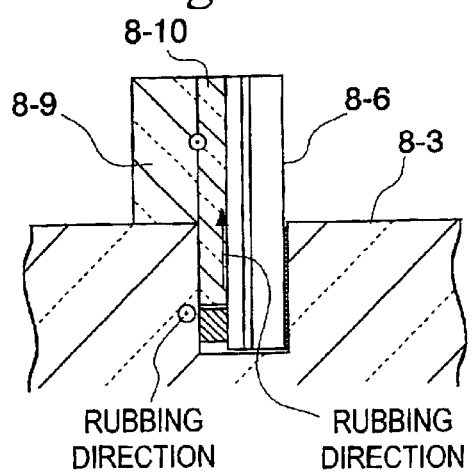

As shown in FIG. 12E, the space adjacent to the aligned thin glass plate 8-6 is filled with a nematic liquid crystal. In the trench, the aligned directions of the faces between which the liquid crystal is filled are perpendicular to each other, thereby realizing 90°-twisted nematic alignment. Therefore, when linearly-polarized light is incident, the polarization axis of the light can be converted by 90°. That is, TM-polarized incident light is converted into TE-polarized light. When voltage is applied, linearly-polarized light passes through while maintaining the linearly-polarized state.

In the above example, 90°-twisted nematic alignment is employed. However, super twisted alignment more than 90° or anti-parallel alignment is also possible. In addition, if the thin glass plate is coated with a vertical alignment layer, various kinds of alignment which can be realized in normal parallel-arranged glass substrates, such as homeotropic alignment, can also be realized in the trench according to the present embodiment.

In addition, the spacer 8-7 is inserted; thus, the thickness of the liquid crystal layer can be adjusted. In the trench, the surfaces between which the liquid crystal layer is placed are aligned; thus, the alignment of a portion of the liquid crystal in the vicinity of the core is not disordered.

As explained above, the insertion of the thin glass plate 8-6 provides effects such that the direction of the alignment can be freely controlled, and the gap in which the liquid crystal is filled can be adjusted.

EXAMPLE 10

In the above Example 8, a PLZT plate is inserted in the trench and an electric field is applied in the direction of the optical path by using transparent electrodes which are formed on the wall surfaces of the trench, so as to realize an optical attenuator using an electro-optic scattering effect of PLZT.

In this Example 10, no transparent electrode is formed in the trench of the waveguides, and a thin PLZT plate is inserted and electrodes are formed on the PLZT plate in a manner such that incident light is placed between two electrode lines. An electric field perpendicular to the optical path is applied so as to control the polarization and phase of light by using an electric quadratic effect (i.e., the Kerr effect) of PLZT.

Generally, PLZT (ceramic) is formed by mixing four oxides which are PbO, $La_2O_3$, $ZrO_2$, and $TiO_2$ and sintering the mixture. The PLZT has the formula $(Pb_{1-x}La_x)(Zr_yTi_z)_{1-x}O_3$, and it is generally known that those having x=9, y=65, and z=35 provide an optimum (level of) electro-optic effect.

Basically, PLZTs are isotropic ceramics having large electro-optic effects, and the refractive index in the direction along which the electric field is applied changes considerably. In addition, PLZT has a very high speed of response and is transparent in the wavelength range for optical communication.

PLZT has not often been used for manufacturing waveguide-type optical devices for optical communication because it is difficult to make waveguides using PLZT. However, similar to the case of using glass, electrodes can be provided on PLZT, and PLZT can be freely shaped by using a dicing saw machine or by polishing. When a PLZT plate is inserted into a trench provided in optical waveguides or fibers (as provided in the present embodiment), the above-explained large electro-optic effect or high speed of response can be effectively used in waveguide-type optical devices.

Figure 13A:
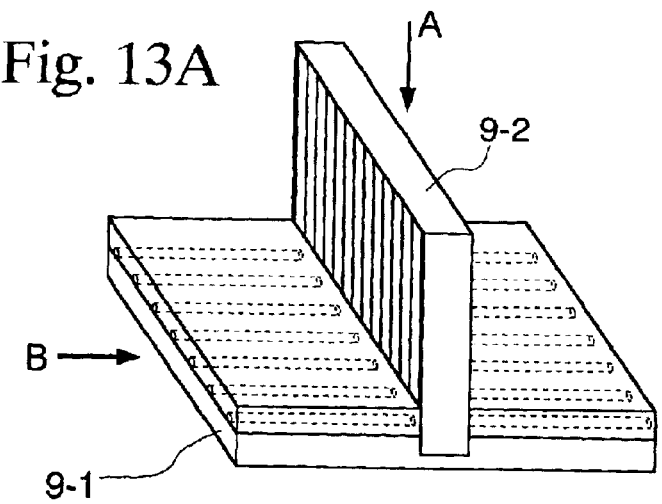
FIGS. 13A and 13C are diagrams for explaining Example 10 of the first embodiment.
Figure 13A:
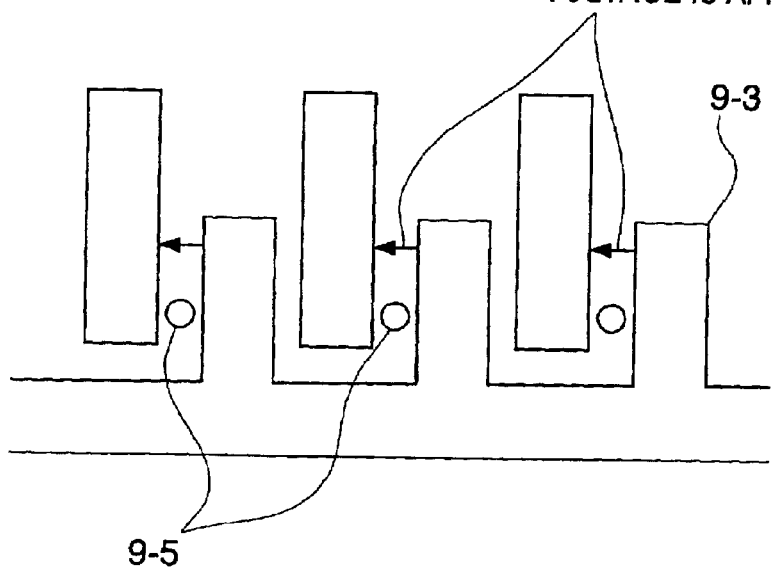
Figure 13C:
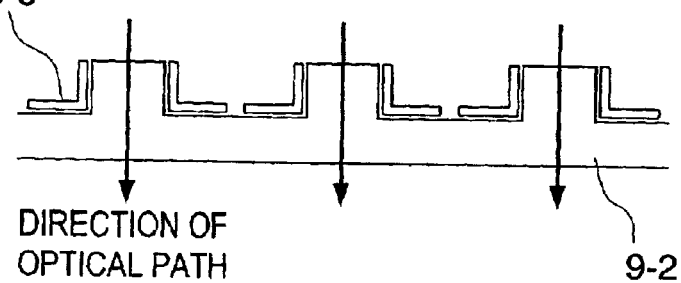

FIGS. 13A to 13C are diagrams for explaining Example 10. FIG. 13A is a perspective view showing a PLZT plate. FIG. 13B is a diagram showing electrodes formed on the PLZT plate, viewed in the direction indicated by arrow B in FIG. 13A. FIG. 13C is a view of PLZT which is viewed in the direction indicated by arrow A in FIG. 13A.

In FIGS. 13A to 13C, reference numeral 9-1 indicates a substrate on which optical waveguides or fibers are provided and which has a narrow trench, reference numeral 9-2 indicates a PLZT plate, and reference numeral 9-3 indicates an electrode pattern. Reference numeral 9-5 indicates optical beams which pass through PLZT.

As shown in the figures, in this Example 10, the PLZT plate 9-2 is inserted into the trench formed on the substrate, on which optical waveguides or fibers are provided. On the PLZT plate, electrodes are formed in a manner such that each portion through which light passes is positioned between the electrodes. In this Example, electrodes are formed on only a (front) face of the PLZT plate; however, electrodes may be formed on both front and back faces of the PLZT plate.

Slit-shaped electrodes may be formed on the PLZT plate and the refractive index may be controlled based on a leakage electric field (passing through slits). However, in this case, the applied voltage is high, such as 100 V or more. Therefore, as shown in FIG. 13C viewed in the direction indicated by arrow A, instead of a simple surface-normal PLZT plate, the plate is shaped by using a dicing saw machine or the like, so as to form side faces on which electrodes are formed. In this structure, the electric field can be more efficiently applied to the portion through which each optical beam passes, so that the device can be driven by an applied voltage of less than 100 V. A specific example of this structure is shown by FIGS. 14A to 14C.

Figure 14A:
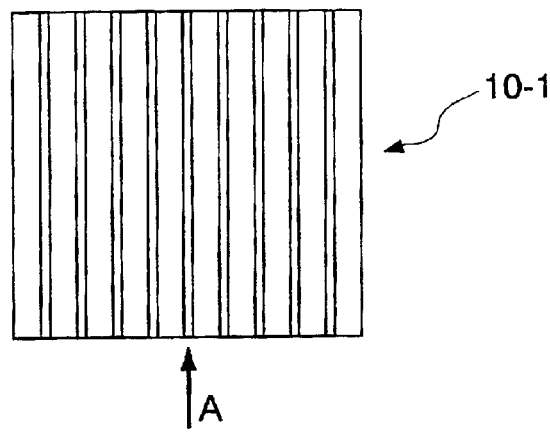
FIGS. 14A to 14C are diagrams showing the front face of an inserted PLZT plate and electrodes formed on the front face in Example 10.

FIG. 14A is a diagram showing the surface of a PLZT plate inserted into a trench, where reference numeral 10-1 indicates the PLZT plate.

Figure 14B:
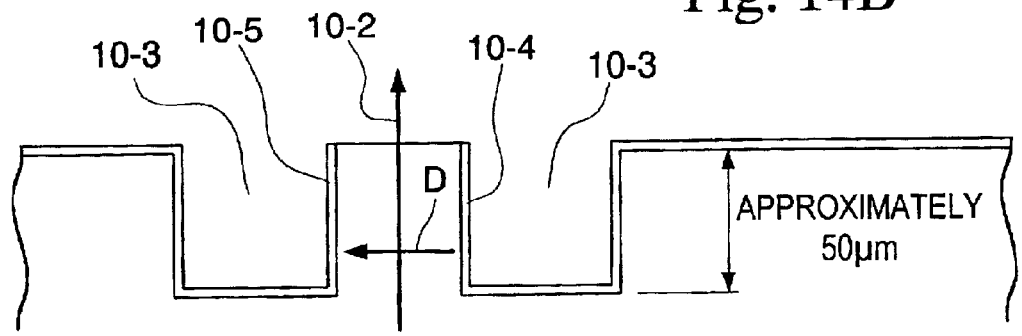
Figure 14C:
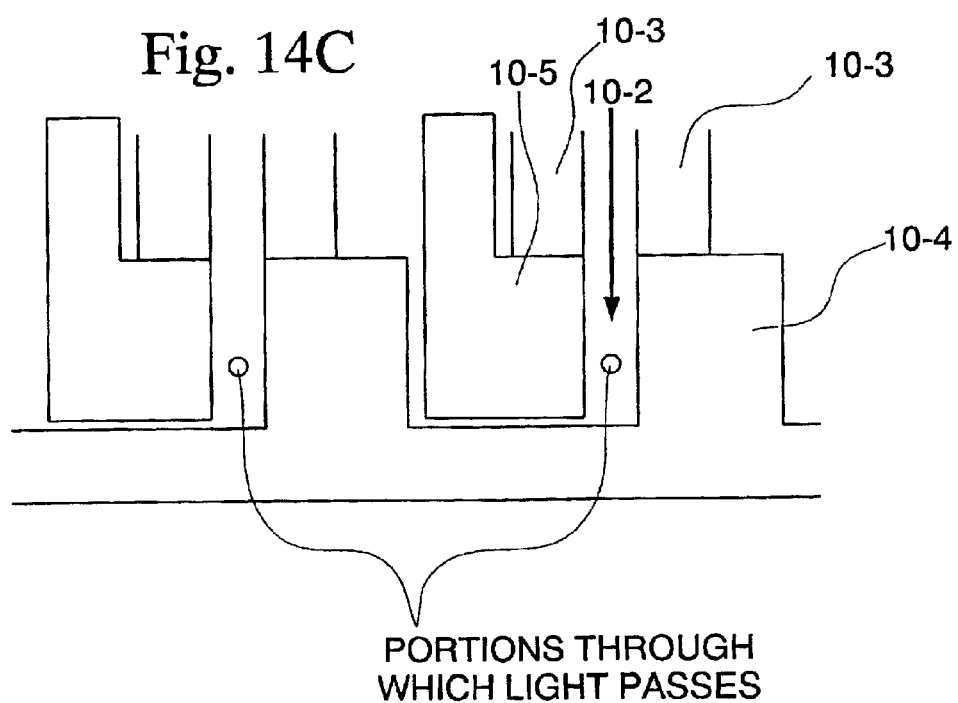

FIG. 14B shows a section of the lower side of the PLZT plate, viewed in the direction indicated by arrow A in FIG. 14A. Reference numeral 10-2 indicates a portion through which light passes, which has a height of approximately 50 $\mu$m and a width of 30 to 50 $\mu$m. Reference numerals 10-3 indicate portions removed by using a dicing saw machine or the like. Reference numeral 10-4 indicates an electrode formed on a side face of the portion 10-2 (through which light passes), and reference numeral 10-5 indicates an electrode formed on the other side face on the opposite side. In addition, arrow D indicates the direction along which voltage is applied. FIGS. 14B and 14C show detailed structure of the electrodes formed on the surface of the PLZT plate.

Figure 15A:
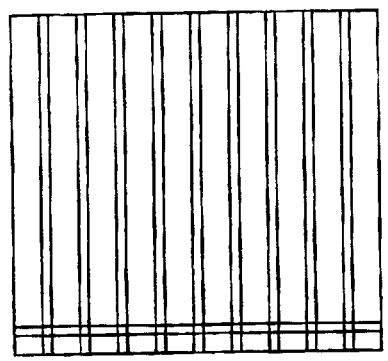
FIGS. 15A to 15C are diagrams showing the back face of the inserted PLZT plate and electrodes formed on the front face in Example 10.
Figure 15B:
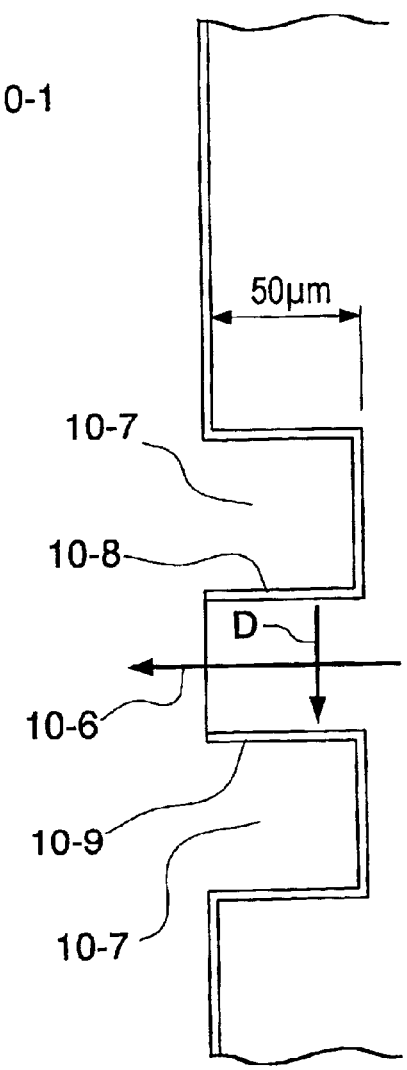
Figure 15C:
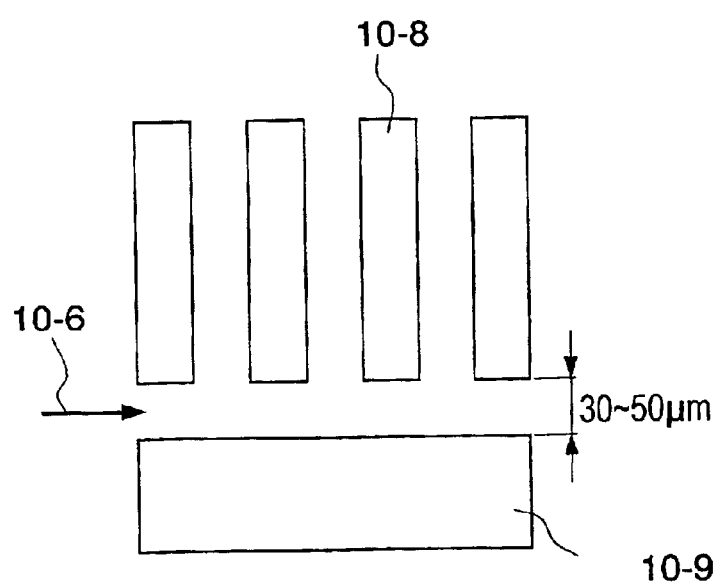

FIG. 15A is a diagram of the PLZT plate viewed from the back-face side of the PLZT plate. FIG. 15B is a view which is viewed in the direction indicated by arrow C in FIG. 15A. FIG. 15C is a diagram showing the electrode pattern formed on the back face of the PLZT plate.

In FIGS. 15A to 15C, reference numeral 10-6 indicates a window portion through which light passes, reference numeral 10-7 indicates portions which are removed, in advance, by using a dicing saw machine or the like, reference numerals 10-8 and 10-9 indicate electrodes which are respectively formed on both side faces of the portion 10-6 (through which light passes). In FIG. 15B, arrow D indicates the direction in which voltage is applied.

As shown in FIG. 15B, the surface of the inserted PLZT plate has a portion having a width of 30 to 50 $\mu$m through which an optical beam having a diameter of 10 $\mu$m passes, where said portion is a convex portion and reference numeral 10-7 around the convex portion indicates portions removed using a dicing saw machine or the like. On the side faces of the convex portion, electrodes 10-8 and 10-9 are formed so as to apply an electric field in a direction perpendicular to the optical path. In this structure of forming electrodes on the side faces of the convex portion, the applied voltage can be considerably lower than that necessary when electrodes are formed on the top face of the convex portion.

As shown in FIGS. 15A to 15C, a similar pattern of trench and electrodes is formed on the back face, where the direction along which the electrodes are formed is perpendicular to that for the electrodes formed on the front face. This PLZT plate is inserted into the trench which is formed on the substrate on which optical waveguides or fibers are provided, and the adjustment of the substrate is performed in a manner such that light passes through the center of the electrodes formed on four side faces.

When light is incident on the PLZT plate, the electrodes formed on the front face cause a change in the refractive index of the light in the horizontal direction, thereby producing a phase shift in the horizontal direction. When the light half passes through the PLZT plate, an electric field is applied in the vertical direction (that is, the direction perpendicular to that of the electric field related to the electrodes on the front face) is applied. Therefore, the refractive index in the vertical direction is changed, thereby producing a phase shift in the vertical direction. Accordingly, the output light has received a polarization-insensitive phase shift.

In general optical waveguides, an optical device for switching, dispersion-compensating, or the like, can be realized by using a phase shift due to a thermo-optic effect. According to the present embodiment, a phase shift can be obtained by using an electro-optic effect at a high speed of approximately 10 ns.

If a portion in each of four sides of a PLZT plate is removed and an electrode is formed on side faces of the removed portion, an electric field having any required power can be applied in any direction. The phase of the voltage applied to each electrode can be controlled so as to control the direction and intensity of the electric field which is applied to the center portion of the PLZT plate. Accordingly, a rotatable wavelength plate having any required rotation angle can be realized, and any polarization state can be converted to linear polarization at high speed.

Second Embodiment

Below, the second embodiment of the present invention will be explained with reference to the drawings.

Figure 16A:
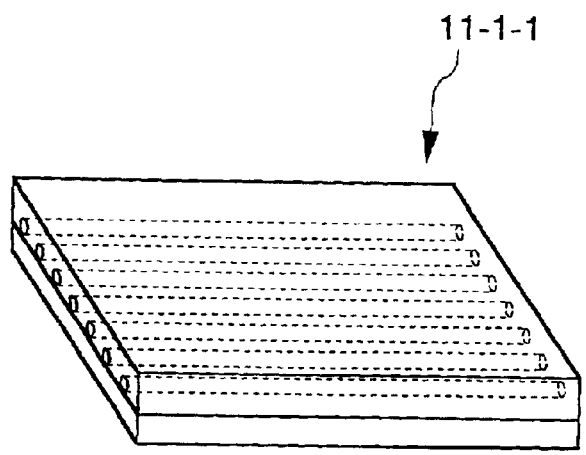
FIGS. 16A and 16B are diagrams for explaining the general structure of a substrate on which optical waveguides or fibers are provided, and a manufacturing method therefor, as the second embodiment according to the present invention.
Figure 16B:
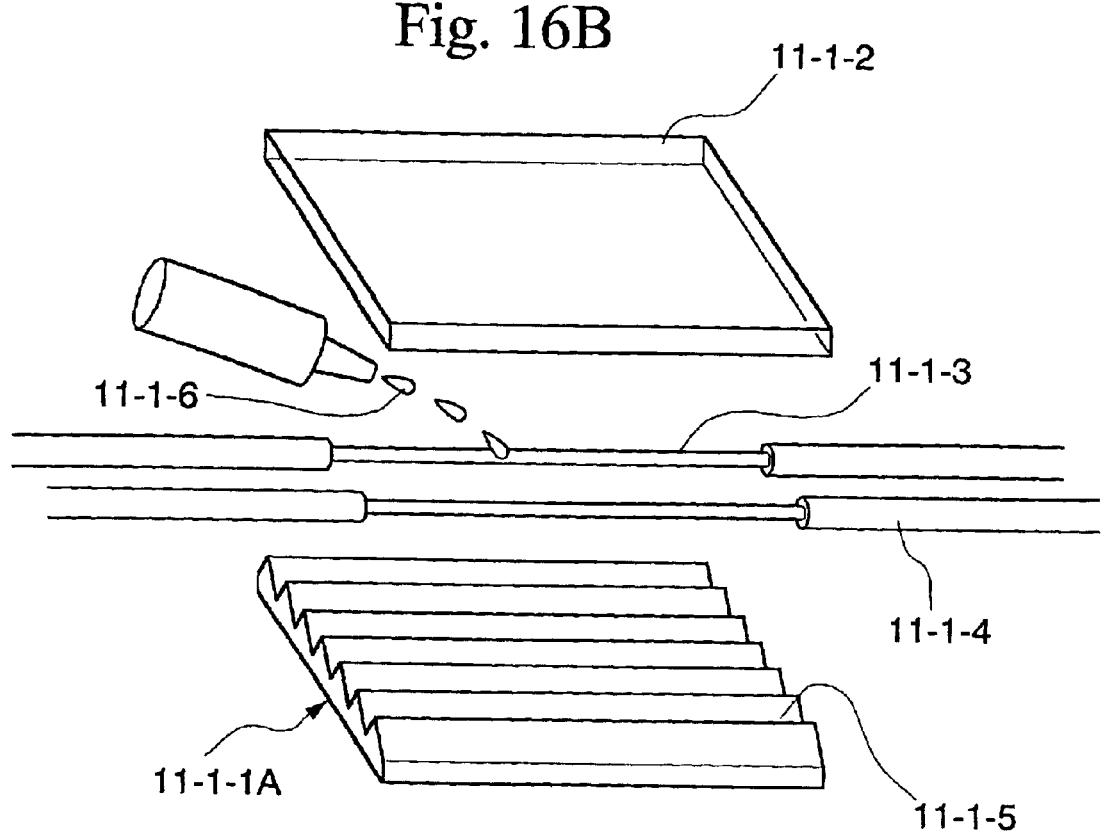

FIGS. 16A and 16B are diagrams for explaining the general structure of a substrate on which optical waveguides or fibers are provided, and a manufacturing method therefor. FIG. 16A is a perspective view of an optical-waveguide substrate. FIG. 16B is a diagram showing a manufacturing process for a substrate on which optical fibers are mounted.

Figure 17A:
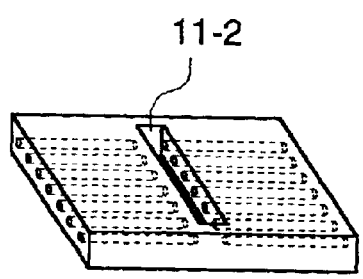
FIGS. 17A and 17B are diagrams for explaining a process for forming a trench on the substrate in the second embodiment.
Figure 17B:
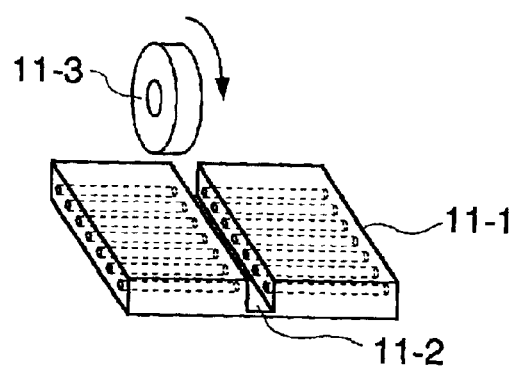

FIGS. 17A and 17B are diagrams for explaining a process for forming a trench according to the present embodiment. FIG. 17A shows a process of forming a trench by etching, while FIG. 17B shows a process of forming a trench by using a dicing saw machine.

Figure 18A:
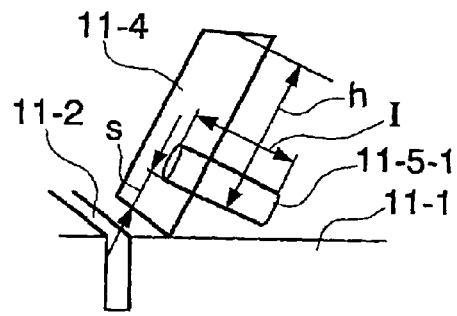
FIGS. 18A to 18D are diagrams for explaining the general structure of a surface-normal optical device and a manufacturing method therefor in the second embodiment.
Figure 18B:
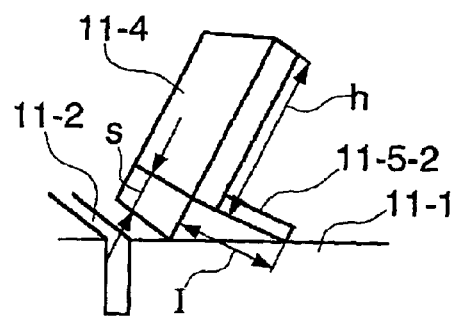
Figure 18C:
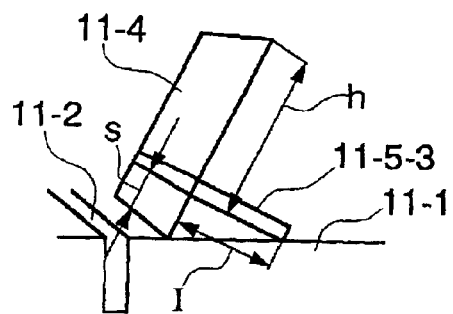
Figure 18D:
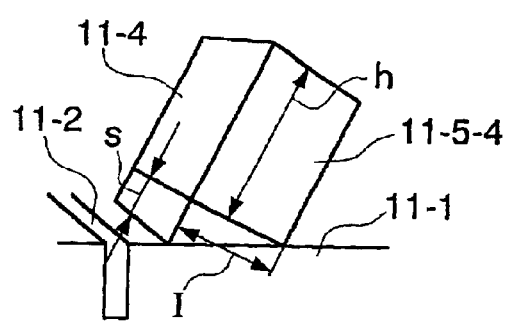

FIGS. 18A to 18D are diagrams for explaining the general structure of a surface-normal optical device and a manufacturing method therefor in the present embodiment. In the structure shown by FIG. 18A, a round bar is used as a support member. In the structure of FIG. 18B, an L-shaped block is used as a support member. In the structure shown in FIG. 18C, a plate is used as a support member. In the structure shown in FIG. 18D, a rectangular block is used as a support member.

In FIGS. 16A to 18D, reference numeral 11-1-1 indicates an optical-waveguide substrate, reference numeral 11-1-1A indicates a substrate on which optical fibers are mounted and fixed (called an "optical-fiber substrate" hereinbelow), reference numeral 11-1-2 indicates a glass plate placed on the optical fibers so as to hold the optical fibers, reference numeral 11-1-3 indicates a bare fiber of the optical fiber, reference numeral 11-1-4 indicates a (UV) coat of the optical fiber, reference numeral 11-1-5 indicates a V-groove array for holding the optical fibers, and reference numeral 11-1-6 indicates an adhesive.

Reference numeral 11-2 indicates a trench which traverses the optical paths in the substrate, where the direction of the trench is substantially perpendicular to the optical waveguides. The trench 11-2 may be formed by etching (see FIG. 17A) or by using a dicing saw machine (see FIG. 17B).

Below, in addition to the above figures, FIGS. 19A to 21 will also be referred to. Reference numeral 11-3 indicates a dicing plate, reference numeral 11-4 indicates a thin surface-normal optical device (i.e., optically-functional device), reference numeral 11-5 indicates a support member made of glass, ceramics, plastics, or the like (called a "block" hereinbelow), reference numeral 11-6 indicates an adhesive for adhering the block with the surface-normal optical device, reference numeral 11-7 indicates a positioning mark for the block and the optical device, reference numeral 11-8 indicates a window portion through which light passes, reference numeral 11-9 indicates an electrode of the optical device, reference numeral 11-10 indicates an L-shaped patterned electrode attached to the block, reference numeral 11-11 indicates an adhesive having a refractive index which is suitable for the optical-waveguide substrate and the surface-normal optical device, reference numeral 11-12 indicates extended electrodes, and reference numeral 11-13 indicates vacuum tweezers.

The patterned electrodes 11-10 on the block 11-5 may be formed by (i) depositing metal on two faces of the block (which form an L shape), and (ii) patterning the deposited metal on the faces by photo-processing or mechanically cutting the deposited metal by using a dicing saw machine or the like.

The bare fibers 11-1-3 of the optical fibers are put on the trenches of the V-groove array 11-1-5, on which the glass plate 1-1-2 is placed, and the space around each bare fiber is filled with the adhesive 11-1-6, so that the bare fiber is fixed and the optical-fiber substrate 11-1-1A is finished (see FIG. 16B).

As shown in FIGS. 16A to 16B, in the optical-waveguide substrate into which a surface-normal optical device is mounted according to the present embodiment, a trench having a width of approximately 10 to 300 μm and a depth of 100 to 500 μm is formed on the optical-waveguide substrate 11-1-1 or the optical-fiber substrate 11-1-1A. The optical-waveguide substrate 11-1-1 may include any one of (i) glass waveguides, (ii) waveguides formed on an Si substrate, and (iii) polymer waveguides.

As shown in FIG. 16B, the optical-fiber substrate 11-1-1A may be manufactured by placing each bare fiber 11-1-3 (obtained by removing the coat of an optical fiber) on the V-groove array 11-1-5, further placing the thin glass plate 11-1-2, and fixing each optical fiber using the adhesive 11-1-6 or resin.

In the insertion of a thin surface-normal optical device into the trench, a glass block is attached to the surface-normal optical device, and the surface-normal optical device is inserted by dropping the device into the trench.

That is, a trench is formed on the optical-waveguide substrate 11-1-1 or the optical-fiber substrate 11-1-1A as shown in FIGS. 16A and 16B, by etching (see FIG. 17A) or by using a dicing saw machine (see FIG. 17B).

When a currently available dicing plate is used, a flat trench having a width of 15 to 400 μm can be formed while polishing the trench. In etching, a trench having a width of a few μm can be formed. When the former method using a dicing saw machine is employed, a relatively wide and deep trench can be obtained. In contrast, when the latter method of etching is employed, a relatively narrow and shallow trench can be obtained.

As shown in FIGS. 18A to 18D, a thin surface-normal optical device 11-4 to be inserted into the trench is prepared. Generally, the thin surface-normal optical device 11-4 is obtained by (i) forming a base structure while making electrodes and depositing an epi layer, (ii) polishing the base structure so as to have a thin structure having a width of 10 to 100 μm, and (iii) dividing the thin structure into rectangular pieces, each having a size of a few millimeters by a few millimeters. If a surface-normal optical device has a thickness of approximately 100 μm, the device can be inserted into the trench by using tweezers; however, it is very difficult to insert the thinner surface-normal optical device 11-4 into the trench 11-2.

In the present embodiment, as shown in FIGS. 18A to 18D, when the thin surface-normal optical device 11-4 is first placed on the surface of the optical-waveguide substrate 11-1-1 or the optical-fiber substrate 1 1-1-1A, the thin surface-normal optical device 11-4 is slightly inclined and a block for supporting the device is used so as to stably place the surface-normal optical device on the substrate.

For example, a round bar 11-5-1 is attached to the surface-normal optical device 11-4 so as to prevent the surface-normal optical device from falling onto the substrate (see FIG. 18A). As another example, an L-shaped block 11-5-2 is attached to the surface-normal optical device 11-4 (see FIG. 18B), or a support plate 11-5-3 is perpendicularly attached to the surface-normal optical device 11-4 (see FIG. 18C), or a rectangular block 11-5-4 is attached to the surface-normal optical device 11-4 (see FIG. 18D). Therefore, the surface-normal optical device 11-4, to which such a support member is attached, is placed on the surface of the optical-waveguide substrate 11-1-1 or the optical-fiber substrate 11-1-1A.

Figure 19A:
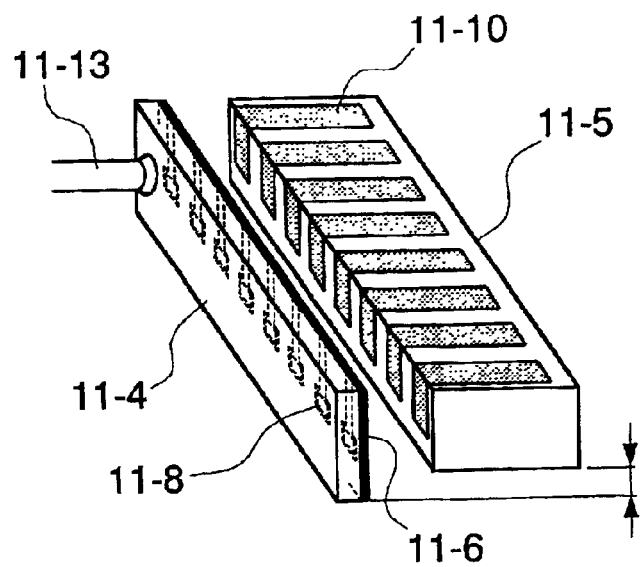
FIGS. 19A and 19B are diagrams for explaining the processes for mounting a surface-normal optical device in the second embodiment.
Figure 19B:
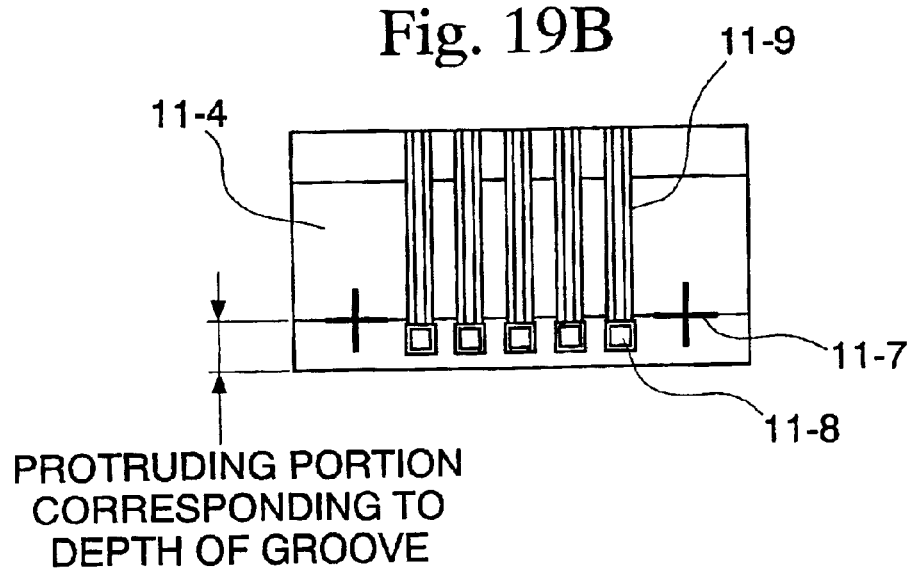

As shown in FIGS. 19A and 19B (FIG. 19A is a perspective view and FIG. 19B is a front view), if the surface-normal optical device 11-4 has window portions 1-8 through which light passes, the distance (i.e., depth) from the surface of the substrate to the core is measured in advance, and the surface-normal optical device 11-4 and the glass block 11-5 are adhered to each other in a manner such that a portion of the surface-normal optical device protrudes from the glass block so as to make the distance from the bottom face of the glass block to the window portions 1-8 of the surface-normal optical device coincide with the above measured length.

If positioning marks (refer to reference numeral 11-7 in FIG. 19B) are used, the surface-normal optical device 11-4 and the glass block 11-5 can be adhered at an accuracy of ±5 $\mu$m.

When electrodes are provided on the surface-normal optical device 11-4, these electrodes are connected to the patterned electrodes 11-10 on the block 11-5, so that the electrodes of the surface-normal optical device can be obtained via the L-shaped electrodes which are formed on two adjacent faces of the block (which include the top face).

It may be difficult to form divided electrodes on such an L-shaped portion by normal photo-processing. Therefore, the divided electrodes may be obtained by mechanically cutting an electrode film by using a dicing saw machine or the like.

When the block 11-5 is not used, the electrodes of the thin surface-normal optical device 11-4 must be directly extended from the surface-normal optical device. However, if the electrodes (11-10) are attached to the surface-normal optical device 11-4, the device may be damaged. In contrast, when the block 11-5 is attached to the surface-normal optical device, the combined structure of the surface-normal optical device and the block can be handled by holding the block (11-5) portion by using normal tweezers without contacting the thin portion which protrudes from the block. Therefore, in this case, an alignment layer (for liquid crystal) may be formed using a spinner on the surface-normal optical device 11-4 which is supported by the block 11-5, or mechanical rubbing for the surface-normal optical device may be performed.

Figure 20A:
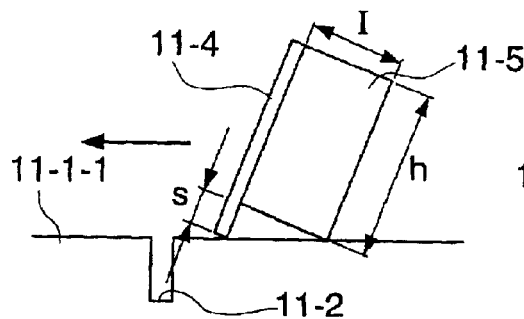
FIGS. 20A to 20D are diagrams for explaining the basic processes in the method of mounting a surface-normal optical device in the second embodiment.

As shown in FIG. 20A, the surface-normal optical device supported by the block 11-5 is placed on the optical-waveguide substrate 11-1-1 or the optical-fiber substrate 11-1-1A. If the height h and width I of the block 11-5 and the length s of the protruding portion of the surface-normal optical device 11-4 which protrudes from the block 11-5 have the relationship "I/h>s/I", the block 11-5 is stably inclined without falling, while the surface-normal optical device 11-4 contacts the surface of the optical-waveguide substrate 11-1-1 or the optical-fiber substrate 11-1-1A.

Figure 20B:
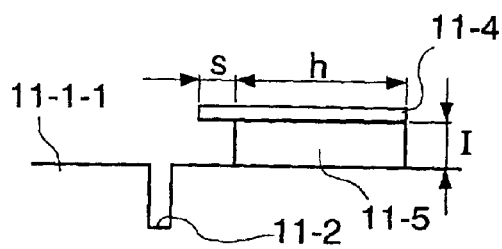

If it is assumed that the width I of the block 11-5 is considerably thinner, the block 11-5 falls down on the substrate as shown in FIG. 20B, so that the surface-normal optical device 11-4 cannot contact the optical-waveguide substrate 11-1-1 or the optical-fiber substrate 11-1-1A.

In the following step, the block 11-5 is slowly pushed on the surface of the optical-waveguide substrate 11-1-1 or the optical-fiber substrate 11-1-1A by using tweezers or the like while the contact state between the surface-normal optical device 11-4 and the substrate is maintained.

Generally, the surface of the optical-waveguide substrate has a mirror (flat) surface, and the optical-fiber substrate also has a flat mirror surface because a cover glass is placed on the optical fibers. Therefore, the surface-normal optical device 14 can slide on the surface of the substrate without receiving unnecessary force and being damaged.

Figure 20C:
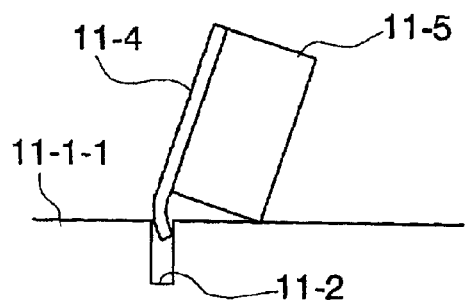
Figure 20D:
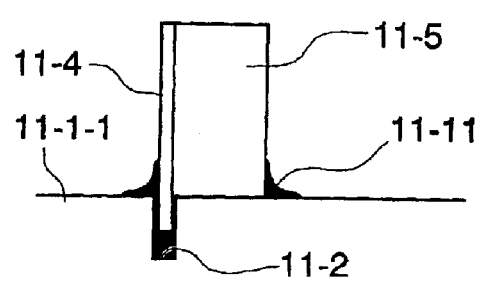

When this thin surface-normal optical device 11-4 reaches the position of the trench 11-2, the end of the surface-normal optical device 11-4 contacts the wall surface of the trench 11-2 and the surface-normal optical device bends and naturally falls into the trench 11-2 (see FIG. 20C).

If the thickness of the inserted portion of the surface-normal optical device 11-4 is great, the portion does not bend and thus the surface-normal optical device does not fall into the trench. In the present embodiment, the thickness of the surface-normal optical device is generally 10 to 100 $\mu$m (or up to 150 $\mu$m); thus, the surface-normal optical device can bend and can be easily inserted into the trench.

In the next step, the adjustment for making the position of each window portion of the surface-normal optical device coincide with the position of each optical-waveguide core of the optical-waveguide substrate 11-1-1 or the optical-fiber substrate 11-1-1A is performed by moving the block 11-5 in the direction parallel to the trench. The surface-normal optical device 11-4 and the optical-waveguide substrate 11-1-1 or the optical-fiber substrate 11-1-1A are then adhered to each other by using an optical adhesive which has a refractive index suitable for the surface-normal optical device and the substrate.

Figure 21:
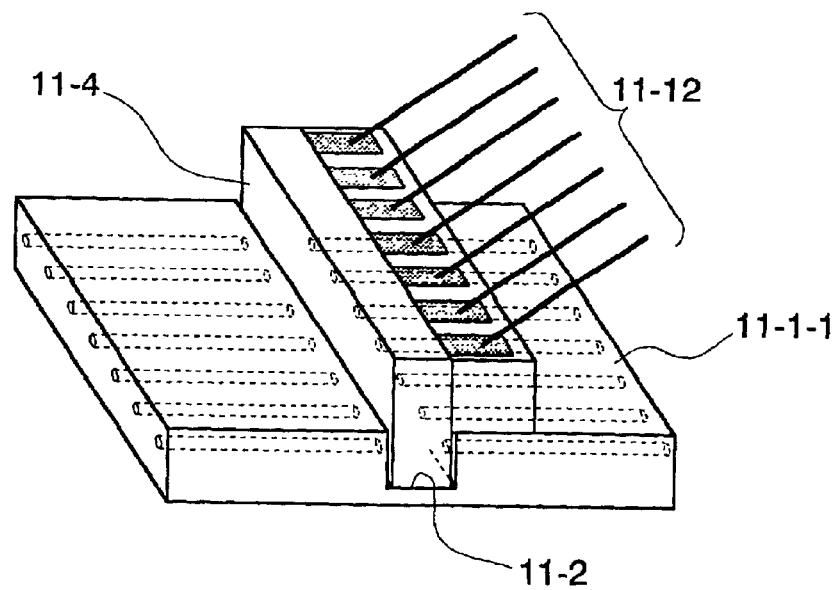
FIG. 21 is a diagram showing the state of completion of the mounting of a surface-normal optical device in the second embodiment.

According to the above processes, as shown in FIG. 21, the surface-normal optical device 11-4 can be substantially perpendicularly inserted into the trench 11-2 of the optical-waveguide substrate 11-1-1 or the optical-fiber substrate 11-1-1A.

As explained above, in the conventional method of using the micro-positioning stage, adjustment is very difficult, that is, even when the surface-normal optical device 11-4 hits the wall surface of the trench 11-2 due to a positioning error of 1 $\mu$m, the surface-normal optical device may be damaged.

In the above explanation, a single surface-normal optical device 11-4 is inserted into a trench; however, two surface-normal optical devices 11-4 may be inserted in a trench 11-2, as shown in FIG. 22A.

Additionally, as shown in FIG. 22B, if a liquid crystal device, in which a liquid crystal material 201 is sandwiched between thin glass plates 202 and to which a glass block is attached (the detailed structure will be explained below), is inserted into a trench, one of the glass plates 202 contacts the wall surface of the trench and bends (see FIG. 22C), so that the surface-normal optical device falls into the trench (see FIG. 22D).

Generally, it is difficult to insert a thin plate, which has a thickness substantially coinciding with the width of a target trench, into the trench. Therefore, if the micro-positioning stage is used for inserting the surface-normal optical device into the trench, the greatest possible care is necessary so as to prevent the surface-normal optical device from hitting the wall surface of the trench. In contrast, in the present embodiment, a surface-normal optical device, which has a thickness substantially coinciding with the width of a target trench, can be inserted into the trench.

Conventionally, optical devices can be realized as a bulk form. However, according to the present embodiment, a thin optical device can be inserted into a trench in optical waveguides or fibers; therefore, various kinds of optically-functional devices can be mounted in a hybrid form on the optical waveguides or fibers.

In the following examples, the support member is generally called a "block", which not only indicates a rectangular block, but may also indicate a block-like structure of any shape such as a bar, plate, L-shaped block, or the like.

EXAMPLE 1

Example 1 of the present embodiment provides a method of manufacturing a polarization control device, in which a polarization control device is inserted into optical waveguides so as to convert the polarization direction of incident light into any polarization direction. In practical optical systems, such a polarization control device is used for compensating the polarization dispersion.

Professor S. Kawakami at Tohoku University, Japan, has disclosed a rotatable wavelength plate in which (i) a glass plate on which 8 electrodes (having a symmetric form with respect to the center point as shown in FIGS. 23A to 23C) are formed is coated with a vertical alignment layer, (ii) a space between two glass plates (each having the above-explained electrodes) is filled with a p-type nematic liquid crystal so as to obtain homeotropic alignment, (iii) the phase of the voltage applied to the 8 electrodes is controlled so as to apply a linear electric field to the center surrounded by the electrodes, and (iv) the direction of the linear electric field is freely controlled (within 360°) and the intensity of the electric field is also controlled so as to control the phase of the wavelength plate (See S. Kawakami et al., "Polarization Control using Liquid Crystal", Technical Report of IEICE, OME95-49, OPE95-90, pp. 19 to 24, 1995).

In FIGS. 23A to 23C, reference numeral 12-1 indicates a center window surrounded by 8 electrodes, through which light passes, reference numeral 12-2 indicates the 8 electrodes having a symmetric form with respect to the center window portion, reference numeral 12-3 indicates glass substrates, reference numeral 12-4 indicates a vertically-aligned liquid crystal, reference numeral 12-5 indicates an optical beam which passes through the center window surrounded by the 8 electrodes, and reference numeral 12-6 indicates a state in which liquid crystal molecules rotate due to application of a voltage having a different phase to each of the 8 electrodes.

The diameter of the center window is approximately 50 µm, and two liquid crystal rotatable wavelength plates (corresponding to a half-wave plate and a quarter-wave plate) are prepared. The voltage is applied and angles $\theta_1$ and $\theta_2$ of the rotation axes of the two liquid crystal rotatable wavelength plates are adjusted, so as to always convert the polarization state of an incident optical beam into linear polarization.

The liquid crystal rotatable wavelength plate uses a glass plate having a thickness of a few millimeters; thus, the device is generally used in a free-space optical beam system. In contrast, in Example 1, the liquid crystal rotatable wavelength plate is inserted into a trench of an optical-waveguide substrate or an optical-fiber substrate.

FIGS. 24A to 25C are diagrams for explaining the processes for manufacturing the liquid crystal rotatable wavelength plate of Example 1.

In FIGS. 24A to 25C, reference numeral 13-1 indicates an 8-electrode pattern having a symmetric shape with respect to a center window which has a diameter of 20 to 50 µm. Reference numeral 13-2 indicates a glass plate having a thickness of 0.5 mm or more, and reference numeral 13-3 indicates a glass plate having a thickness of 15 µm or less, obtained by polishing the above thicker glass plate and dividing the polished plate into pieces, each having a square shape of a few millimeters×a few millimeters. Reference numeral 13-4 indicates a glass block, reference numeral 13-5 indicates a spacer, reference numeral 13-6 indicates a nematic liquid crystal, reference numeral 13-7 indicates a glass polarizer having a thickness of 30 µm, and reference numeral 13-8 indicates a transmission detector.

Figure 24A:
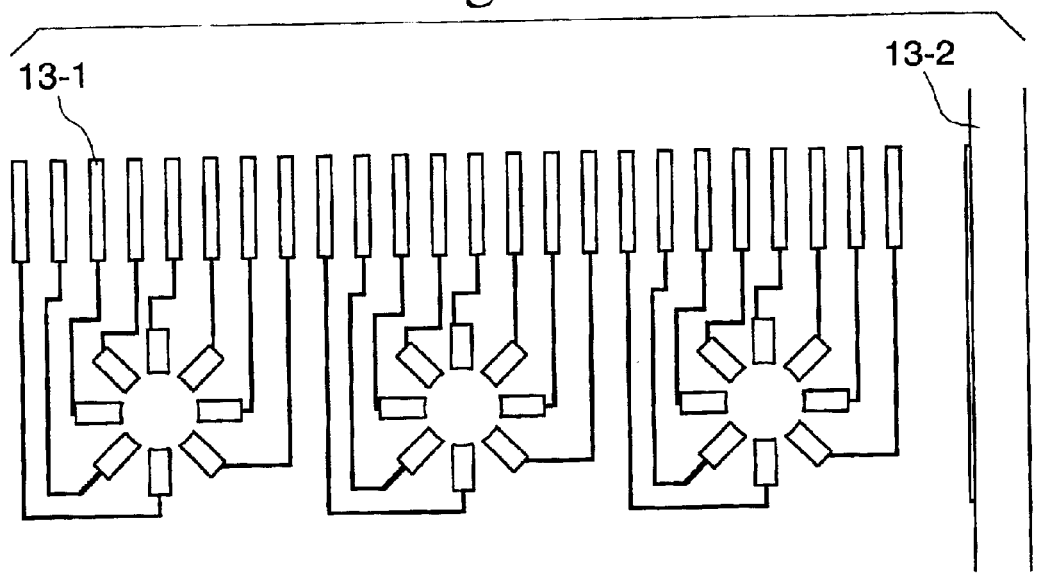
FIGS. 24A and 24B are diagrams for explaining the processes for manufacturing the liquid crystal rotatable wavelength plate of Example 1.

As shown in FIG. 24A, a metal electrode film is formed on a glass plate having a thickness of approximately 1 mm, by metal evaporation, and the 8 electrodes, which have a symmetric form with respect to the center window (which has a diameter of approximately 20 to 50 µm, are formed by photo processing. In order to form an 8-electrode array, a plurality of 8-electrode portions having the same pattern are similarly formed. Various methods can be used for extending the electrodes to an external area, but detailed explanations of such methods are omitted here.

Figure 24B:
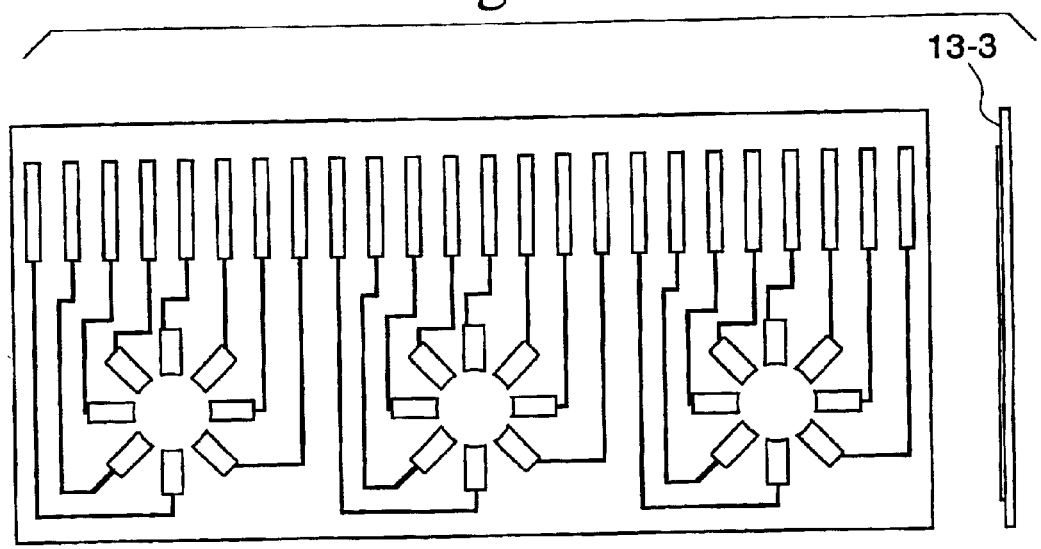

As shown in FIG. 24B, the back face of the glass plate is polished to have a thinner thickness of 10 to 15 µm. This thin glass plate is divided into pieces (i.e., glass plates 13-3) by using a dicing saw machine.

As shown in FIG. 25A, the glass plate 13-3 having the 8-electrode pattern 13-1 is placed on the glass block 13-4 by using vacuum tweezers. The glass plate 13-3 and the glass block 13-4 are adhered to each other by irradiation of ultraviolet light. A pair of the combined structures (each consisting of the glass plate 13-3 and the glass block 13-4) are placed on a spinner and are coated with alignment layers (suitable for vertical alignment). The alignment layers are then dried and are subjected to thermal curing.

Generally, the alignment layer is made of polyimide. In this Example, an adhesive was used in a former process; thus, the thermal curing is executed using a polyimide which is cured at 180° C. (i.e., a polyimide suitable for low-temperature thermal curing).

In the next process, as shown in FIG. 25B, the pair of the combined structures are further combined via spacers 13-5 which have a thickness of approximately 20 µm. The space between the combined structures (each consisting of the glass plate 13-3 and the glass block 13-4) is filled with a vertically aligned nematic liquid crystal 13-6 (see FIG. 25C), thereby obtaining a liquid crystal device of Example 1.

In the above structure, adjustment for making the position of each window portion coincide with a corresponding optical path is necessary.

Generally, it is impossible to manufacture a liquid crystal cell having a square shape of a few mm×a few mm (as explained above) by using a glass plate having a thickness of 15 µm. However, in the present example, the glass block 13-4 is effectively used so as to obtain a device including such a small liquid crystal portion. That is, a p-type nematic liquid crystal is filled into the device, thereby obtaining a homeotropic liquid crystal device.

FIG. 26 is a diagram for explaining a method of making an continuous and complete polarization control device and a method of mounting the device on an optical-waveguide substrate.

The continuous and complete polarization control device uses the above-explained liquid crystal rotatable wavelength plate. As shown in FIG. 26, on an optical-waveguide substrate, a trench having a width of approximately 70 µm and two trenches, each having a width of approximately 40 µm, are formed in a cascade form by using a dicing saw machine.

First, a rotatable wavelength plate supported by a glass block (manufactured as explained above) is placed in the vicinity of the trench having the width of 70 µm, that is, on the surface of the optical-waveguide substrate, and the glass block is made to slide on the substrate so that the protruding portion of the rotatable wavelength plate naturally falls into the trench.

In the next step, light for adjustment is incident on each optical waveguide. In the adjustment, the block is moved in the direction parallel to the trench so as to input the light into a corresponding window portion of the liquid crystal. An adhesive is then injected and UV curing is performed so as to fix the rotatable wavelength plate to the substrate.

A glass polarizer 13-7 which is formed by a similar method and has a thickness of 30 µm is then inserted into the second trench. Only light having linear polarization can pass through the polarizer.

The glass polarizer 13-7 is formed by dispersing metal (silver) particles in glass, and heating and stretching the glass, so that the silver particles are aligned along the long axis. Generally, the thickness of the glass polarizer is approximately 1 mm, and the thinnest commercially available glass polarizers have a thickness of 30 µm. Such a thin glass polarizer can be inserted into a trench formed on an optical-waveguide substrate or an optical-fiber substrate, thereby making linearly-polarized light having an extinction ratio of 30 dB or more pass through the glass polarizer. Generally, it is difficult to handle a glass polarizer having a thickness of 30 µm.

According to Example 1, a continuous and complete polarization control device can be inserted into a trench which is formed at any desired position on an optical-waveguide substrate or an optical-fiber substrate.

A PbS optical transmission detector 13-8 made by using a glass plate is inserted into the third trench. This detector can function as an optical power monitor. Another kind of an optical detector, such as an InP optical detector, may be used if the device is polished to have a thickness of approximately 15 µm.

As for the voltage $V_0$ applied to two 8-electrode patterns of the liquid crystal device, two parameters of (i) angle θ, on which the direction of an electric field applied to the center of the group of the 8 electrodes depends, and (ii) intensity E of the electric field are controlled so as to convert any polarization direction into a linear polarization.

Specifically, these two parameters are controlled so as to have the maximum power of light which passes through the polarizer. That is, the polarization control device is controlled so that the light which passes through the polarizer always has maximum power. Accordingly, light incident on the waveguide can always be vertically or horizontally polarized with respect to the direction of the waveguide; thus, it is unnecessary to consider polarization dependence of the waveguide. Therefore, the functions of the waveguide can be considerably improved.

For example, undesired polarization dependence of a waveguide-type optical switch can be solved. In addition, polarization dependence of approximately 3 dB of an optical attenuator can also be canceled. Additionally, inferior wavelength selectivity due to polarization dependence of an AWG filter can also be solved. Generally, a specific method is necessary for making an SOA (semiconductor optical amplifier) on waveguides in a polarization insensitive state; however, such a method is unnecessary according to the present example.

The above-explained polarization control technique can also be applied to compensation of polarization dispersion.

EXAMPLE 2

Example 2 of the present embodiment relates to a method of manufacturing a liquid crystal plate used for polarization control, which is obtained by inserting a parallel-aligned liquid crystal plate or a twisted nematic liquid crystal plate into a substrate.

In the above Example 1, the polarization control device is realized using a liquid crystal rotatable wavelength plate having an 8-electrode pattern. However, polarization control can also be performed by arranging two parallel-aligned liquid crystal plates (i.e., conventional liquid crystal plates) in a cascade form at an angle of 0° and an angle of 45°. In addition, a twisted nematic liquid crystal may be inserted so as to convert TM-polarized incident light (on a waveguide) into TE-polarized light or to convert TE-polarized incident light into TM-polarized light.

FIGS. 27A to 28C are diagrams for explaining the processes for manufacturing parallel-aligned liquid crystal plates in Example 2. Reference numeral 14-1 indicates stripe transparent electrodes (ITO electrodes) patterned so as to have the same pitch as that of the waveguides, reference numeral 14-2 indicates a glass plate having a thickness of 0.5 mm or more, reference numeral 14-3 indicates a glass plate obtained by polishing the glass plate 14-2 so as to have a thickness of 15 µm or less, reference numeral 14-4 indicates a glass block, reference numeral 14-5-1 indicates a spacer, reference numeral 14-5-2 indicates an alignment layer, reference numeral 14-5-3 indicates a liquid crystal, reference numeral 14-6 indicates a core, reference numeral 14-7 indicates a parallel-aligned nematic liquid crystal device arranged such that the alignment is directed at 0°, reference numeral 14-8 indicates a parallel-aligned nematic device arranged such that the alignment is directed at 45°, reference numeral 14-9 indicates a glass polarizer, and reference numeral 14-10 indicates an optical transmission detector.

First, liquid crystal devices are manufactured according to processes similar to those of the above Example 1. Here, two parallel-aligned liquid crystal devices are manufactured, where one of them has an alignment direction parallel to the waveguides while the other has an alignment direction rotated with respect to the direction of the waveguides by 45°. In each device, a cell gap of approximately 20 µm is filled with a nematic liquid crystal (whose Δn (changes in the refractive index) is large, such as 0.25). Accordingly, the optical path length can be controlled by 4 to 5 µm, thereby controlling the phase by 0 to 6π.

In order to continuously and completely control the polarization direction, an additional liquid crystal plate is necessary, that is, three plates are used for performing a "reset control".

Figure 27A:
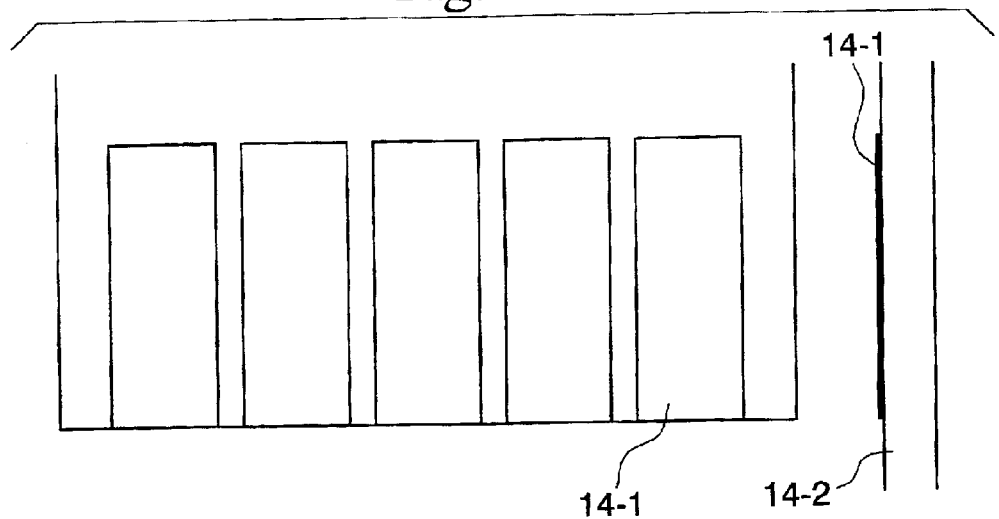
FIGS. 27A to 27C are diagrams for explaining the processes for manufacturing parallel-aligned liquid crystal plates as Example 2 of the second embodiment.
Figure 27B:
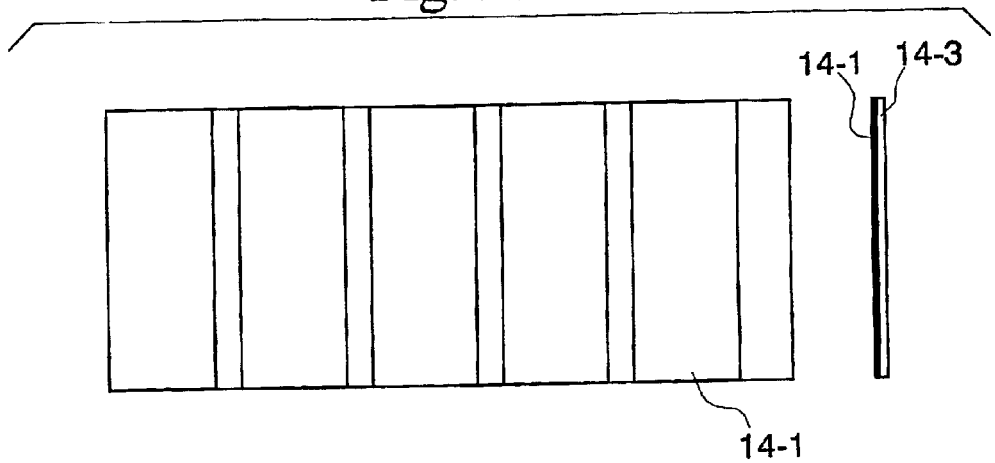

In the first step of the manufacturing process of the present Example 2, as shown in FIG. 27A, the glass plate 14-2 on which the stripe transparent electrodes 14-1 are formed is prepared, and this glass plate 14-2 is polished so as to have a thickness of 10 to 12 μm and is then cut into pieces (see FIG. 27B).

Figure 27C:
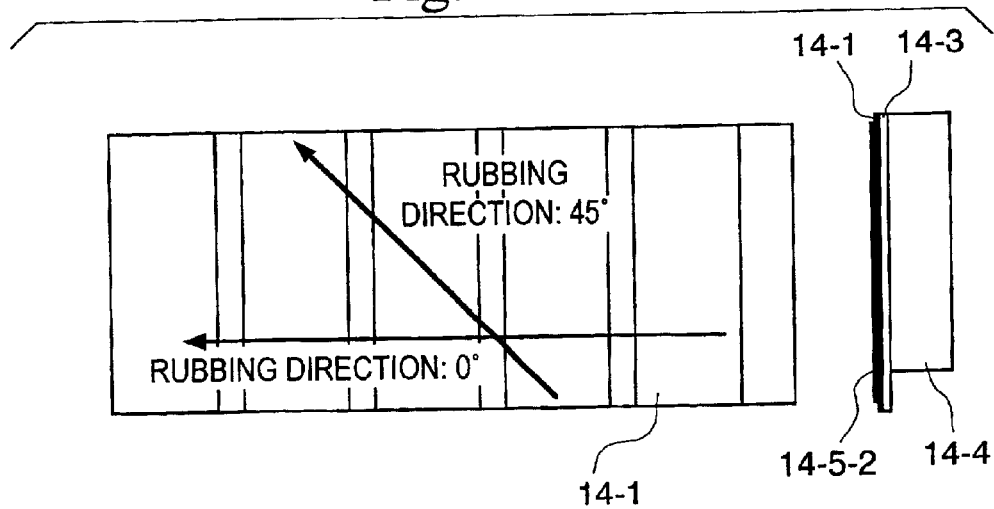

In the next process, as shown in FIG. 27C, the glass block 14-4 is attached to a face of the polished thin glass plate 14-3, and the other face of the glass plate 14-3 is coated with an alignment layer 14-5-2. Four such glass plates are prepared, and two plates are subjected to rubbing in the direction of 0° while the remaining two plates are subjected to rubbing in the direction of 45°.

Figure 28A:
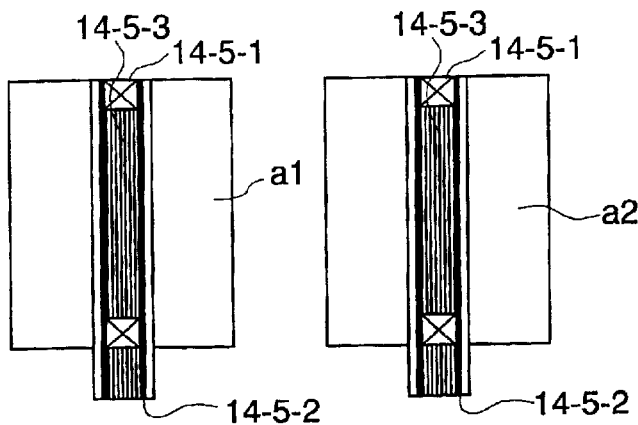
FIGS. 28A to 28C are diagrams for explaining the following processes for manufacturing the parallel-aligned liquid crystal plates in Example 2.

In the following process, as shown in FIG. 28A, two plates having 0°-alignment are adhered via spacers (see reference symbol a1) while the remaining two 45°-alignment are adhered via spacers (see reference symbol a2). The space between each pair of the glass plates is filled with the liquid crystal 14-5-3.

Figure 28B:
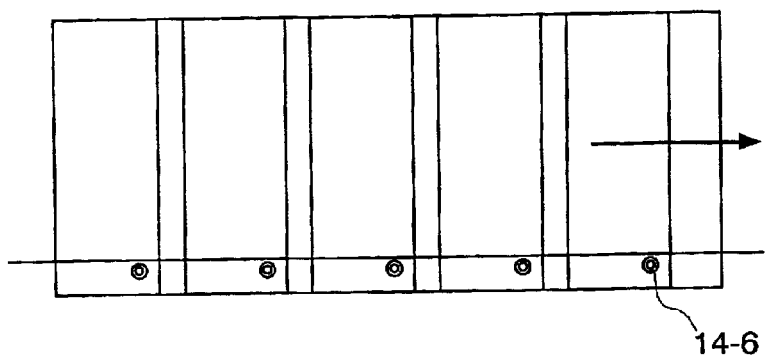

Next, as shown in FIG. 28B, each glass plate is inserted into a trench of the optical waveguides and adjustment between the transparent electrodes and corresponding optical paths is performed. In this adjustment, each glass block is moved in the direction parallel to the trench so as to make light pass through the glass plate. That is, the adjustment is performed in a single direction and thus is easy.

Figure 28C:
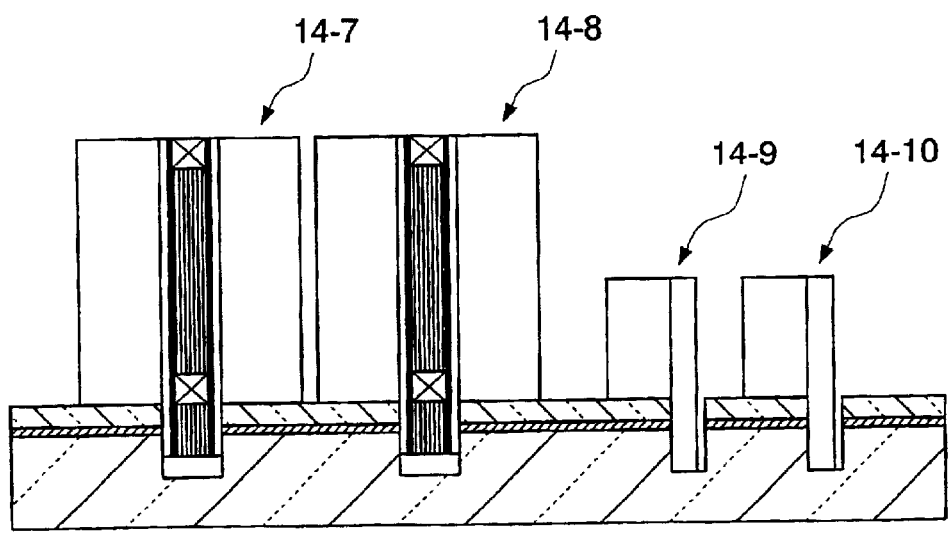

As shown in FIG. 28C, the parallel-aligned nematic device (i.e., liquid crystal plate) 14-7 having an alignment angle of 0° and the parallel-aligned nematic device (i.e., liquid crystal plate) 14-8 having an alignment angle of 45° are inserted into corresponding trenches, and the glass polarizer 14-9 and the optical transmission detector 14-10 are also inserted into other trenches.

In FIGS. 27A to 28C, the manufactured liquid, crystal devices are inserted into the trenches. However, instead of inserting such liquid crystal cells, a polarization control device may be manufactured by the following processes: (i) a thin glass plate having an alignment layer and transparent electrodes is inserted into a trench. (ii) a wall surface on which an alignment layer and transparent electrodes are formed is prepared so as to face the alignment layer and transparent electrodes of the glass plate, and (iii) a liquid crystal is filled into a space between the glass plate and the wall surface.

According to this method, the width of the trench can be thinner by the thickness of a glass plate 14-3, so that radiation loss of passing light can be reduced. In order to realize the minimum loss by reducing the thickness of the glass plate as much as possible in the latter method, a glass plate having a thickness of 10 μm is used.

The processes according to this method will be explained with reference to FIGS. 29A to 30D. In these figures, reference numeral 15-1 indicates transparent electrodes formed from the surface of a waveguide substrate to a wall surface of a trench of the waveguides, reference numeral 15-2 indicates an alignment layer, reference numeral 15-3 indicates a rubbing roll, reference numerals 15-4 and 15-5 indicate glass blocks, reference numeral 15-6 indicates a homogeneous liquid crystal having 0° alignment, reference numeral 15-7 indicates a twisted nematic liquid crystal, reference numeral 15-8 indicates a glass polarizer, and reference numeral 15-9 indicates a transmission detector.

Figure 29A:
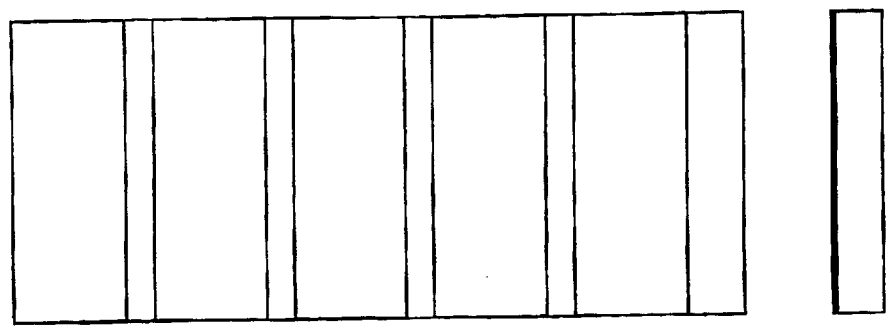
FIGS. 29A to 29C are diagrams showing the processes for manufacturing a polarization control device by effectively using the wall surfaces of the trench in Example 2.
Figure 29B:
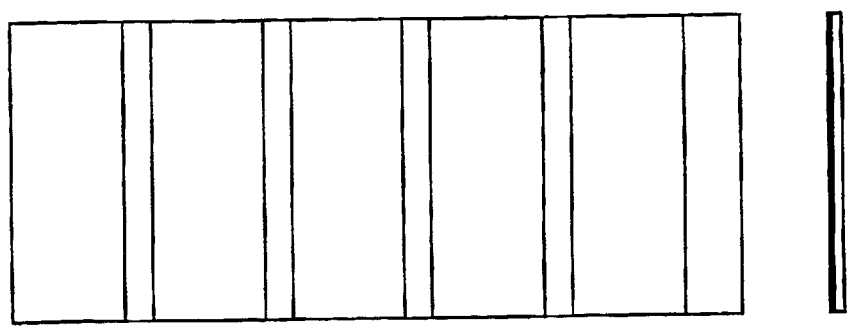
Figure 29C:
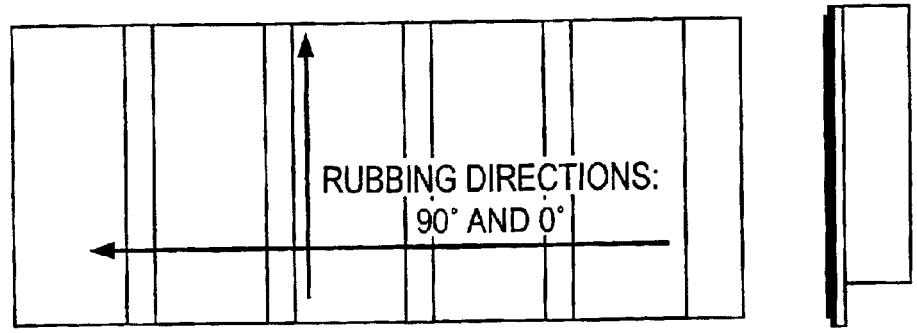

FIGS. 29A to 29C respectively correspond to FIGS. 27A to 27C, that is, FIGS. 29A to 29C show processes corresponding to those explained by referring to FIGS. 27A to 27C, except for the rubbing directions. In the present method, a parallel alignment and a 90°-twisted alignment are employed as shown in FIG. 29C.

Figure 30A:
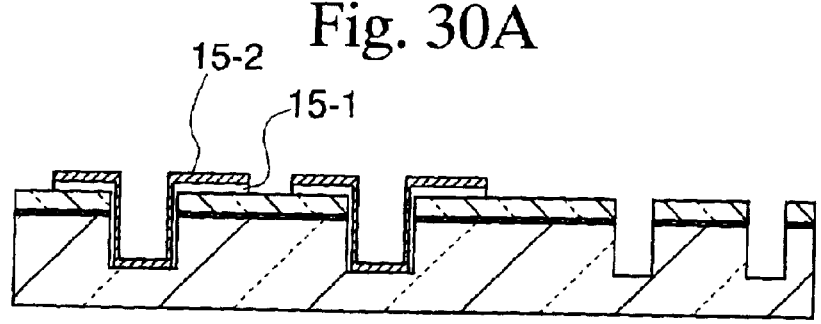
FIGS. 30A to 30D are diagrams showing the processes which follow the process shown by FIG. 29C.

In the process shown by FIG. 30A, the transparent electrodes are formed from the substrate surface to the wall surface of the trench of the waveguides by sputtering, and an alignment layer is further deposited on them.

Figure 30B:
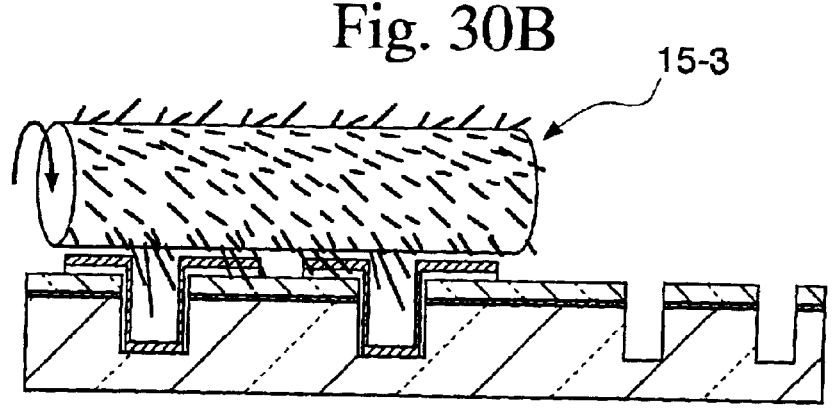

In the process shown in FIG. 30B, the inside of the trench is subject to rubbing using the thinnest rubbing strands (i.e., the diameter of each strand is 15 μm or less), so that the rubbing in the direction of angle 0° is performed on the inside of the trench. The rubbing may be performed by another method, in which a rubbing film thinner than the width of the trench is inserted into the trench, and the film is moved in a single direction so as to rub the wall surfaces of the trench.

Figure 30C:
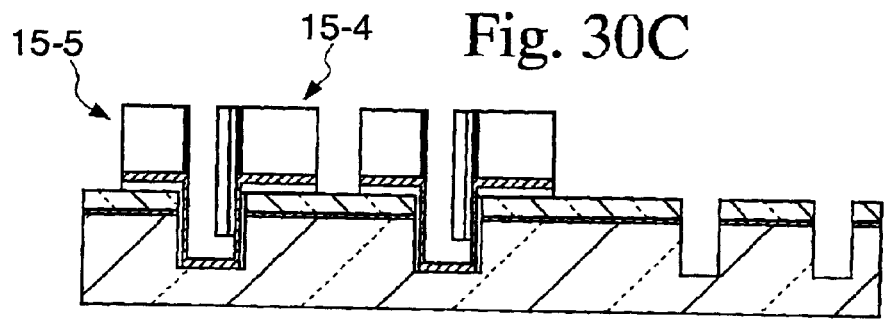
Figure 30D:
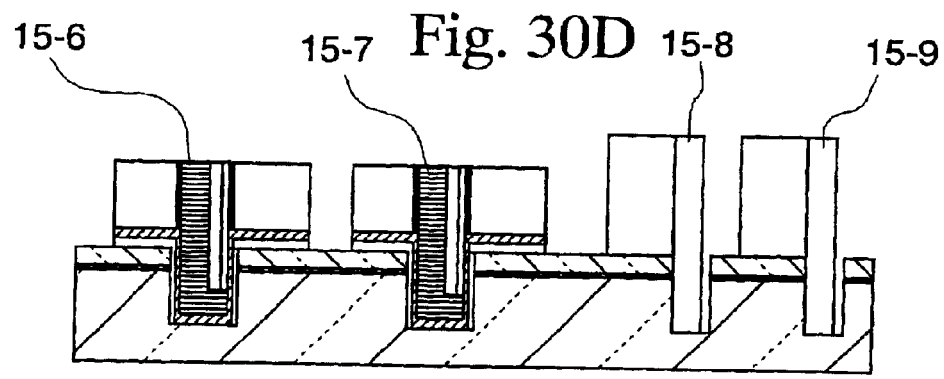

In the process shown in FIG. 30C, the glass plates having 0° and 90° alignment (see FIG. 29C) are respectively inserted into trenches, and each inserted glass plate is adhered so that the glass plate contacts a wall surface of the trench. Also as shown by FIG. 30C, another glass block, having an alignment layer which was subjected to rubbing, is put on the other side of each trench in a manner such that the face on which the alignment layer is formed of the glass block is coplanar with the relevant wall surface of the trench.

Generally, the cell gap is evaluated by referring to inserted spacers. In the present example, cell gap "d" is determined by observation of a relevant cross section by using a microscope or by performing an interference measurement. Based on the cell gap d, Δn suitable for the twisted nematic alignment can be determined by the following formula:

$$u = 2d\Delta n/\lambda, u = \sqrt{3}, \sqrt{5}, \sqrt{35}, \sqrt{63}$$

A liquid crystal having Δn which satisfies the above formula is filled into the gap, thereby realizing a twisted nematic polarization control device having a higher extinction ratio of polarized light. Accordingly, when a voltage of a few V is applied to the electrodes, light which passes through the portion to which the voltage is applied is not changed in polarization. When no voltage is applied, light having linear polarization whose direction is parallel to the waveguide is converted into light having polarization in the vertical direction, while light having polarization in the vertical direction is converted into light having polarization in parallel. This operation is effective even if temperature changes. Accordingly, a polarization control device can be realized.

EXAMPLE 3

In Example 3, the present embodiment is applied to a PLZT modulator.

Devices called "PLZT optical shutter arrays" are practically used in high-speed photo printers for commercial use. PLZT (ceramic) is formed by mixing four oxides which are PbO, $La_2O_3$, $ZrO_2$, and $TiO_2$ and sintering the mixture. The PLZT has the formula $(Pb_{1-x}La_x)(Zr_yTi_z)_{1-x}O_3$, and it is generally known that those having x=9, y=65, and z=35 provide an optimum (level of) electro-optic effect. Specifically, the electro-optic effect of PLZT is on the order of ten times that of lithium niobate.

Figure 31A:
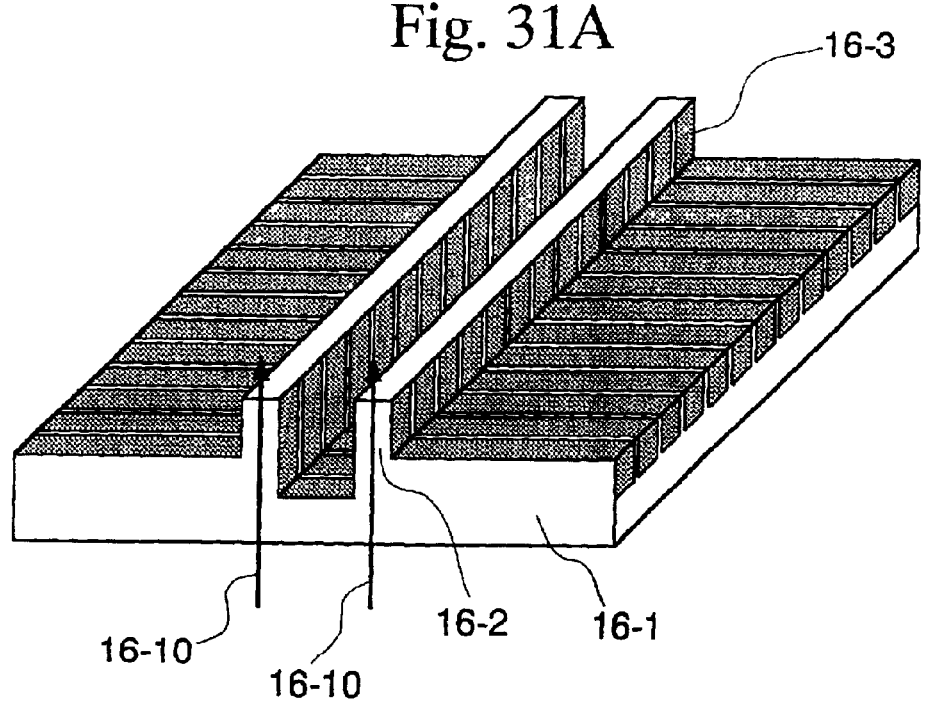
FIGS. 31A to 31C are diagrams showing the structure of an optical shutter array.
Figure 31B:
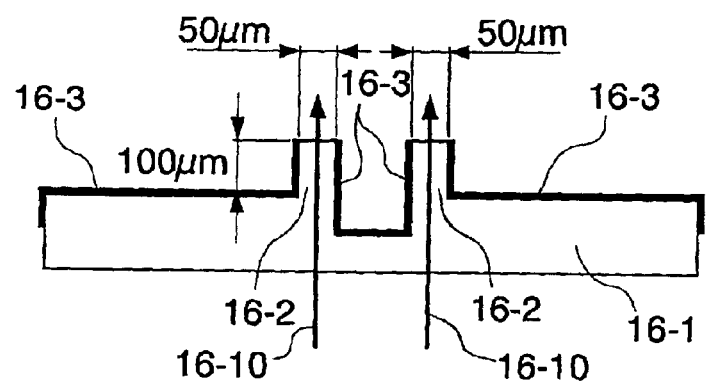
Figure 31C:
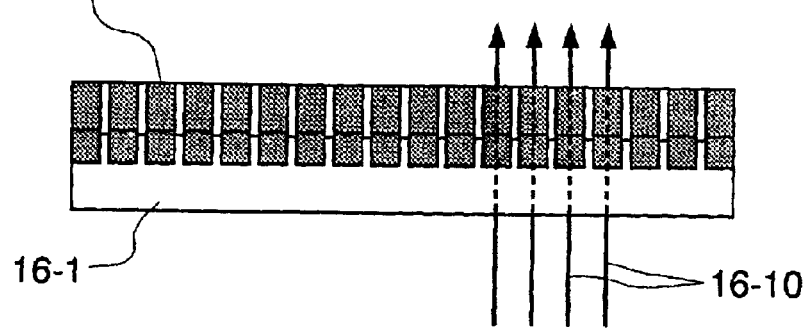

FIGS. 31A to 31C show the structure of a typical optical shutter array which is commercially available. FIG. 31A is a perspective view, FIG. 31B is a front view, and FIG. 31C is a side view.

In FIGS. 31A to 31C, reference numeral 16-1 indicates a PLZT ceramic substrate, and reference numeral 16-2 indicates a shutter portion having a convex shape, where electrodes 16-13 are formed at both sides of the shutter portion so as to modulate a passing optical beam. Reference numeral 16-4 indicates a gap between divided electrodes which are obtained by a dividing operation using a dicing saw machine. As shown by the figures, two optical beams 16-10 are incident on shutter portions from the lower side thereof, and are output from the top thereof.

As shown in FIG. 31B, the electrodes are formed at both sides of each shutter portion, and the distance between these electrodes is 50 μm. The control of the device is performed by applying a half-wave voltage of 50 V to the electrodes. The divided electrodes having a pitch of 50 μm are formed in advance by using a dicing saw machine, so as to realize an electrode array. Accordingly, patterning of the electrodes on the order of 10 μm can be performed using a dicing saw machine.

FIGS. 32A to 33B are diagrams for explaining the processes for manufacturing a PLZT modulator of Example 3 of the present embodiment. In the figures, reference numeral 17-1 indicates an electrode formed on a side face of a PLZT block which has a convex shape, reference numeral 17-2 indicates the PLZT block, reference numeral 17-3 indicates a face at which the PLZT block is sliced using a dicing saw machine, reference numeral 17-4 indicates a convex PLZT chip which was polished after slicing, reference numeral 17-5 indicates a glass block having electrodes, reference numeral 17-6 indicates a conductive paste, reference numeral 17-7 indicates an electrode attached to the glass block, reference numeral 17-8 indicates a waveguide substrate on which trenches are formed, and reference numeral 17-9 indicates an adhesive.

Figure 32A:
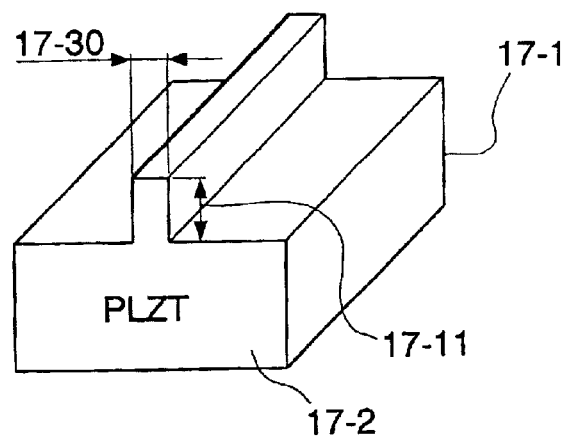
FIGS. 32A to 32E are diagrams for explaining the processes for manufacturing a PLZT modulator as Example 3 of the second embodiment.

As shown in FIG. 32A, a PLZT block having a convex shape is prepared and an electrode is formed on each side face of the block. The electrode may be made of Al; however, in consideration of the polishing process, a Cr film, which has superior adhesiveness, is deposited here. The width of the convex portion 17-30 is 30 to 50 μm, and the height 17-11 is 100 to 200 μm.

Figure 32B:
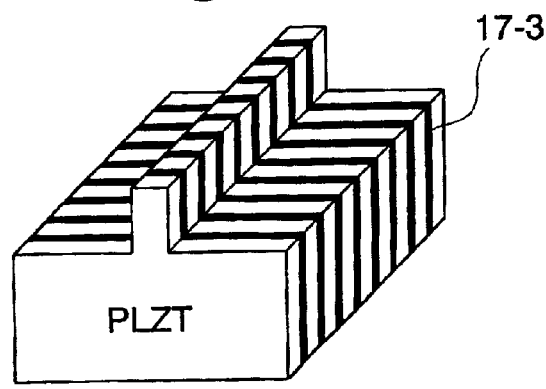
Figure 32C:
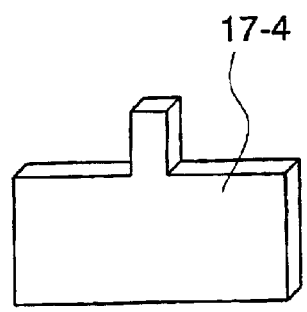

As shown in FIG. 32B, the PLZT block is sliced using a dicing saw machine so that a piece having a thickness of 50 to 100 μm is obtained. As shown in FIG. 32C, this piece is polished so as to have a PLZT chip having a thickness of 30 to 50 μm.

Figure 32D:
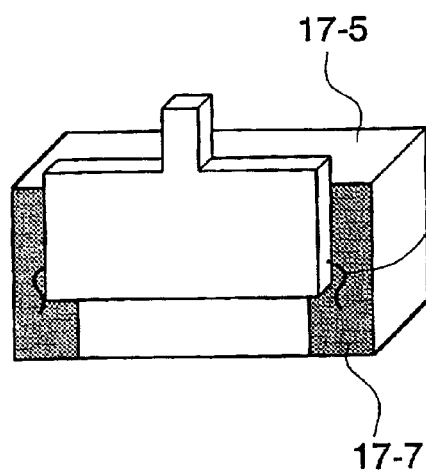

As shown in FIG. 32D, the PLZT chip is adhered to the glass block (having electrodes) in a manner such that a portion which functions as a modulating portion protrudes from the glass block. Here, two kinds of the above-explained structures are prepared: one is obtained by adhering a PLZT chip in parallel to the glass block (see FIG. 32D) and the other is obtained by adhering a PLZT chip which is inclined with respect to the glass block by 45° (see FIG. 32E). The electrodes of the PLZT chip and the glass block are connected by using solder or silver paste.

Figure 32E:
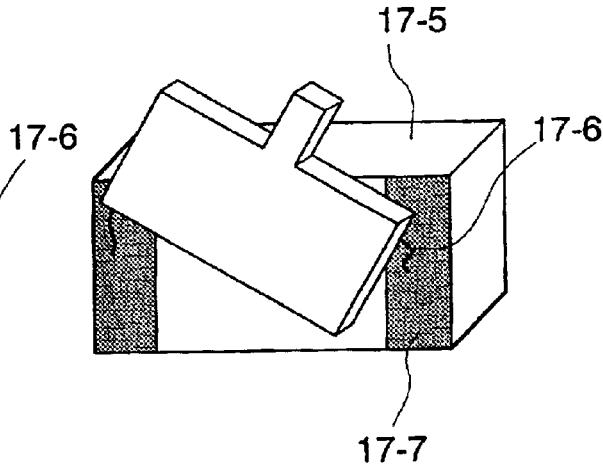
Figure 33A:
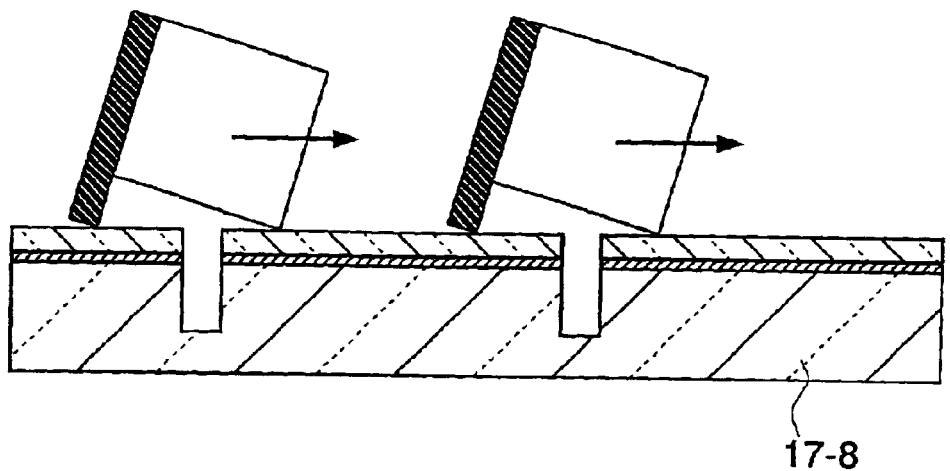
FIGS. 33A and 33B are diagrams for explaining the processes which follow the process shown by FIG. 32E.

In the next process, as shown in FIG. 33A, trenches, each having a width of approximately 70 μm, are formed in the waveguides. The devices having PLZT chips as shown in FIGS. 32D and 32E are put on the waveguides in a manner such that the devices are inclined so as to prevent the devices from falling onto the waveguide substrate (i.e., an optical-waveguide substrate or an optical-fiber substrate). Each device is then slid on the substrate so as to insert the chip into the corresponding trench.

Figure 33B:
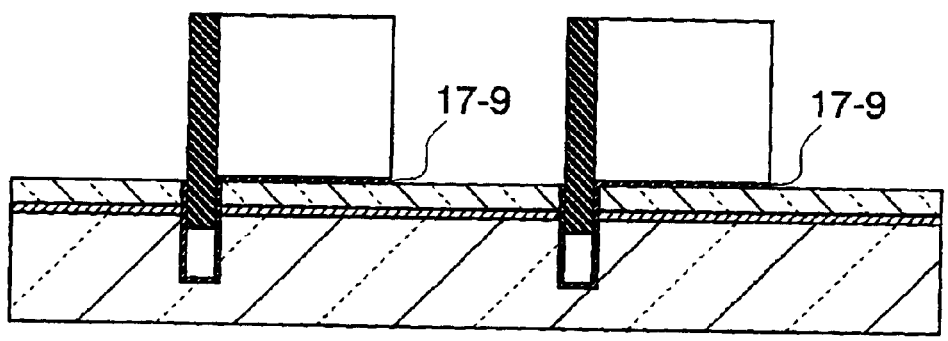

In the process shown in FIG. 33B, the adjustment for making each waveguide core coincide with the corresponding modulating portion is performed by moving the glass block in a direction parallel to the trench. After the adjustment, the device is adhered to the substrate by using an adhesive which has a refractive index suitable for the optical-waveguide substrate and the device. When a voltage of approximately 100 V is applied to the device, "π modulation" can be performed.

When two PLZT modulators (i.e., PLZT modulating devices), which have 0° and 45° inclination as explained above, are arranged in a cascade form, it is possible to convert incident light having any direction of polarization into light having a linear polarization. The speed of response of PLZT is high such as 10 ns.

The above PLZT device is a two-electrode type. In this type, two devices having the above-explained 0° and 45° inclination must be inserted into trenches so as to control the polarization. Furthermore, additional two PLZT modulators are necessary in order to perform continuous and complete polarization control. A structure of a PLZT modulator (i.e., a single device) for executing continuous and complete polarization control is shown by FIGS. 34A and 34B.

Figure 34A:
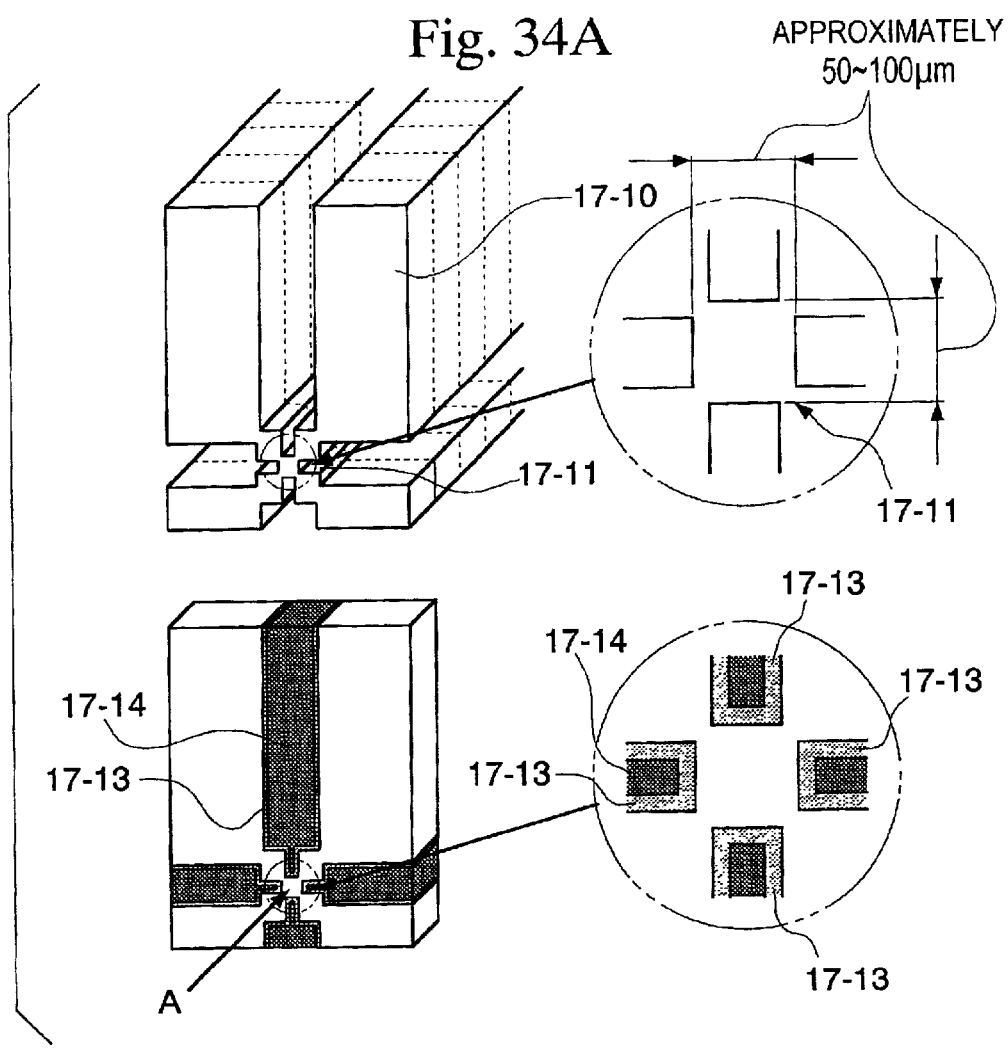
FIGS. 34A and 34B are diagrams for explaining the processes for manufacturing a PLZT modulator as a variation of Example 3.
Figure 34B:
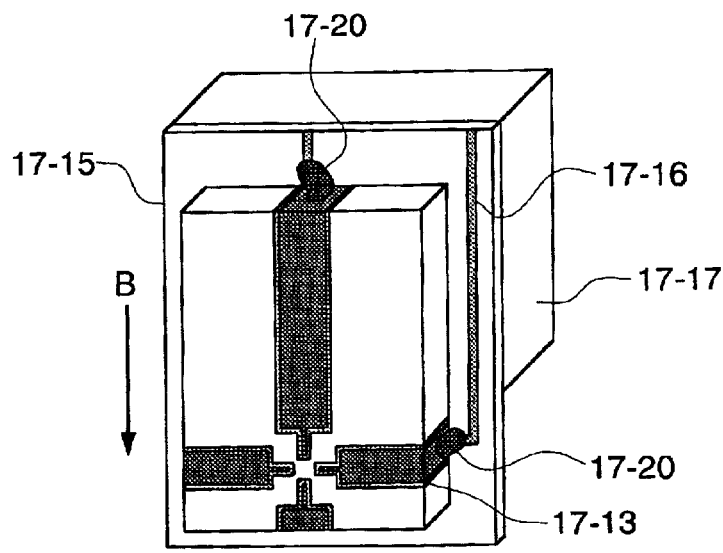
Figure 35A:
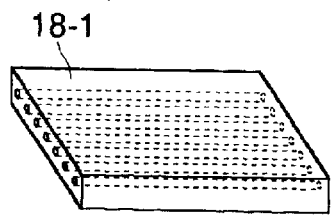
FIGS. 35A to 35D are diagrams for explaining the processes for inserting a wavelength plate made of polyimide by using RIE, as Example 4 of the second embodiment.
Figure 35B:
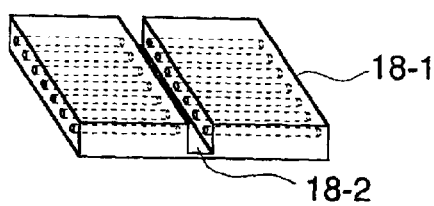
Figure 35C:
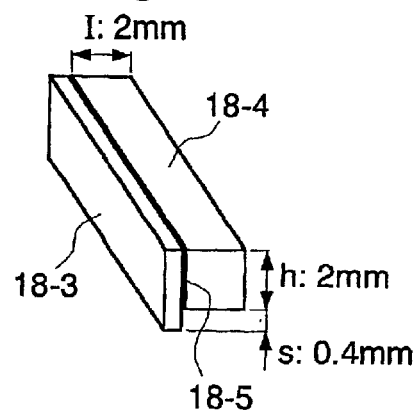
Figure 35D:
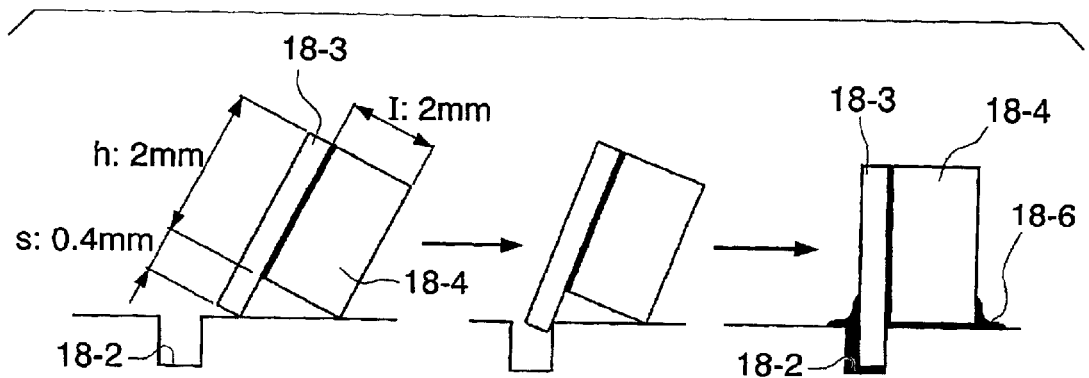

FIGS. 34A and 34B are diagrams for explaining the processes for manufacturing a PLZT modulator as a variation of Example 3. Reference numeral 17-10 indicates a PLZT rectangular bar which has four trenches dug from the upper, lower, right, and left sides of the bar. Reference numeral 17-11 indicates a window portion of PLZT through which light passes, reference numerals 17-13 indicate electrodes formed so as to surround the window portion, and reference numeral 17-14 indicates a conductive adhesive used for reinforcement. Reference numeral 17-15 indicates a thin glass plate having a thickness of approximately 15 μm, reference numeral 17-16 indicates an electrode pattern formed on the glass plate 17-15, and reference numeral 17-17 indicates a glass block.

In the PLZT modulator as shown by FIGS. 34A and 34B in Example 3, four electrodes 17-13 are formed in a manner such that a window portion through which light passes is surrounded by the electrodes (in FIG. 34A, arrow A indicates the incident direction of light). Four trenches are formed in a rectangular PLZT bar (each cross section has a size of 500 μm×1000 μm) by digging four sides (i.e., upper, lower, right, and left sides) of the bar by using a dicing saw machine, so that a center square portion (each side has a length of 50 to 100 μm), through which light passes, remains.

Next, the electrodes 17-13 are formed by sputtering on side faces of each T-shaped trench of the PLZT bar. The conductive adhesive 17-14 for reinforcement is filled into each trench. This PLZT bar is cut by slicing and is then polished so as to have a thickness of approximately 120 μm. The obtained PLZT chip is adhered to the thin glass plate 17-15 on which electrodes 17-16 are formed. The electrodes 17-3 and the conductive adhesive 17-14 are connected to the electrodes 17-16 by using silver paste 17-20. The glass block 17-17 is attached to the glass plate 17-15.

Similar to the processes shown by FIGS. 33A and 33B, this device is inserted into a trench formed on a waveguide substrate (in FIG. 34B, arrow B indicates the direction of insertion). The voltage applied to each of the four electrodes 17-13 is controlled so as to change the phase and direction of polarization of incident light. Therefore, continuous and complete polarization control can be performed by using a single device.

EXAMPLE 4

In order to insert a wavelength plate made of polyimide, which has a thickness of approximately 15 μm, into waveguides, a trench having a width of approximately 20 μm and a depth of approximately 200 μm is formed and the wavelength plate is inserted into the trench by using tweezers. Generally, polyimide is flexible and is thus not damaged when picked up by tweezers. However, in order to reduce radiation loss of light, reactive etching such as RIE is used. When RIE is used for forming a trench, the possible maximum depth is approximately 50 to 100 μm.

If a wavelength plate which is made of polyimide and has a thickness of 15 μm is inserted into a trench which has a width of 20 μm and a depth of 50 μm, the trench is too shallow to stably fix the thin polyimide film, so that the wavelength plate may be dropped FIGS. 35A to 35D are diagrams for explaining the processes for inserting a wavelength plate made of polyimide by using RIE. Reference numeral 18-1 indicates 10 optical waveguides, reference numeral 18-2 indicates a trench formed by RIE etching, reference numeral 18-3 indicates a polyimide film, reference numeral 18-4 indicates a glass block, reference numeral 18-5 indicates an adhesive, and reference numeral 18-6 indicates an adhesive whose refractive index is suitable for the adhered portions.

As shown in the figures, a trench having a width of approximately 20 μm and a depth of approximately 50 μm is formed using RIE. As explained in the previous examples, the polyimide film is attached to a glass block in a manner such that a portion of the film (here, approximately 40 μm) protrudes from the glass block. The block is then slid on the waveguides and the film is inserted into the trench. Therefore, a planar film can be inserted into a narrow and shallow trench.

EXAMPLE 5

According to the present embodiment, a transmission detector can be realized. In an optical communication system, the power of light in optical fibers or waveguides should always be monitored. In current systems, a portion of light is extracted using an optical beam splitter or an optical coupler and the extracted light portion is monitored by using a detector. However, such a system requires a large space.

In order to monitor the power of light, a narrow trench having a width of approximately 15 to 30 μm is formed so as to insert a transmission detector into the trench. A single crystal detector made of InGaAs or Ge, which is conventionally used as a detector, may be polished so as to have the above-explained detector which is inserted into a narrow trench. On the other hand, a PbS or PbSe film may be formed on a glass plate so as to realize the detector, where a window portion through which light passes is formed in the film.

For example, a thin PbS film is deposited on a glass plate, and a window through which an optical beam having a diameter of 10 μm can pass is formed by photo processing. In this process, a positioning mark is provided at a position measured from the position of the window (through which light passes) by a distance corresponding to the depth of the waveguide core. The glass plate on which the PbS Film is formed is then polished so as to have a thickness of 10 to 15 μm. The polished plate is then divided into chips, and a chip is adhered to a glass block. This process of adhering the chip is performed such that the above-explained positioning mark coincides with the bottom face of the glass block.

When the chip is inserted into the trench, adjustment for making the position of window of PbS, through which light passes, coincide with the position of the corresponding waveguide core is performed. The PbS device is then fixed. The diameter of the optical beam which passes across the trench is slightly larger than the diameter of the core, and the extra light portion corresponding to the above difference of diameter is converted into an electric signal by PbS. Therefore, it is possible to monitor the power of light without separately extracting a portion of light which passes through an optical fiber or waveguide.

EXAMPLE 6

According to the present embodiment, a thin polarizer can be inserted into waveguides.

Polarized beam splitters having a cube shape are often used as a polarizer having a high extinction ratio of polarized light. Planar polarizers, made by drawing a polymeric material, have a thickness of a few hundred micrometers and have a low extinction ratio. Corning Inc. has developed a glass polarizer made by dispersing silver particles into glass and melting and drawing the glass. The thickness of this polarizer is 30 to a few hundred micrometers. Even a thin type having a thickness of 30 μm reliably realizes an extinction rate of 30 dB or more.

However, it is difficult to handle the polarizer having a thickness of 30 μm; thus, commercially available polarizers of this type have a structure in which a polarizer is put between glass plates for reinforcement. In this example, a planar polarizer, having a size of a few millimeters by a few millimeters and a thickness of 30 μm, is adhered to a glass block having a size of 2 mm (see reference symbol "I") by 2 mm (see reference symbol "h"), where a portion of the polarizer protruding from the glass plate has a length (see reference symbol "s") of 400 μm. The protruding portion is inserted into a trench which has a width of approximately 40 μm and is formed on an optical-waveguide substrate or an optical-fiber substrate.

The above measures satisfy the condition "I/h>s/I" for preventing the block from falling; thus, the block is put on the waveguides in a manner such that the block is slightly inclined. Accordingly, the polarizer can be inserted into a trench by stably sliding the inclined block on the substrate. Therefore, a linear polarization of 30 dB can be realized in the optical waveguides.

EXAMPLE 7

The thickness of the PLZT chip as shown by FIGS. 34A and 34B is approximately 120 μm. Therefore, when this chip is inserted into a trench having a width of approximately 150 μm, the radiation loss of light due to diffraction loss in the trench is large (such as 2.5 dB), and the half-wave voltage is high (such as 130 V). A structure for solving this problem will be explained with reference to FIGS. 36A to 37B.

Figure 36A:
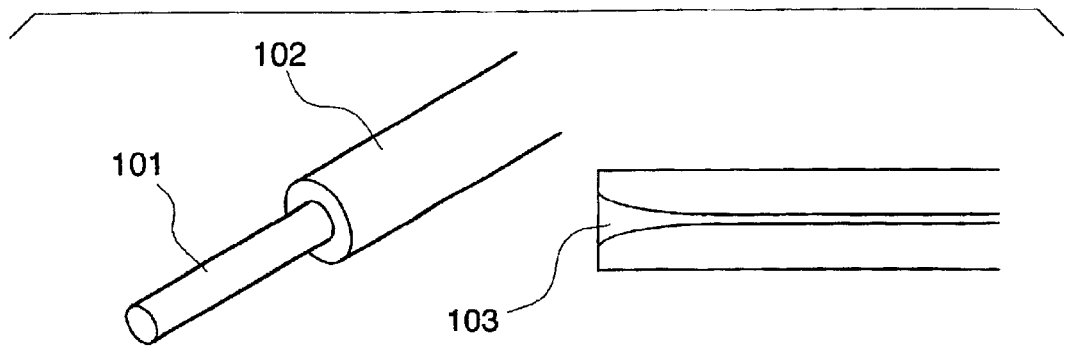
FIGS. 36A to 36C are diagrams for explaining the processes for inserting an optical device when TEC fibers are used, as Example 7 of the second embodiment.

The diameter of the core of a normal optical fiber is approximately 10 μm. In this example, the core is expanded by thermal processing. This fiber having an expanded core is called a TEC fiber (thermally expanded core fiber). As shown by FIG. 36A, reference numeral 101 indicates a bare fiber of an optical fiber, reference numeral 102 indicates a coat of the optical fiber, and reference numeral 103 indicates an expanded portion of the core of the optical fiber.

Figure 36B:
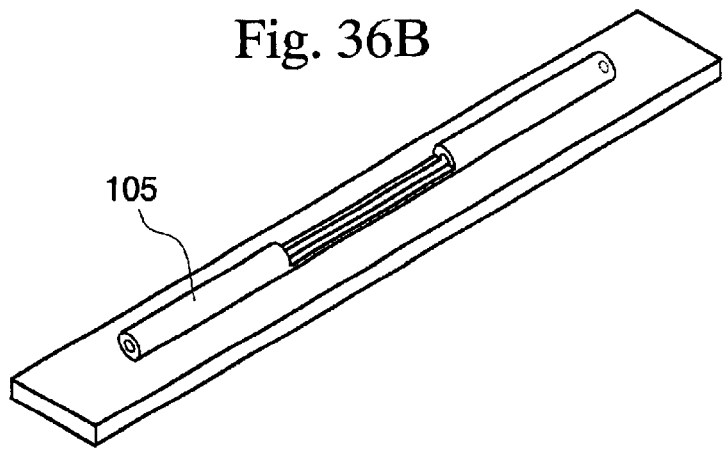
Figure 36C:
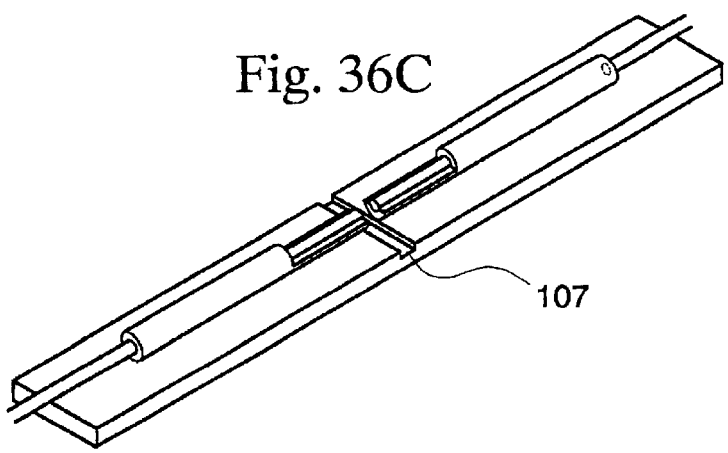

Such TEC fibers are inserted from both ends of a fiber splicer as shown by FIG. 36B, and a trench 107 having a width of approximately 300 μm is formed using a dicing saw machine (see FIG. 36C).

In the next step, a polished PLZT chip 109 having a thickness of approximately 280 μm is attached to a glass plate 110 which has a thickness of approximately 15 μm. The glass plate is then attached to a glass block 112, and the glass plate 110 to which the PLZT chip 109 is attached is inserted into the above-described trench (see FIG. 37A in which reference numeral 111 indicates an electrode).

Figure 37A:
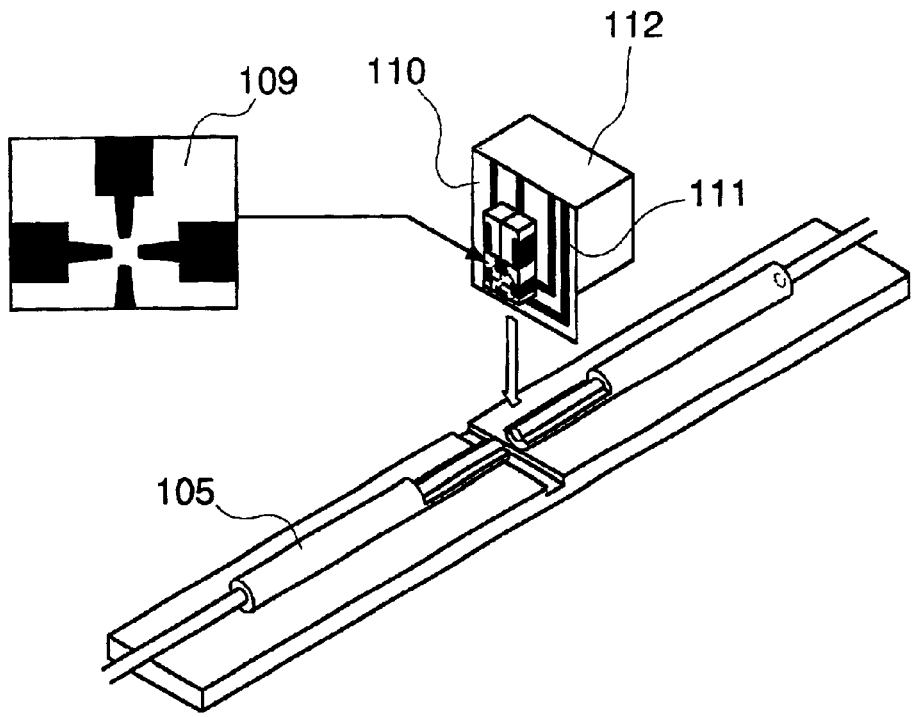
FIGS. 37A and 37B are diagrams for explaining the processes which follow the process shown by FIG. 36C.
Figure 37B:
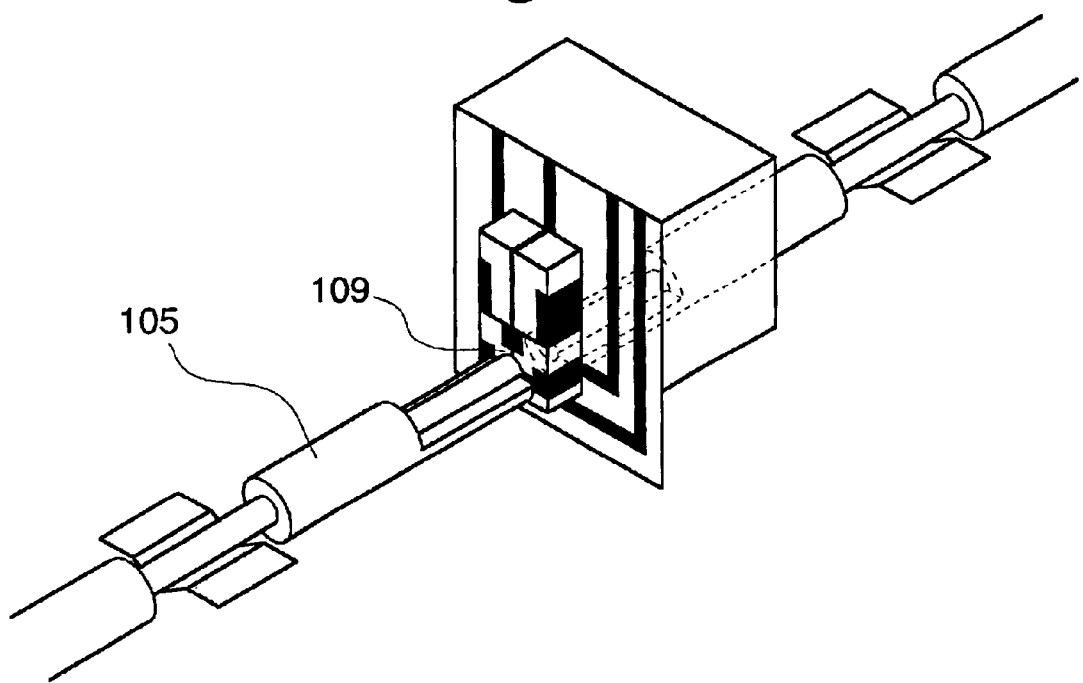
Figure 38A:
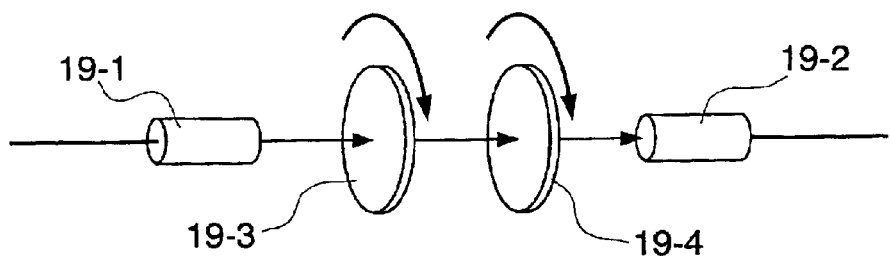
FIGS. 38A to 38D show typical optical devices using collimating fibers.
Figure 38B:
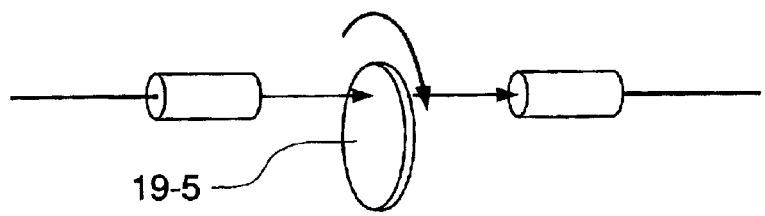
Figure 38C:
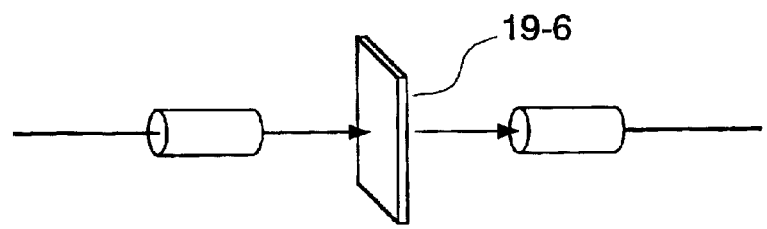
Figure 38D:
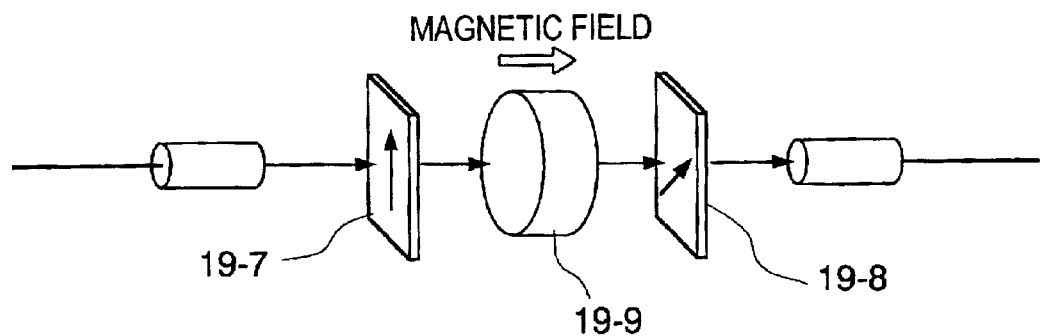

After the insertion, adjustment is performed for making the center position of a window of the PLZT chip coincide with the optical path, and then the PLZT device is fixed (see FIG. 37B).

In the above structure using a TEC fiber, the radiation loss is 1 dB or less and the half-wave voltage is low (such as 50 V) even when the width of the trench is 300 μm.

Instead of using the fiber splicer, a V-shaped groove for fixing an optical fiber may be formed on the waveguide substrate.

The specific examples belonging to the two embodiments according to the present invention have been explained. However, the present invention is not limited to these examples, and various variations and modifications are possible within the scope and spirit of the present invention.

What is claimed is:

1. A waveguide-type optical device comprising:

a substrate in which optical waveguides or optical fibers are provided, and a trench in the substrate cutting across the optical waveguides or the optical fibers for dividing the optical paths of the optical waveguides or the optical fibers;

a pair of transparent electrodes assigned to each optical waveguide or optical fiber and formed on the substrate, one electrode on each side of the trench and extending from the surface of the substrate at each side of the trench onto the respective wall surface of the trench; and a material or device filled or inserted into the trench, and which has one of an electro-optic effect, a thermo-optic effect, a light emitting function, a light receiving function, and a light modulating function, wherein light emitted from one of the divided portions of each of the optical waveguides or the optical fibers goes through the transparent electrode to the material or the device.

2. A waveguide-type optical device as claimed in claim 1, wherein the electrodes are part of a flexible substrate which lies on a member of an anisotrope rubber on the surface of the device substrate, and a voltage is applied to the material or device via the electrodes.

3. A waveguide-type optical device as claimed in claim 1, wherein the material or device filled or inserted into the trench is arranged perpendicularly to the propagation direction of the light for forming one of a surface-normal optical modulator, a surface light emitting device, and a surface-normal detector which has one of a light emitting function, a light receiving function, and a light modulating function.

4. A waveguide-type optical device comprising:

a substrate on which optical waveguides or optical fibers are provided and a linear trench cutting across the optical waveguides or the optical fibers to divide each of the optical waveguides or the optical fibers into two portions;

a pair of electrodes assigned to each optical waveguide or optical fiber and formed in a direction substantially perpendicular to the longitudinal direction of the trench, from the surface of the substrate a both sides of the trench to wall surfaces of the trench;

a material or a surface-normal optical device filled or inserted into the trench, and which has one of an electro-optic effect, a thermo-optic effect, a light emitting function, a light receiving function, and a light modulatin function, wherein light emitted from one of the divided portions of each of the optical waveguides or the optical fibers passes through the material or the surface-normal optical device and is incident on the other of the divided portions; and wherein the material or device which is filled or inserted into the trench is one of a nematic liquid crystal having an electro-optic effect, a cholesteric-nematic phase transition type liquid crystal, a polymer network liquid crystal, a polymer-dispersed liquid crystal, a polymer-stabilized liquid crystal, a dynamic scattering liquid crystal, and a ferroelectric liquid crystal.

5. A waveguide-type optical device as claimed in claim 4, wherein the material or device filled or inserted into the trench is a polymeric material having a thermal-optic effect.

6. A waveguide-type optical device as claimed in claim 4, wherein:

the material or device which is filled or inserted into the trench is a polymer-dispersed liquid crystal;

which is one of a normal polymer-dispersed liquid crystal in which each particle has a diameter of 0.5 μm or more, and a nanosize droplet liquid crystal in which each particle has a diameter of 150 nm or less.

7. A manufacturing method of a waveguide-type optical device, comprising the steps of:

forming a linear trench on a substrate in which optical waveguides or optical fibers are provided, in a manner such that the trench divides the optical waveguides or the optical fibers into two portions;

forming a pair of electrodes, assigned to each optical waveguide or optical fiber, each electrode of a pair being on one side of the trench in a direction substantially perpendicular to the longitudinal direction of the trench, and extending from the surface of the substrate at both sides of the trench and the respective wall surfaces of the trench; and filling or inserting a material or a surface-normal optical device into the trench, which has one of an electro-optic effect, a thermo-optic effect, a light emitting function, a light receiving function, and a light modulating function, wherein light emitted from one of the divided portions of each of the optical waveguides or the optical fibers passes through the material or the surface-normal optical device and is incident on the other of the divided portions.

8. A manufacturing method as claimed in claim 7, wherein the electrodes are formed by sputtering or vapor deposition.

9. A method of manufacturing a waveguide-type optical device, comprising the steps of:

forming a linear trench on a substrate on which optical waveguides or optical fibers are provided, in a manner such that the trench cuts across the optical waveguides or the optical fibers to divide each of the optical waveguides or the optical fibers into two portions;

forming a pair of electrodes, which is assigned to each optical waveguide or optical fiber, in a direction substantially perpendicular to the longitudinal direction of the trench, from the surface of the substrate at both sides of the trench to wall surfaces of the trench; and filling or inserting a material or a surface-normal optical device into the trench, which has one of an electro-optic effect, a thermo-optic effect, a light emitting function, a light receiving function, and a light modulating function, wherein light emitted from one of the divided portions of each of the optical waveguides or the optical fibers goes straight through the material or the surface-normal optical device and is incident on the other of the divided portions;

wherein the step of forming a pair of electrodes includes:

inserting a polymer material into the trench and selectively removing a portion of the polymer material; and performing patterning of said pair of electrodes, which is assigned to each optical waveguide or optical fiber, on the wall surfaces of the trench by etching.

10. A manufacturing method as claimed in claim 9, wherein the step of forming a pair of electrodes includes:

patterning the electrodes on the wall surfaces of the trench by directly using a laser beam.

11. A method of manufacturing a waveguide-type optical device, comprising the steps of:

forming a linear trench on a substrate on which optical waveguides or optical fibers are provided, in a manner such that the trench cuts across the optical waveguides or the optical fibers to divide each of the optical waveguides or the optical fibers into two portions;

forming a pair of electrodes, which is assigned to each optical waveguide or optical fiber, in a direction substantially perpendicular to the longitudinal direction of the trench, from the surface of the substrate at both sides of the trench to wall surfaces of the trench; and filling a material to the trench, which has one of an electro-optic effect, a thermo-optic effect, a light emitting function, a light receiving function, and a light modulating function, wherein light emitted from one of the divided portions of each of the optical waveguides or the optical fibers goes straight through the material or the surface-normal optical device and is incident on the other of the divided portions;

wherein a liquid crystal is filled into the trench, and the filling step includes:

coating each wall surface of the trench with an alignment layer for the liquid crystal;

rubbing the alignment layer by inserting a tape and pulling the tape in a single direction;

filling a polymer-stabilized liquid crystal into the trench; and performing alignment of the liquid crystal by irradiation of ultraviolet light while a magnetic field is applied to the liquid crystal.

12. A method of manufacturing a waveguide-type optical device comprising the steps of:

forming a linear trench on a substrate on which optical waveguides or optical fibers are provided, in a manner such that the trench cuts across the optical waveguides or the optical fibers to divide each of the optical waveguides or the optical fibers into two portions;

forming a pair of electrodes, which is assigned to each optical waveguide or optical fiber, in a direction substantially perpendicular to the longitudinal direction of the trench, from the surface of the substrate at both sides of the trench to wall surfaces of the trench; and filling a material into the trench, which has one of an electro-optic effect, a thermo-optic effect, a light emitting function, a light receiving function, and a light modulating function, wherein light emitted from one of the divided portions of each of the optical waveguides or the optical fibers goes straight through the material or the surface-normal optical device and is incident on the other of the divided portions;

wherein a liquid crystal is filled into the trench, and the filling step comprises:

coating each wall surface of the trench with a photo-alignment layer for the liquid crystal; and performing alignment of the liquid crystal by irradiating the photo-alignment layer with first and second polarized ultraviolet light beams.

13. A method of manufacturing a waveguide-type optical device comprising the steps of:

forming a linear trench on a substrate on which optical waveguides or optical fibers are provided, in a manner such that the trench cuts across the optical waveguides or the optical fibers to divide each of the optical waveguides or the optical fibers into two portions;

forming a pair of electrodes, which is assigned to each optical waveguide or optical fiber, in a direction substantially perpendicular to the longitudinal direction of the trench, from the surface of the substrate at both sides of the trench to wall surfaces of the trench; and filling or inserting material or a surface-normal optical device into the trench, which has one of an electroptic effect, a thermo-optic effect, a light emitting function, a light receiving function, and a light modulating function, wherein light emitted from one of the divided portions of each of the optical waveguides or the optical fibers goes straight through the material or the surface-normal optical device and is incident on the other of the divided portions;

wherein a liquid crystal is filled into the trench, and the filling step comprises:

coating each wall surface of the trench with an alignment layer for the liquid crystal; and performing alignment of the liquid crystal by irradiating the alignment layer with an ion beam.

14. A waveguide-type optical device comprising:

a substrate on which optical waveguides or optical fibers are provided and a trench cutting across the optical waveguides or the optical fibers to divide each of the optical waveguides or the optical fibers into two portions;

a surface-normal active optical device driven by an applied voltage, which is substantially vertically inserted into the trench and is fixed in the trench; and a support member attached to a portion of the surface-normal active optical device to support the surface normal active optical device when inserting the surface-normal active optical device into the trench, wherein the portion of the surface normal device that is not inserted into the trench is supported by the support member, wherein light emitted from one of the divided portions of each of the optical waveguides or the optical fibers passes through the surface-normal active optical device and is incident on the other of the divided portions.

15. A waveguide-type optical device as claimed in claim 14, wherein for a given thickness w of the surface-normal active optical device, and width W of the trench satisfies th condition "w<W<300 $\mu$m".

16. A waveguide-type optical device as claimed in claim 14, wherein electrodes are formed on the support member, which function as electrodes of the surface-normal active optical device.

17. A waveguide-type optical device as claimed in claim 14, wherein:

the support member is one of a rectangular block, an L-shaped block, and a cylindrical block, and the block is made of one of glass, a ceramic, and a plastic; and the height h and width I of the block, and length s of a protruding portion of the surface-normal active optical device, which protrudes from the block, have a relationship of "I/h>s/I" by which the surface-normal active optical device does not fall when the device supported by the support member is put on the surface of the substrate in an inclined position.

18. A waveguide-type optical device as claimed in claim 16, wherein:
the surface-normal ctive optical device has electrodes;
the support member is a rectangular block, and L-shaped electrodes are formed on the block in a manner such that the L-shaped electrodes lie on two adjacent faces of the block, where the faces include the top face of the block; and
the electrodes oft surface-normal active optical device are respectively connected to the electrodes of the block attached to the device, thereby extending the electrodes of the device to the top face of the block.

19. A waveguide-type optical device as claimed in claim 14, wherein the surface-normal active optical device is one of:
a PbS optical detector formed on a glass plate or an a-Si (amorphous silicon) optical detector;
an optical detector obtained by thinning a semiconductor device;
a semiconductor optical modulator;
a polarizer obtained by dispersing metal particles in glass, where the particles are aligned in the long particle is;
a wavelength plate made of an optical crystal;
a dielectric multi-layered filter deposited on a glass plate;
an ND (neutral density) filter;
a variable-wavelength filter made by placing an electro-optic crystal or electro-optic ceramic between dielectric multi-layered mirrors; and
a polarization modulator having an electro-optic crystal or electro-optic ceramic.

20. A waveguide-type optical device as claimed in claim 14, wherein:
the surface-normal active optical device is a liquid crystal device; and
the support member is a pair of blocks between which the liquid crystal device is placed,
wherein the liquid rystal device comprises:
glass plates which are respectively attached to faces of the blocks, where said faces of the blocks face each other via the liquid crystal device and a patterned electrode is formed on each glass plate;
an alignment layer formed on each glass plate, where the alignment layer is subjected to an alignment process such as rubbing; and
a liquid crystal filled into a space between the alignment layers of the glass plates.

21. A waveguide-type optical device as claimed in claim 20, wherein:
the patterned electrode includes 8 electrodes having a radial and symmetric form with respect to a center portion surrounded by the 8 electrodes;
said center portion has a window having a diameter of 20 to 50 $\mu$m;
voltage applied to each of the 8 electrodes is controlled so as to apply an electric field, which has any desired power and is in any desired direction, to the center portion surrounded by the 8 electrodes; and
incident light having any polarization direction is converted into light having any desired polarization direction.

22. A waveguide-type optical device as claimed in claim 14, wherein:
the surface-normal active optical device is an optical modulator which comprises:
a PLZT plate having four trenches dug from upper, lower, right, and left sides of the plate;
four electrodes formed from the above four sides of the PLZT plate to the inside of each trench;
a conductive adhesive with which each trench is filled; and
a glass plate attached to the PLZT plate, which has four electrodes to which the four electrodes of the PLZT plate are respectively connected, and
wherein the glass plate is attached and fixed to the support member in a manner such that light passes through a center portion between the four electrodes of the PLZT plate, and the electrodes of the glass plate function as external electrodes of the optical modulator; and
voltage applied to each of the four electrodes is controlled so as to apply an electric field having any desired power and in any desired direction, thereby continuously and completely controlling the polarization direction of incident light into light having a linear polarization.

23. A waveguide-type aptical device as claimed in claim 22, wherein the optical waveguides or optical fibers which are provided on the substrate are expanded core fibers.

24. A waveguide-type optical device as claimed in claim 14, wherein the optical waveguides or optical fibers provided on the substrate are expanded core fibers.

25. A manufacturing method of a waveguide-type optical device, comprising the steps of:
forming a linear trench on a substrate on which optical waveguides or optical fibers are provided, in a manner such that the trench cuts across the optical waveguides or the optical fibers to divide each the optical waveguides or the optical fibers into two portions;
attaching a support member to a surface-normal active optical device which is driven by an applied voltage, in manner such that a portion of the active optical device protrudes from the support member; and
substantially vertically inserting the protruding portion of the surface-normal active optical device which is supported by the supported member into the trench and fixing the device in the trench.

26. A manufacturing method as claimed in claim 25, wherein for a given thicknes w of the surface-normal active optical device, width W of the trench satisfies the condition "w<W<300 $\mu$m".

27. A manufacturing method as claimed in claim 25, wherein:
a positioning mark is provided on the surface-normal active optical device before the device is inserted into the trench to make a portion of the surface-normal active optical device, through which light passes, coincide with a corresponding core of each optical waveguide or optical fiber, where the position of the positioning mark is away from the position of the portion through which light passes, by the distance from the surface of the substrate to the position of the core; and
the support member is attached to the surface-normal active optical device in a manner such that the positioning mark coincides with the bottom face of the support member.

28. A manufacturing method as claimed in claim 25, wherein:
   the support member is one of a rectangular block, an L-shaped block, and a cylindrical block, and the block is made of one of glass, ceramics, and plastics; and
   height h and width I of the block, and length s of a protruding portion of the surface-normal active optical device, which protrudes from the block, have a relationship of "I/h>s/I"; and
   the step of inserting the protruding portion of the surface-normal active optical device includes the steps of:
   putting the device supported by the support member on the surface of the substrate in an inclined position, so as to prevent the device from falling onto the substrate;
   sliding the device on the surface of the substrate towards the trench; and
   making the device fall into the trench and fixing the inserted device.

29. A manufacturing method as claimed in claim 28, wherein in the step of sliding the device on the surface of the substrate, both the support member and an end of the surface normal active optical device contact the surface of the substrate.

30. A manufacturing method as claimed in claim 28, wherein in the step of making the device fall into the trench, when the surface-normal active optical device reaches the position of the trench, an end of the device contacts a wall surface of the trench and the surface-normal optical device bends and falls into the trench.

31. A manufacturing method as claimed in claim 25, wherein:
   the surface-normal active optical device has electrodes; and
   the support member is a rectangular block,
   the method further comprising the steps of:
   forming L-shaped lectrodes on the block in a manner such that the L-shaped electrodes lie on two adjacent faces of the block, where the faces include the top face of the block; and
   respectively connecting the electrodes of the surface-normal active optical device to the electrodes of the block attached to the device, thereby extending the electrodes of the device to the top face of the block.

32. A waveguide-type optical device comprising:
   a substrate on which optical waveguides or optical fibers are provided and a linear trench cutting across the optical waveguides or the optical fibers to divide each of the optical waveguides or the optical fibers into two portions;
   a pair of electrode assigned to each optical waveguide or optical fiber and formed in a direction substantially perpendicular to the longitudinal direction of the trench, from the surface of the substrate at both sides of the trench to wall surfaces of the trench; and
   a material or a surface-normal optical device filled or inserted into the trench, and which has one of an electro-optic effect, a thermo-optic effect, a light emitting function, a light receiving function, and a light modulating function, wherein light emitted from one of the divided portions of each of the optical waveguides or the optical fibers goes straight through the material or the surface-normal optical device and is incident on the other of the divided portions;
   wherein the width of the trench is equal to or less than 300 $\mu$m.

33. A method of manufacturing a waveguide-type optical device comprising the steps of:
   forming a linear trench on a substrate on which optical waveguides or optical fibers are provided, in a manner such that the trench cuts across the optical waveguides or the optical fibers to divide each of the optical waveguides or the optical fibers into two portions;
   forming a pair of electrodes, which is assigned to each optical waveguide or optical fiber, in a direction substantially perpendicular to the longitudinal direction of the trench, from the surface of the substrate at both sides of the trench to wall surfaces of the trench; and
   filling or inserting material or a surface-normal optical device into the trench, which has one of an electro-optic effect, a thermo-optic effect, a light emitting function, a light receiving function, and a light modulating function, wherein light emitted from one of the divided portions of each of the optical waveguides or the optical fibers passes straight through the material or the surface-normal optical device and is incident on the other of the divided portions;
   wherein the width of the trench is equal to or less than 300 $\mu$m.

* * * * *